United States Patent
Nishiguchi et al.

(10) Patent No.: US 8,471,518 B2
(45) Date of Patent: Jun. 25, 2013

(54) POWER CONVERSION DEVICE

(75) Inventors: Shingo Nishiguchi, Hitachinaka (JP);
Kimihisa Furukawa, Hitachi (JP);
Akinori Kamiya, Hitachi (JP);
Toshisada Mitsui, Hitachinaka (JP);
Kazuto Ooyama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 315 days.

(21) Appl. No.: 13/028,248

(22) Filed: Feb. 16, 2011

(65) Prior Publication Data

US 2011/0266992 A1    Nov. 3, 2011

(30) Foreign Application Priority Data

Apr. 28, 2010    (WO) ................ PCT/JP2010/057577

(51) Int. Cl.
*H02P 27/04* (2006.01)
*H02M 7/48* (2007.01)

(52) U.S. Cl.
USPC ............... 318/800; 318/801; 363/40; 363/41

(58) Field of Classification Search
USPC ............ 318/801, 802, 807, 811, 812, 599, 318/727, 400.01, 800; 363/40, 95, 131, 160, 363/41; 388/811
See application file for complete search history.

(56) References Cited

U.S. PATENT DOCUMENTS

| | | | | |
|---|---|---|---|---|
| 6,014,497 | A * | 1/2000 | Kerkman et al. | 388/811 |
| 6,690,137 | B2 * | 2/2004 | Iwaji et al. | 318/700 |
| 6,819,070 | B2 * | 11/2004 | Kerkman et al. | 318/434 |
| 7,034,501 | B1 * | 4/2006 | Thunes et al. | 318/812 |
| 7,365,508 | B2 * | 4/2008 | Iribe et al. | 318/568.12 |
| 7,426,122 | B2 * | 9/2008 | Kimata et al. | 363/41 |
| 7,504,790 | B2 * | 3/2009 | Tsuji et al. | 318/432 |
| 7,616,466 | B2 * | 11/2009 | Chakrabarti et al. | 363/132 |
| 2008/0218111 | A1 * | 9/2008 | Okamura | 318/453 |
| 2009/0045851 | A1 * | 2/2009 | Iwabuchi et al. | 327/108 |
| 2009/0261774 | A1 | 10/2009 | Yuuki et al. | |

FOREIGN PATENT DOCUMENTS

| | | |
|---|---|---|
| JP | 63-234878 A | 9/1988 |
| JP | 2007-82274 A | 3/2007 |
| JP | 2008-29148 A | 2/2008 |

OTHER PUBLICATIONS

International Search Report including partial English language translation dated Aug. 10, 2010 (Three (3) pages).

* cited by examiner

*Primary Examiner* — Eduardo Colon Santana
(74) *Attorney, Agent, or Firm* — Crowell & Moring LLP

(57) ABSTRACT

A power conversion device includes a power switching circuit that has a plurality of series circuits in each of which a switching element that operates as an upper arm and a switching element that operates as a lower arm are connected in series, and a control circuit that generates control signals for controlling the continuity or discontinuity of the switching elements, and, if the relationship between the state of a switching element in a control cycle and the state of the switching element in the next control cycle is a discontinuous relationship, that additionally performs control to make the switching element continuous or discontinuous on the basis of the state of the switching element in the control cycle and the state of the switching element in the next control cycle.

9 Claims, 48 Drawing Sheets

FIG.10

| MODULATION INDEX (MFn) | RISING AND FALLING PHASES ( $\theta$ nm) | | | | |
|---|---|---|---|---|---|
| MF1 | $\theta$ 11 | $\theta$ 12 | $\theta$ 13 | ... | $\theta$ 1m |
| MF2 | $\theta$ 21 | $\theta$ 22 | $\theta$ 23 | ... | $\theta$ 2m |
| ⋮ | ⋮ | ⋮ | ⋮ | ⋮ | ⋮ |
| MFn | $\theta$ n1 | $\theta$ n2 | $\theta$ n3 | ... | $\theta$ nm |

PROCESSING SHOWN AS ①-②-⑥-⑦ IN FIG.14

PROCESSING SHOWN AS ①-②-⑥-⑧ IN FIG. 14

FIG.25
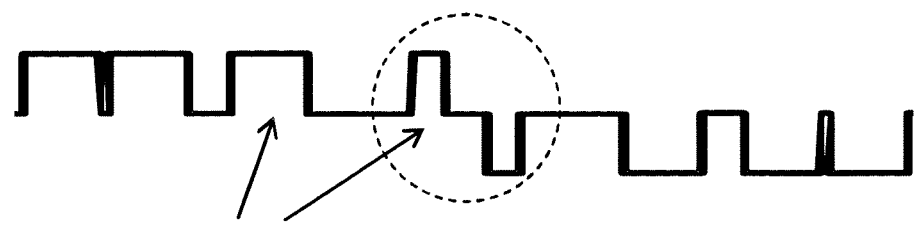
PULSE WIDTH IS NOT CONSTANT
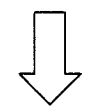 DECOMPOSITION OF PULSES
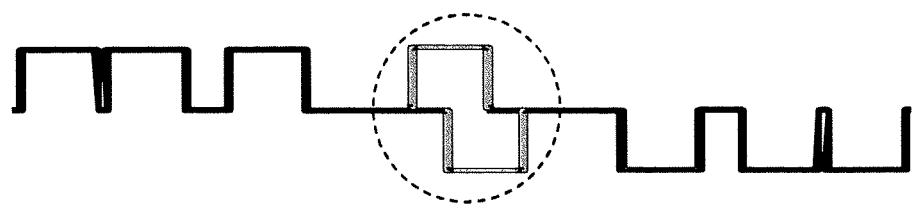

| MODE | VOLTAGE BETWEEN LINES (NORMALIZED) | | | | PHASE TERMINAL VOLTAGE (NORMALIZED) | | |
|---|---|---|---|---|---|---|---|
| | Vuv | Vvw | Vwu | | Vu | Vv | Vw |
| 1 | 1 | 0 | -1 | → | 1 | 0 | 0 |
| 2 | 0 | 1 | -1 | → | 1 | 1 | 0 |
| 3 | -1 | 1 | 0 | → | 0 | 1 | 0 |
| 4 | -1 | 0 | 1 | → | 0 | 1 | 1 |
| 5 | 0 | -1 | 1 | → | 0 | 0 | 1 |
| 6 | 1 | -1 | 0 | → | 1 | 0 | 1 |

(EXAMPLE)
Vu-Vv=+1
Vv-Vw= 0
Vw-Vu=-1

(EXAMPLE)
Vu=1   U PHASE: UPPER ARM ON / LOWER ARM OFF
Vv=0   V PHASE: UPPER ARM OFF / LOWER ARM ON
Vw=0   W PHASE: UPPER ARM OFF / LOWER ARM ON

FIG.39A

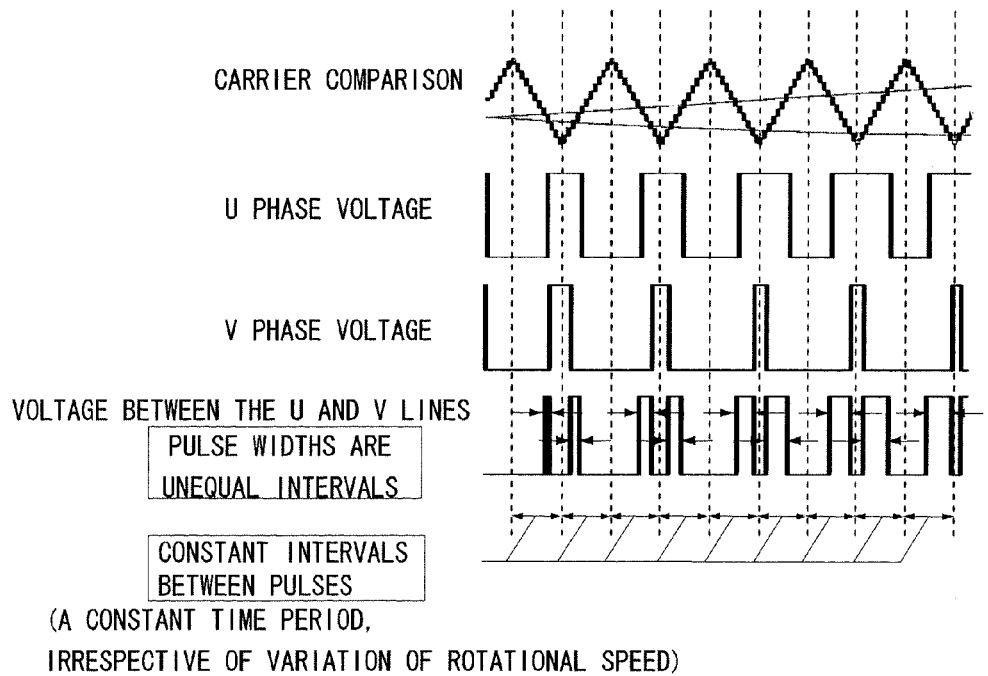

CARRIER COMPARISON

U PHASE VOLTAGE

V PHASE VOLTAGE

VOLTAGE BETWEEN THE U AND V LINES

PULSE WIDTHS ARE UNEQUAL INTERVALS

CONSTANT INTERVALS BETWEEN PULSES
(A CONSTANT TIME PERIOD, IRRESPECTIVE OF VARIATION OF ROTATIONAL SPEED)

FIG.39B

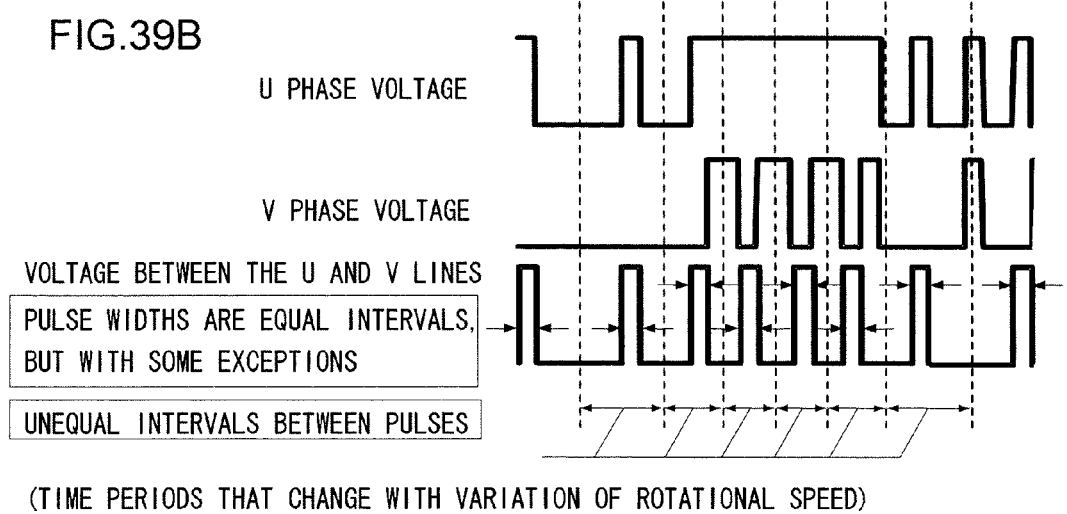

U PHASE VOLTAGE

V PHASE VOLTAGE

VOLTAGE BETWEEN THE U AND V LINES

PULSE WIDTHS ARE EQUAL INTERVALS, BUT WITH SOME EXCEPTIONS

UNEQUAL INTERVALS BETWEEN PULSES (TIME PERIODS THAT CHANGE WITH VARIATION OF ROTATIONAL SPEED)

FIG.44

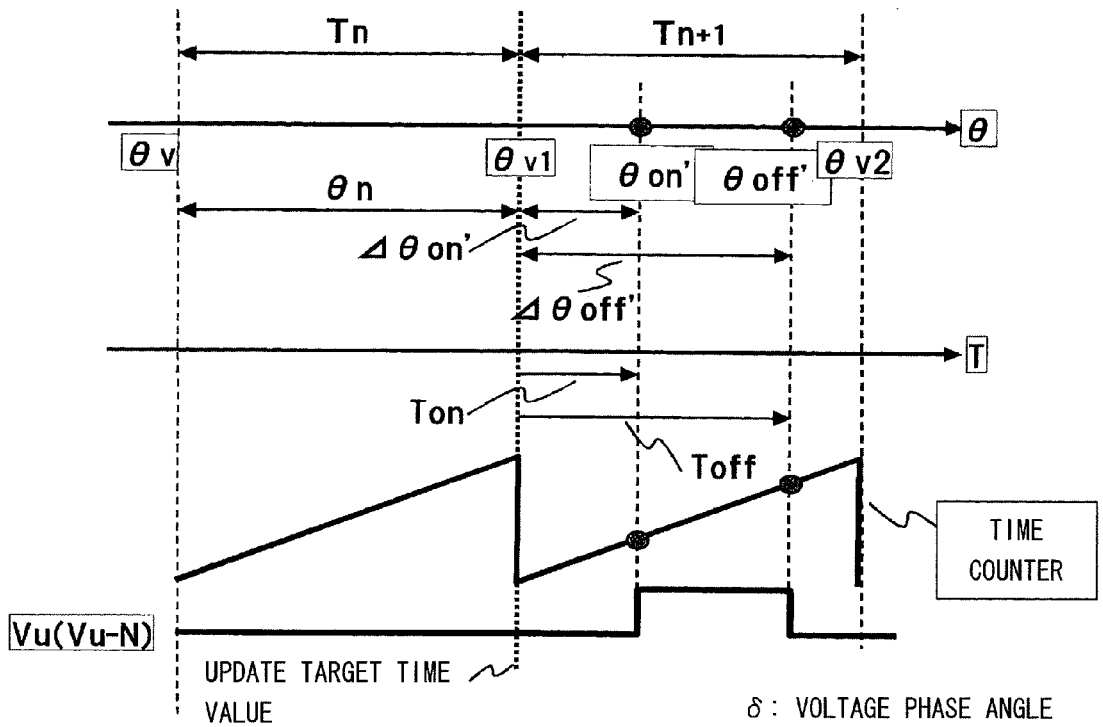

$\delta$: VOLTAGE PHASE ANGLE
$\theta$ re: ROTOR PHASE ANGLE
$\theta$ v: VOLTAGE PHASE ① CAPTURE $\theta$ re AT HEAD END OF CONTROL CYCLE
   $\theta v = \delta + \theta re$
② $\theta n = \omega re \cdot Tn$
③ $\theta v1 = \theta v + \theta n$
④ $\theta v2 = \theta v + \theta n \times 2$
⑤ CALCULATE RISING PHASE $\theta$ on AND FALLING PHASE $\theta$ off IN SECTION $\theta v1 \sim \theta v2$ FROM MEMORY
⑥ PERFORM PULSE CORRECTION PROCESSING
⑦ $\Delta \theta on' = \theta on' - \theta v1$
   $\Delta \theta off' = \theta off' - \theta v1$
⑧ $Ton = \Delta \theta on'/\omega re$
   $Toff = \Delta \theta off'/\omega re$
⑨ UPDATE TARGET TIME VALUE AT HEAD END OF CONTROL CYCLE

POWER CONVERSION DEVICE

INCORPORATION BY REFERENCE

The disclosure of the following priority application is herein incorporated by reference: International Patent Application No. PCT/JP2010/057577 filed Apr. 28, 2010

BACKGROUND OF THE INVENTION

1. Field of the Invention

The present invention relates to an power conversion device that converts DC power into AC power, or AC power into DC power.

2. Description of Related Art

A power conversion device that receives DC power and converts that DC power into AC power for supply to a rotating electrical machine incorporates a plurality of switching elements. The DC power that is supplied is converted into AC power by these switching elements repeatedly performing switching operation. Many such power conversion devices are also used for converting AC power that is generated by a rotating electrical machine into DC power by the switching operation of the above described switching elements. It is per se known to control the switching elements described above on the basis of a pulse width modulation method (hereinafter termed the "PWM method") that uses a carrier wave that varies at a constant frequency. By increasing the frequency of the carrier wave, the accuracy of control may be enhanced, and moreover there is an accompanying tendency for the torque generated by the rotating electrical machine to become smoother.

However, the power losses when the switching elements described above are changed over from their discontinuous states to their continuous states and from their continuous states to their discontinuous states become greater, and the amount of heat generated also becomes greater.

An example of such a power conversion device is disclosed in Japanese Laid-Open Patent Publication No. S63-234878.

It is desirable to reduce the power losses described above caused by the switching elements, and, by reducing the power losses, it is also possible to reduce the amount of heat generated by the switching elements. For this, it is desirable to reduce the number of times that the switching elements described above are switched. However, as described above, with a per se conventional PWM method, if the frequency of the carrier wave is reduced in order to reduce the number of times that the switching elements described above perform their switching operation per unit time, the distortion of the AC current outputted from the power conversion device becomes greater, and this is also accompanied by increase of torque pulsations.

One object of the present invention is to provide a power conversion device with which it is possible to anticipate reduction of the switching losses, or to provide a control method for a power conversion device with which it is possible to anticipate reduction of the switching losses In addition to solving the problems described above, the power conversion devices according to the embodiments described below can also solve the problem of maintaining high reliability, even when the state of the electric load has changed.

The embodiments explained hereinafter reflect the results of much desirable research for production of this power conversion device as a manufactured product, and solve various concrete problems that need to be solved for production as a manufactured product. Some such concrete problems that are solved by the concrete structure and operation of the embodiments described below will be explained hereinafter in connection with the description of those embodiments.

SUMMARY OF THE INVENTION

According to a first characteristic of the power conversion device according to the present invention, the power conversion device includes a power switching circuit that includes a plurality of switching elements and that receives DC power and generates AC power for supplying to an electrical load, a control circuit that generates control signals for controlling the continuity or discontinuity operations of the switching elements of the power switching circuit on the basis of input information for controlling the above described electrical load, and a pulse generation circuit that generates pulse signals for controlling the continuity or discontinuity of the switching elements, on the basis of the control signals generated by the control circuit; and, if the result of calculation of rising or falling of the pulse signal calculated for a calculation cycle and the state of rising or falling of the pulse signal calculated for the next calculation cycle are different, then the control circuit performs correction to correct the state of rising or falling of the pulse signal in the next calculation cycle.

And, according to a second characteristic of the power conversion device according to the present invention, in the first characteristic, calculation processing is performed to output phases for the power switching elements to be continuous in order to reduce the generation of harmonic components in the AC power to be outputted, and the pulse signals are generated on the basis of the phases obtained by the calculation processing.

According to the present invention, it is possible to provide a power conversion device that can suppress switching losses.

Furthermore, the devices according to the embodiments described below also provide the advantageous effect that it is possible to maintain control at high reliability, even under changes of the state of the load upon the supply of AC power.

It should be understood that in the embodiments described below, as will be explained hereinafter, various other problems have also been solved, as has been found desirable for production as a manufactured product.

BRIEF DESCRIPTION OF THE DRAWINGS

FIG. 10 is a figure showing an example of a table of rising and falling phases;

FIG. 25 is an explanatory figure showing a case in which the widths of one pair of pulses of a voltage between lines are not equal to the widths of the other pulses in the pulse train;

FIGS. 39A and 39B are figures for explanation of the difference in pulse shapes between PWM control and PHM control;

FIG. 44 is a figure showing the basic theory of pulse generation according to the second embodiment;

DESCRIPTION OF THE PREFERRED EMBODIMENTS

Figure 1:
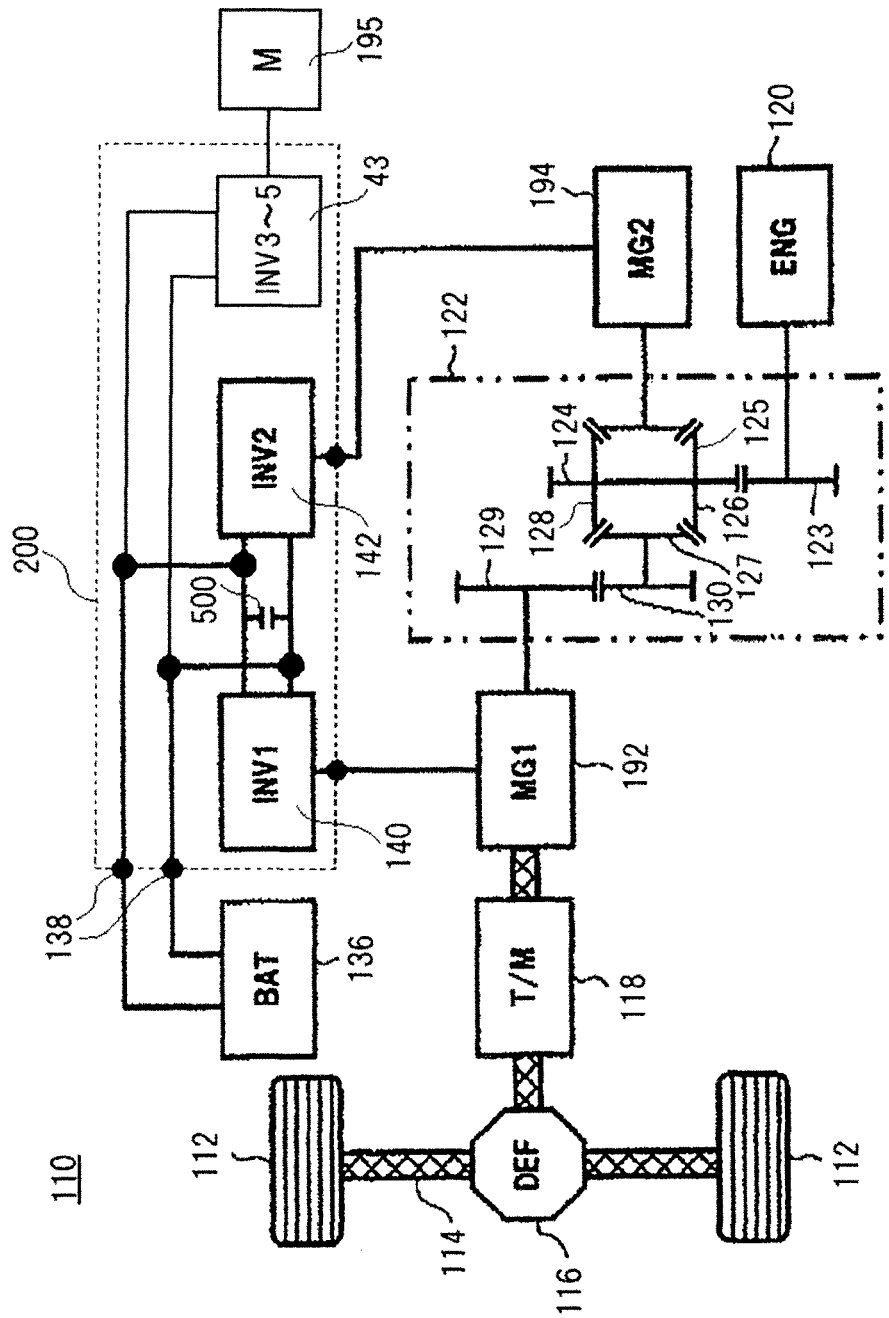
FIG. 1 is a figure showing control blocks of a hybrid electric vehicle.

In addition to the details described above, in the following embodiments, it has been possible to solve various problems that need to be resolved in connection with production as a manufactured product, and to obtain various desirable advantageous effects in connection with production as a manufactured product. Along with the following description of the details mentioned above, and of overlapping details, the solutions of problems and the beneficial effects that are achieved by the devices described in the following embodiments will be explained. In addition, the solutions of certain concrete problems and certain concrete beneficial effects will also be explained in the description of the embodiments.

[Reduction of the Frequency of Switching of the Power Switching Circuit]

With the power conversion devices explained in connection with the following embodiments, on the basis of the angle of the waveform of the AC power that is being converted from DC power, in other words on the basis of the phase, switching operations of switching elements incorporated in the power switching circuit are controlled. Due to this, it is possible to reduce the number of switching operations of the switching elements described above per unit time, or the number of switching operations of the switching elements per one cycle of the AC output, as compared to a per se conventional PWM method, and thereby it is possible to reduce the power losses.

Furthermore, with the power conversion devices explained in the embodiments below, it is possible to reduce the harmonic components by controlling the switching operation of the switching elements incorporated in the power switching circuit on the basis of the phase of the AC output, and it is possible to suppress the increase of pulsations, irrespective of the number of times switching is performed per unit time or per one cycle being reduced.

In the embodiments explained below, it is possible to select the orders of the harmonic components that are to be reduced. Since it is possible to select the number of orders of harmonic components to be eliminated to match the subject of application of the present invention in this manner, accordingly it is possible to prevent the number of orders of harmonic components to be eliminated from increasing to be more than necessary, and thereby it becomes possible to reduce the number of times that switching is performed for each unit phase of the switching elements of the power switching circuit. Furthermore, the harmonic components to be eliminated are overlapped with each other per unit phase, and the switching timings of the switching elements of the power switching circuit are controlled on the basis of the wave pattern that are overlapped, thereby it is possible to reduce the number of times that the switching elements of the power switching circuit perform switching.

[Stability Against Fluctuations or Disturbances of the State of the Control Object]

In the following embodiments, continuity and discontinuity of the switching elements of the power switching circuit is controlled by determining a control cycle, and by repeatedly performing that control cycle. Since the operation of the switching elements of the power switching circuit to go continuous and discontinuous is performed over a plurality of control cycles, there is the problem that it may happen that the input information for calculation processing is different for an earlier control cycle and for the next calculation cycle, so that the state of operation of the switching elements to go continuous and discontinuous may change abruptly between the calculation cycles. However in the following embodiments stabilized control and control at high reliability are obtained, since, in the calculation processing, it is investigated whether the calculation result for the continuity and discontinuity operation in each control cycle and the calculation result for the continuity and discontinuity operation in the next control cycle are mutually discordant, and corresponding processing is performed if the calculation results are discordant.

In the following embodiments, while the number of times that switching operation of the switching elements is performed is reduced as compared to prior art PWM control, there is the feature that the gaps between switching operations become longer. Accordingly, there is the possibility that a discordance may arise between the results of calculation of continuity and discontinuity in one cycle and the results of calculation of continuity and discontinuity in the next cycle. However, by performing processing to deal with discordance of the calculation results, it is possible to obtain stabilized control and control while maintaining high reliability.

For the switching elements to operate in a stable manner, it is desirable to perform control so as to provide intervals of discontinuity that are longer than some predetermined reference minimum discontinuous interval. There is a fear that the results of calculation in some cycle and the results of calculation in the next cycle may become different due to change of some input parameter, so that, as a result, the discontinuous intervals for the switching elements may become shorter than the reference minimum interval. Accordingly, in the following embodiments, the intervals for the switching elements to be discontinuous are examined, and if there is a fear that they may become shorter than the reference minimum discontinuous interval, then processing is performed to make the discontinuous intervals longer, or alternatively to eliminate them completely. Due to this, the beneficial effect is obtained that it is possible to ensure stable operation of the switching elements.

Analogously, for the switching elements to operate in a stable manner, it is desirable to perform control so as to provide continuous intervals that are longer than some predetermined reference minimum continuous interval. There is a fear that the results of calculation in some cycle and the results of calculation in the next cycle may become different due to change of some input parameter, so that, as a result, the continuous intervals for the switching elements may become shorter than the reference interval. Accordingly, in the following embodiments, the continuous intervals for the switching elements are examined, and if there is a fear that they may become shorter than the reference minimum continuous interval, then processing is performed to make the continuous intervals longer. Due to this, the beneficial effect is obtained that it is possible to ensure stable operation of the switching elements.

It should be understood that, for the switching elements, it is desirable to employ elements whose operating speed is high, and whose operation to go continuous and to go discontinuous can both be controlled on the basis of control signals: this type of element may, for example, be an insulated gate bipolar transistor (hereinafter referred to as an "IGBT") or a field effect transistor (such as a MOS transistor), and this type of element is preferable from the point of view of responsiveness and controllability.

The AC power outputted from the power conversion device described above is supplied to an inductance circuit included in a rotating electrical machine or the like, and AC current flows on the basis of its inductance operation. In the embodiments described below, examples will be cited and explained of rotating electrical machines that perform inductance circuit operation as motors or generators. From the point of view of benefits, the use of the present invention for generating AC power to operate such a rotating electrical machine is optimum, but the present invention can also be used as a power conversion device for supplying AC power to an inductance circuit other than a rotating electrical machine.

In the following embodiments, it is possible to change the method for switching operation of the switching elements according to a predetermined condition. For example, in a first operational region in which the rotational speed of the rotating electrical machine is high, the switching operation of the switching elements is generated on the basis of the phase of the AC output to be outputted, for example the phase of the AC waveform, while on the other hand, in a second operational region in which the rotational speed of the rotating electrical machine is lower than in the above described first operational region, the above described switching elements are controlled according to a PWM method in which the operation of the switching elements is controlled on the basis of a carrier wave of a constant frequency. The stopped state in which the rotor of the above described rotating electrical machine is stationary may be included in the above described second operational region. It should be understood that in the following embodiments examples will be explained of the use of a motor-generator, that is a rotating electrical machine that can function both as a motor and a generator.

[Reduction of Distortion of the Outputted AC Current]

With the method of controlling the switching elements to go continuous or discontinuous on the basis of the angle of the AC waveform that is to be outputted, in the region in which the frequency of the AC power to be outputted is low, there is a tendency for distortion of the AC waveform to become great. In the explanation provided above, in the second region in which the frequency of the AC output is low, the PWM method is used and the switching elements are controlled on the basis of the elapsed time, while in the first region in which the frequency of the outputted AC power is higher than in the second region, the switching elements are controlled on the basis of the angle. By controlling the switching elements in this manner by using two different methods, the beneficial effect is obtained that it is possible to reduce distortion in the AC current that is outputted.

[The Fundamental Control]

Figure 2:
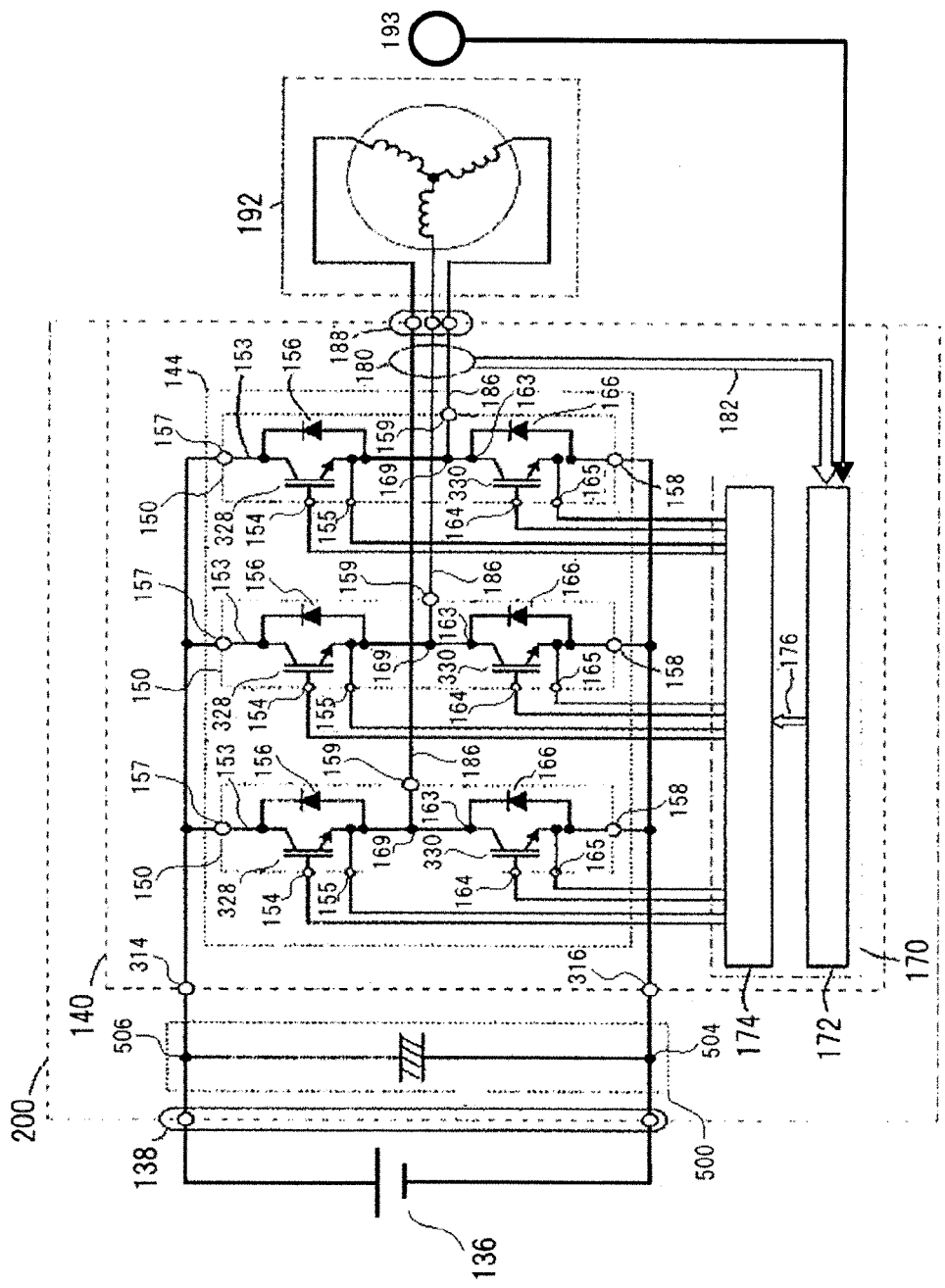
FIG. 2 is a figure showing the structure of an electrical circuit.

The details of power conversion devices according to embodiments of the present invention will be explained hereinafter with reference to the drawings. The power conversion device according to embodiments of the present invention are examples of application to power conversion devices that generate AC power for driving a rotating electrical machine in a hybrid electric vehicle (hereinafter termed an "HEV") or a pure electric vehicle (hereinafter termed an "EV"). The fundamental structure and control of a power control device for an HEV and of a power conversion device for an EV are fundamentally the same, and accordingly, as a representative example, the control structure and the circuit structure of the power conversion devices according to the following embodiments of the present invention will be explained in the case of application to an HEV, as shown in FIGS. 1 and 2. FIG. 1 is a figure showing control blocks of an HEV.

The power conversion devices according to embodiments of the present invention will be explained in terms of onboard power conversion devices for an onboard electrical system that is mounted to an automobile. In particular, examples will be cited and explained of power conversion devices for driving a vehicle that are used in an electrical system for powering the vehicle, for which the mounting environment and the operational environment are very severe. A power conversion device for driving a vehicle is included in the electrical system for powering the vehicle, as a control device that drives a rotating electrical machine that powers the vehicle. This power conversion device for powering the vehicle converts DC power that is supplied from an onboard battery or from an onboard electricity generation device that constitutes an onboard power supply into predetermined AC power, and supplies this AC power that has been produced to the rotating electrical machine described above, thus driving that rotating electrical machine. Moreover since the above described rotating electrical machine, in addition to serving as an electric motor, is also endowed with the function of serving as a generator, accordingly the power conversion device described above not only converts DC power to AC power, but, according to the operational mode, also is capable of performing operation to convert AC power generated by the above described rotating electrical machine into DC power. This DC power thus obtained by conversion is supplied to the onboard battery.

The structure of this embodiment is optimized for powering a vehicle such as an automobile or a truck or the like. However, the present invention may also be applied to power conversion devices of other types; for example, the present invention could also be applied to a power conversion device for a train or a ship or an aircraft or the like, to a power conversion device for use in industry for generating electric power to be supplied to a rotating electrical machine that drives a machine in a workplace, or to a power conversion device for household use that is employed as a control device for an electric motor that drives a home solar electricity generating system or an item of household electrical equipment or the like. In particular, this embodiment is appropriate for a power conversion device that receives DC power, and that generates AC power for supply to a rotating electrical machine.

In FIG. 1, an HEV 110 is a single electrically operated vehicle that is equipped with two vehicle drive systems. One of these is an engine system that utilizes an engine 120 as its power source. The engine system is used as the principal drive source for driving the HEV 110. The other drive system is an onboard electrical system that utilizes two motor-generators 192 and 194 as power sources. This onboard electrical system is principally used as a drive torque source for the HEV 110 and as an electrical power generating source for the HEV 110. The motor-generators 192 and 194 may be, for example, three-phase synchronous rotating electrical machines or three-phase induction electrical machines. Since, in terms of their method of operation, they function both as motors and as generators, in this specification they will be termed "motor-generators".

Front wheel shafts 114 and a pair of front wheels 112 provided at the ends of these front wheel shafts 114 are provided at the front portion of the body of the vehicle. Rear wheel shafts (not shown in the drawing) and a pair of rear wheels provided at the ends of these rear wheel shafts are provided at the rear portion of the vehicle body. While, with the HEV 110 of this embodiment, the so-called front wheel drive configuration is employed in which the main wheels that are powered by drive force are the front wheels 112, and the auxiliary wheels that free-wheel are the rear wheels (not shown), the present invention could also be applied to the reverse configuration, i.e. to an HEV that employs the rear wheel drive configuration.

A front wheel side differential gear system 116 (hereinafter termed the "front wheel DEF") is provided at the central portion between the two front wheel shafts 114. The front wheel shafts 114 are mechanically connected to output sides of this front wheel DEF 116. Furthermore, the output shaft of a speed change mechanism 118 is mechanically connected to an input side of the front wheel DEF 116. The front wheel DEF 116 is a differential type drive force distribution mechanism that distributes the rotational drive force transmitted and speed-changed by the speed change mechanism 118 between the left and right front wheel shafts 114. The output side of the motor-generator 192 is mechanically connected to the input side of the speed change mechanism 118. Furthermore, the output side of the engine 120 and the output side of the motor-generator 194 are mechanically connected to the input side of the motor-generator 192 via a drive force distribution mechanism 122. It should be understood that the motor-generators 192 and 194 and the drive force distribution mechanism 122 are housed in the interior of the casing of the speed change mechanism 118.

A capacitor module 500 that operates as a smoothing capacitor and a battery 136 for supplying high voltage DC power are electrically connected to the power conversion device 140 or to the power conversion device 142. The DC power supplied from the battery 136 is converted by the power conversion device 140 or 142 into AC power for driving the motor-generator 192 or the motor-generator 194, respectively. The motor-generator 192 or the motor-generator 194 are synchronous machines incorporating permanent magnets in their rotors that create magnetic poles. The AC power generated by the power conversion device 140 or 142 is supplied to the respective armature windings of these stators, and thereby the rotational speed or the rotational torque of the motor-generator 192 or 194 is controlled by the power conversion device 140 or 142 respectively. If the motor-generator 192 or 194 is operating as a generator, then the AC power generated by the motor-generator 192 or 194 is converted into DC power by the power conversion device 140 or 142 respectively, so as to charge up the battery 136. The capacitor module 500 performs operation to eliminate pulsations and electrical noise generated in the state in which the power conversion device 140 or the power conversion device 142 is converting DC power into AC power, or AC power into DC power.

The onboard electrical system shown as this embodiment includes two grouped electric drive/generator units, i.e. a first electric drive/generator unit that includes the motor-generator 192 and the power conversion device 140, and a second electric drive/generator unit that includes the motor-generator 194 and the power conversion device 142; and usage is divided between these according to the current operational state. In other words, when the engine 120 is used for accelerating or decelerating the motion of the vehicle, there is a tendency for the running efficiency of the vehicle to become lower, so that, for operation of the engine 120 within the operational region in which the efficiency is good, acceleration and deceleration of the movement of the vehicle should be performed as much as possible with the first and second electric drive/generator units. For example, in the state of vehicle steady traveling, the traveling torque for the vehicle is generated by the first electric drive/generator unit. If there is a shortage of the amount of power stored in the battery 136, then the engine 120 is operated within the operational region in which its efficiency is good, the rotational torque generated by the engine 120 is converted into power by the second electric drive/generation unit, and this power is supplied to the battery 136 or to the first electric drive/generator unit.

It is possible to operate the first electric drive/generator unit as an electrical drive unit using the power of the battery 136, so as to drive the vehicle only with the drive force of the motor-generator 192. Furthermore, it is possible to operate either the first electric drive/generator unit or the second electric drive/generator unit as an electricity generation unit with power from the engine 120, or with power from the vehicle wheels, so as to charge up the battery 136. Control when the motor-generator 192 or the motor-generator 194 is operating as a motor or is operating as a generator is performed by controlling the power conversion device 140 or the power conversion device 142. For example, when the AC power generated by the power conversion device 140 or the power conversion device 142 is controlled so as to be in the advanced phase direction with respect to the magnetic poles of the rotor of the motor-generator 192 or the motor-generator 194, then the motor-generator 192 or the motor-generator 194 operates as a motor, and electrical energy is converted into mechanical energy by the motor-generator 192 or the motor-generator 194. Conversely, when the AC power generated by the power conversion device 140 or the power conversion device 142 is controlled so as to be in the retarded phase direction with respect to the magnetic poles of the rotor of the motor-generator 192 or the motor-generator 194, then the motor-generator 192 or the motor-generator 194 operates as a generator, and mechanical energy is converted into electrical energy by the motor-generator 192 or the motor-generator 194, and the power conversion device 140 or the power conversion device 142 converts this AC power into DC power, then this DC power is supplied to the battery 136.

The battery 136 is also used as a power supply for driving an auxiliary machinery motor 195. In such auxiliary machinery there may be incorporated, for example, a motor that drives a compressor for an air conditioner, or a motor that drives a hydraulic pump for control. DC power is supplied from the battery 136 to the power conversion device 43, and is converted into AC power by the power conversion device 43 and supplied to the motor 195. This auxiliary machinery power conversion device 43 is endowed with a function similar to that of the power conversion devices 140 and 142 for driving the vehicle, and controls the phase, the frequency, and the power of the AC that it supplies to the motor 195. For example, the motor 195 generates torque due to the supply of AC power that has a phase leading with respect to the rotation of the rotor of the motor 195. Conversely, by AC power having a delayed phase being generated, the motor 195 operates as a generator, so that the motor 195 performs regenerative braking operation. The control function of this type for the power conversion device 43 is the same as the control functions for the power conversion devices 140 and 142. The maximum conversion power of the power conversion device 43 is smaller than those of the power conversion devices 140 and 142 since the capacity of the motor 195 is smaller than the capacities of the motor-generators 192 and 194. However, the circuit structure and the operations of the power conversion device 43 are fundamentally the same as the circuit structures and the operations of the power conversion devices 140 and 142.

Furthermore, a capacitor module 500 is in close electrical relationship with the power conversion devices 140, 142 and 43. Moreover, these devices all have the common feature of needing countermeasures against generation of heat. Yet further, it is desirable to make the volumes of the power conversion devices as small as possible. From these points of view, in the power conversion device that is described in detail hereinafter, the power conversion devices 140 and 142, the power conversion device 43, and the capacitor module 500 are housed within the chassis of the power conversion device. With this type of structure, it is possible to implement a system that is compact and whose reliability is high.

Yet further, by housing the power conversion devices 140 and 142, the power conversion device 43, and the capacitor module 500 within a single chassis, the beneficial effect is obtained that it is possible to simplify the wiring and to implement countermeasures against noise. Yet further, it is possible to reduce the inductances in the circuitry that connects the capacitor module 500, the power conversion devices 140 and 142, and the power conversion device 43, and due to this not only is it possible to prevent the generation of spike voltages, but also it is possible to anticipate reduction of heat generation and enhancement of heat dissipation efficiency.

Next, the circuit structure of the power conversion devices 140 and 142 and the power conversion device 43 will be explained using FIG. 2. It should be understood that, in the embodiment shown in FIGS. 1 and 2, an example is presented in which each of the power conversion devices 140, 142, and 43 has its own individual structure. However, each of the power conversion devices 140, 142, and 43 has similar circuit structure and operates in a similar manner and has similar functions. Accordingly here the power conversion device 140 will be explained as a representative example.

The power conversion device 200 according to this embodiment includes the power conversion devices 140 and 142, the capacitor module 500, and the power conversion device 43; however, the power conversion device 142 and the power conversion device 43 are omitted in FIG. 2. The power conversion device 140 includes a power switching circuit 144 and a control unit 170. Furthermore, the power switching circuit 144 includes a plurality of switching elements that operate as upper arms and a plurality of switching elements that operate as lower arms. In this embodiment, IGBTs (Insulated Gate Bipolar Transistor) are used as these switching elements. The IGBTs 328 that operate as upper arms are connected in parallel with diodes 156, while the IGBTs 330 that operate as lower arms are connected in parallel with diodes 166. A plurality of upper and lower arm series circuits 150, i.e., in the example shown in FIG. 2, three upper and lower arm series circuits 150 that correspond to a U phase, a V phase, and a W phase respectively, are provided. Connection point 169 of each upper and lower arm included in the series circuit 150 is connected via an AC terminal 159 to an AC power line (i.e. an AC bus bar) 186 that leads to the motor-generator 192.

The IGBTs 328 and 330 in the upper and lower arms are switching elements, and are operated by drive signals received from the control unit 170 so as to convert DC power supplied from the battery 136 into three phase AC power. This power that has been converted is supplied to the armature windings of the motor-generator 192. As described above, the power conversion device 140 is capable of converting the three phase AC power generated by the motor-generator 192 into DC power.

The power conversion device 200 according to this embodiment incorporates, as shown in FIG. 1, not only the power conversion devices 140 and 142, but also the power conversion device 43 and the capacitor module 500. Since, as described above, the power conversion devices 140 and 142 and also the power conversion device 43 have similar structures, here the power conversion device 140 will be described as a representative, and description of the power conversion device 142 and the power conversion device 43 will be omitted since it will already have been described.

The power switching circuit 144 is built as a three phase bridge circuit. A DC positive terminal 314 and a DC negative terminal 316 are respectively electrically connected to the positive electrode side and the negative electrode side of the battery 136. The upper and lower arm series circuits 150, 150, 150 for each of the three phases are electrically connected in parallel between the DC positive terminal 314 and the DC negative terminal 316. Here, the upper and lower arm series circuits 150 will be termed "arms". Each of these arms includes an upper arm side switching element 328 and a diode 156, and a lower arm side switching element 330 and a diode 166.

In this embodiment, an example will be described in which the IGBTs 328 and 330 are used as the switching elements. The IGBTs 328 and 330 have respective collector electrodes 153 and 163, emitter electrodes (respective signal emitter electrode terminals) 155 and 165, and gate electrodes (respective gate electrode terminals) 154 and 164. Diodes 156 and 166 are respectively electrically connected in parallel between the collector electrodes 153 and 163 of the IGBTs 328 and 330 and their emitter electrodes, as shown in the figure. Each of the diodes 156 and 166 has two electrodes, a cathode electrode and an anode electrode. The cathode electrodes are electrically connected to the collector electrodes of the IGBTs 328 and 330 while the anode electrodes are electrically connected to the emitter electrodes of the IGBTs 328 and 330, so that the forward directions of the diodes 156 and 166 are in the directions from the emitter electrodes of the IGBTs 328 and 330 towards their collector electrodes. It would also be acceptable to use MOSFETs (Metal Oxide Semiconductor Field Effect Transistors) as these switching elements. In such a case, the diodes 156 and 166 would not be required.

The upper and lower arm series circuits 150 are provided for each of three phases, corresponding to each of the phases of the AC power supplied to the three phase motor-generator 192, and the connection points 169 between the emitter electrodes of the IGBTs 328 and the collector electrodes of the IGBTs 330 are used for outputting the U phase, the V phase, and the W phase of the AC power. Via the AC terminals 159 and the connector 188, the connection points 169 described above for each of the three phases are connected to the armature windings of the motor-generator 192 (in the case of a synchronous electric motor, the stator windings) for the U phase, the V phase, and the W phase, and thereby currents for the U phase, the V phase, and the W phase flow in the above described armature windings. In each pair, the upper and lower arm series circuits 150 are connected in parallel. The collector electrodes 153 of the upper arm IGBTs 328 are each electrically connected via DC bus bars or the like to the positive pole side capacitor electrodes of the capacitor module 500 via the positive terminals 157 (i.e. the P terminals), while the emitter electrodes of the lower arm IGBTs 330 are each electrically connected to the negative pole side capacitor electrode of the capacitor module 500 via the negative terminals 158 (i.e. the N terminals).

The capacitor module 500 acts as a smoothing circuit for suppressing fluctuations of the DC voltage generated by the switching operation of the IGBTs 328 and 330. Via DC connectors 138, the positive pole side of the battery 136 is connected to the positive pole side capacitor electrode of the capacitor module 500, while the negative pole side of the battery 136 is connected to the negative pole side capacitor electrode of the capacitor module 500. Due to this, the capacitor module 500 is connected between the collector electrodes 153 of the upper arm IGBTs 328 and the positive electrode side of the battery 136, and between the emitter electrodes of the lower arm IGBTs 330 and the negative pole side of the battery 136, so as to be electrically connected to the battery 136 and to the upper and lower arm series circuits 150 in parallel.

The control unit 170 includes a control circuit 172, receives control information for the motor-generator 192 and state information such as the rotational speed of the motor-generator 192 and its magnetic pole position and so on that are inputted, generates control signals for controlling the switching elements of the power switching circuit 144, and supplies these control signals to the driver circuit 174. On the basis of these control signals, the driver circuit 174 generates drive pulses, i.e. drive signals that control the continuity and discontinuity operation of the switching elements, and supplies these drive pulses to the gate electrodes 154 or 164 of the switching elements. The control circuit 172 described above includes a microcomputer for performing calculation processing to obtain the switching timings for the IGBTs 328 and 330. To this microcomputer there are inputted a target torque value or a target rotational speed requested for the motor-generator 192, the magnetic pole position of the rotor of the motor-generator 192, and the actual values for the various current phases that are being supplied to the motor-generator 192. The above described current values are detected on the basis of detection signals outputted from a current sensor 180. The magnetic pole position is detected on the basis of a detection signal that is outputted from a magnetic pole rotation sensor (not shown in the figures) provided to the motor-generator 192. While in this embodiment an example is cited in which current values for all three phases are detected, it would also be acceptable to arrange to detect current values for only two of the phases. On the basis of the target torque value or the target rotational speed described above, the microcomputer in the control circuit 172 calculates a target current value for each phase to be supplied from the upper and lower arm series circuits 150 to the armature winding of the motor-generator 192. Feedback control is performed on the basis of these target current values and the actual current values that are measured. Alternatively, feedback control may be performed on the basis of the target rotational speed and the actual rotational speed.

More specifically, the microcomputer incorporated in the control circuit 172 calculates current command values for the d and q axes of the motor-generator 192 on the basis of the target torque value that is inputted, and then calculates voltage command values for the d and q axes on the basis of the differences between the current command values for the d and q axes that are the result of the above calculation and the current values for the d and q axes that have been detected, and generates drive signals in pulse form from these voltage command values for the d and q axes.

The control circuit 172 has the function of generating drive signals in two different formats, as will be described hereinafter. One or the other of these two different formats for the drive signals is selected, on the basis of the state of the motor-generator 192 that is an inductance load, or on the basis of the frequency or the like of the AC output into which the DC input is to be converted.

One of the two formats described above is according to a method of modulating the switching operation of the IGBTs 328 and 330, i.e. of the switching elements, on the basis of phases of the AC waveform that it is desired to output (this will hereinafter be referred to as the "PHM method"). And the other of the two formats described above is according to a per se conventional PWM (Pulse Width Modulation) modulation method, that is a method of controlling the switching operation of the IGBTs 328 and 330, i.e. of the switching elements, on the basis of the points of intersection of the AC When driving a lower arm, the driver circuit 174 amplifies the modulated pulse signal and outputs it as a drive signal to the gate electrode of the IGBT 330 of the corresponding lower arm. Furthermore, when driving an upper arm, it amplifies the modulated pulse signal after having shifted the level of the reference potential of this modulated pulse signal to the level of the reference potential of the upper arm, and outputs it as a drive signal to the gate electrode of the IGBT 328 of the corresponding upper arm.

Due to this, each of the IGBTs 328 and 330 performs switching operation on the basis of the drive signal that is inputted to it. By the switching operation of the IGBTs 328 and 330 that is performed in this manner according to the drive signals from the control unit 170, the power conversion device 140 converts the voltage that is supplied from the battery 136, which constitutes a DC power supply, into output voltages for the U phase, the V phase, and the W phase spaced apart by $2\pi/3$ radians of electrical angle, and supplies these output voltages to the motor-generator 192, which is a three phase AC motor. It should be understood that the electrical angle is a quantity that corresponds to the rotational state of the motor generator 192, i.e. in concrete terms to the rotational position of its rotor, and is a cyclic quantity that varies between 0 and $2\pi$. By using this electrical angle as a parameter, it is possible to determine the switching states of the IGBTs 328 and 330, in other words the output voltages for the U phase, the V phase, and the W phase, according to the rotational state of the motor-generator 192.

Moreover, the control unit 170 performs detection of anomalies such as excess current, excess voltage, excess temperature and so on, and thereby protects the upper and lower arm series circuits 150. For this purpose, sensing information is inputted to the control unit 170. For example, information about the current that flows to the emitter electrode of each of the IGBTs 328 and 330 is inputted from the signal emission electrode terminals 155 and 165 of each arm to the corresponding drive unit (IC). Based upon this, each of the drive units (ICs) performs excess current detection, and, if it has detected excess current, stops the switching operation of the corresponding IGBT 328 or 330, thus protecting the corresponding IGBT 328 or 330 from excessive current. Furthermore, information about the temperatures of the upper and lower arm series circuits 150 is inputted to the microcomputer from temperature sensors (not shown in the figures) that are provided to the upper and lower arm series circuits 150. Yet further, information about the voltages at the DC positive electrode sides of the upper and lower arm series circuits 150 is inputted to the microcomputer. The microcomputer performs excess temperature detection and excess voltage detection on the basis of this information, and, if it detects excess temperature or excess voltage, stops the switching operation of all of the IGBTs 328 and 330, thus protecting the upper and lower arm series circuits 150 (and also the semiconductor modules that include these circuits 150) from excess temperature and excess voltage.

In FIG. 2, the upper and lower arm series circuits 150 are series circuits of the upper arm IGBTs 328 and the upper arm diodes 156, and series circuits of the lower arm IGBTs 330 and the lower arm diodes 166. And the IGBTs 328 and 330 are switching semiconductor devices. The operation of the IGBTs 328 and 330 of the upper and lower arms of the power conversion device circuit 144 to go continuous and discontinuous is changed over in a fixed order. And the current in the stator windings of the motor-generator 192 during this changeover flows in the circuits constituted by the diodes 156 and 166.

As shown in FIG. 2, the upper and lower arm series circuits 150 have: positive terminals (P terminals) 157, negative terminals (N terminals) 158, AC terminals 159 from the connection points 169 of the upper and lower arms, upper arm signal terminals (signal emission electrode terminals) 155, upper arm gate electrode terminals 154, lower arm signal terminals (signal emission electrode terminals) 165, and lower arm gate electrode terminals 164. Furthermore, the power conversion device 200 has the DC connector 138 at its input side and the AC connector 188 at its output side, and is connected to the battery 136 and the motor-generator 192 via these two connectors 138 and 188, respectively. Furthermore, it would also be acceptable to provide power conversion devices having a circuit structure in which, for each phase, two upper and lower arm series circuits are connected in parallel, as circuits that generate the output for each phase of the three phase AC to be outputted to the motor-generator.

In this embodiment, the motor-generator 192 is controlled according to the PWM control method in, for example, the operational region in which the rotational speed of the motor-generator 192 is comparatively low (in the following, this will be termed the "PWM control mode"), while on the other hand, in the operational region in which the rotational speed of the motor-generator 192 is comparatively high, the motor-generator 192 is controlled according to the PHM control method that will be described hereinafter (in the following, this will be termed the "PHM control mode"). In the PWM control mode, the power conversion device 140 generates drive signals to control the continuity and discontinuity of the switching elements incorporated in the upper and lower arms using a carrier wave of a fixed frequency, such as that shown in FIG. 3.

In concrete terms, command values for the d and q axes of the motor-generator 192 are calculated by the microcomputer within the control circuit 172 on the basis of the target torque value or the target rotational speed that is inputted, and these are converted to voltage command values for the U phase, the V phase, and the W phase. And, for each phase, a sine wave corresponding to the voltage command value is taken as a fundamental wave, this is compared with a triangular wave of a predetermined period that constitutes a carrier wave, and a modulated wave in pulse form having a pulse width determined on the basis of the result of this comparison is outputted to the driver circuit 174. Thus, by outputting a drive signal corresponding to this modulated wave from the driver circuit 174 to the IGBTs 328 and 330 that correspond respectively to the upper and lower arms of each phase, the DC voltage outputted from the battery 136 is converted into three phase AC voltage, and is supplied to the motor-generator 192.

The details of PIM control will be explained hereinafter. The modulated waves generated by the control circuit 172 in the PHM control mode are outputted to the driver circuit 174. Due to this, drive signals corresponding to these modulated waves are outputted from the driver circuit 174 to the IGBTs 328 and 330 that correspond to each of the phases. As a result, the DC voltage outputted from the battery 136 is converted into three phase AC voltage, and is supplied to the motor-generator 192.

When converting DC power into AC power using switching elements, as in the case of the power conversion device 140, it is possible to reduce the switching losses by reducing the number of times switching is performed per unit time or per predetermined phase of the AC power; but the obverse is that the torque pulsations increase since there is a tendency for more harmonic components to be included in the AC power that is produced, so that there is a possibility that the responsiveness of motor control deteriorates. In particular, with the PHM control method, there is a tendency for distortion to be increased when frequency of AC power to be generated is low. Thus, with this embodiment, the PWM control mode the PHM control mode are selectively changed over according to the frequency of the AC power to which conversion is desired, or according to the rotational speed of the motor-generator 192 that is correlated with this frequency, or the like. In concrete terms, the PHM control method is applied in the high rotational speed region of the motor-generators 192 in which it is unlikely that serious influence will be experienced from the low order harmonic components, while the PWM control method is applied in the low rotational speed region in which it is quite likely for torque pulsations to be generated. By selectively using the PWM control method or the PHM control method like this, it is possible to suppress increase of torque pulsations to a comparatively low level, while at the same time it is possible to reduce the switching losses.

Figure 3:
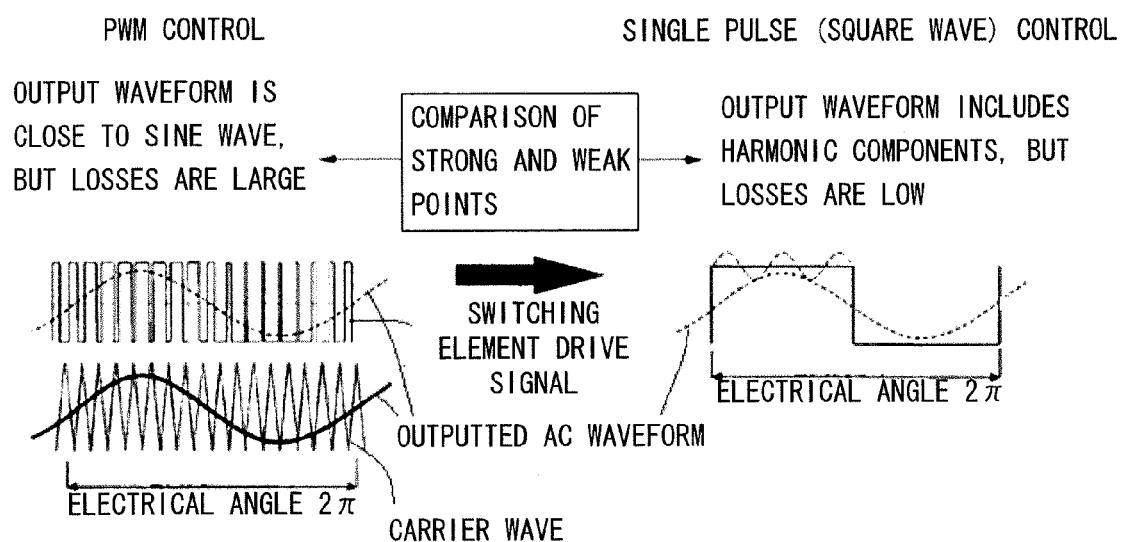
FIG. 3 is a figure for explanation of PWM control and square wave control.

It should be understood that there is a method of control by square waves, in which each of the switching elements is made continuous and discontinuous just once in each half cycle of the AC that is to be outputted, and this is the control mode for the motor-generator 192 for which the number of times that switching is performed is a minimum. This control by square wave is shown in FIG. 3. In the PHM control method described above, as the modulation index of the AC waveform to be outputted increases, the number of times that switching is performed in each half cycle naturally decreases, and finally reaches a state in which it is extremely low. As explained hereinafter, when the modulation index increases gradually, the number of times that the switching elements are switched in a half cycle of the AC output gradually decreases, and finally the number of times per half cycle that each switching element is made continuous becomes one. Accordingly, when PHM control is being performed, the transition to square wave control is accomplished smoothly, since the square wave control method may be viewed as the extreme case of the PHM control method. As a result it is possible to transition smoothly to square wave control, and during this transition the torque and the rotational speed generated by the motor-generator change smoothly. This point will be explained in more detail hereinafter.

In order to explain the PHM control method, first PWM control and square wave control will be explained with reference to FIG. 3. The left portion of FIG. 3 is a conceptual figure showing PWM control: first, the parameters of AC power for controlling the torque and the rotational speed of the motor-generator 192 on the basis of the control command inputted to the power conversion device are calculated, and these calculated values may be expressed as a waveform for the AC power that is to be outputted, as shown in the left portion of FIG. 3. In this method of controlling the continuity and discontinuity of the switching elements incorporated in the switching circuit, the magnitude of this AC waveform to be outputted described above and the magnitude of a carrier wave of a fixed frequency are compared together, and drive signals for controlling the continuity and discontinuity of the switching elements are generated on the basis of the results of this comparison. By using the PWM control method, it is possible to supply AC power that is comparatively free of pulsations to the motor-generator 192, and accordingly it becomes possible to control the motor-generator 192 so that it suffers a comparatively low level of torque pulsation. On the other hand, the number of times that the switching elements are switched per unit time or per each cycle of the AC waveform is high and as a result the switching losses are great, and this is a serious shortcoming.

And The right portion of FIG. 3 is a conceptual figure showing the square wave control method, which is very extreme as compared to the PWM method. With this square wave control method, a single square wave is outputted in each half cycle of the AC power that is to be outputted, calculated on the basis of the control command inputted to the power conversion device. With this square wave control method, there is the advantageous effect that the switching losses can be kept very low, since the number of times that the switching elements are switched becomes very small. The obverse of this is that the AC waveform of the AC power supplied to the motor-generator 192 has a square wave shape (if the influence of the inductance load is ignored), and this is a shape that includes harmonic components of the fifth order, the seventh order, the eleventh order . . . as well as the fundamental sine wave. When a square wave is Fourier expanded, in addition to the fundamental sine wave, also harmonic components of the fifth order, the seventh order, the eleventh order ... etc. appear. Current distortion is caused due to these harmonic components, and this in turn causes torque pulsations of the motor-generator 192. Thus, it will be seen that PWM control and square wave control have different strong points and weak points.

Figure 4A:
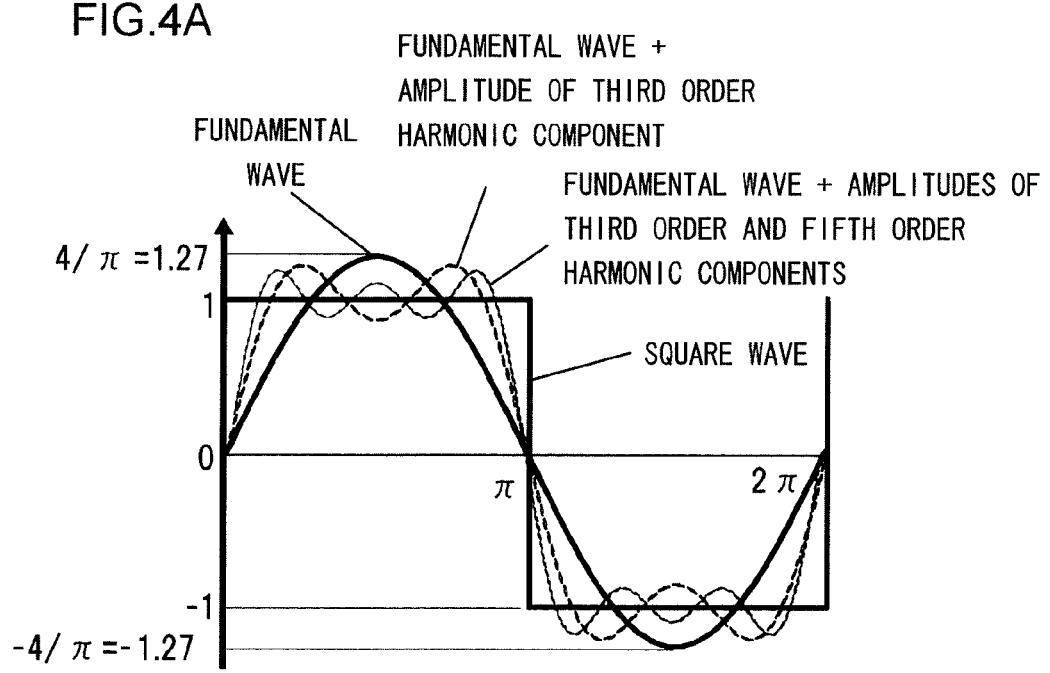
FIGS. 4A and B are a pair of figures showing an example of harmonic components generated during square wave control.
Figure 4B:
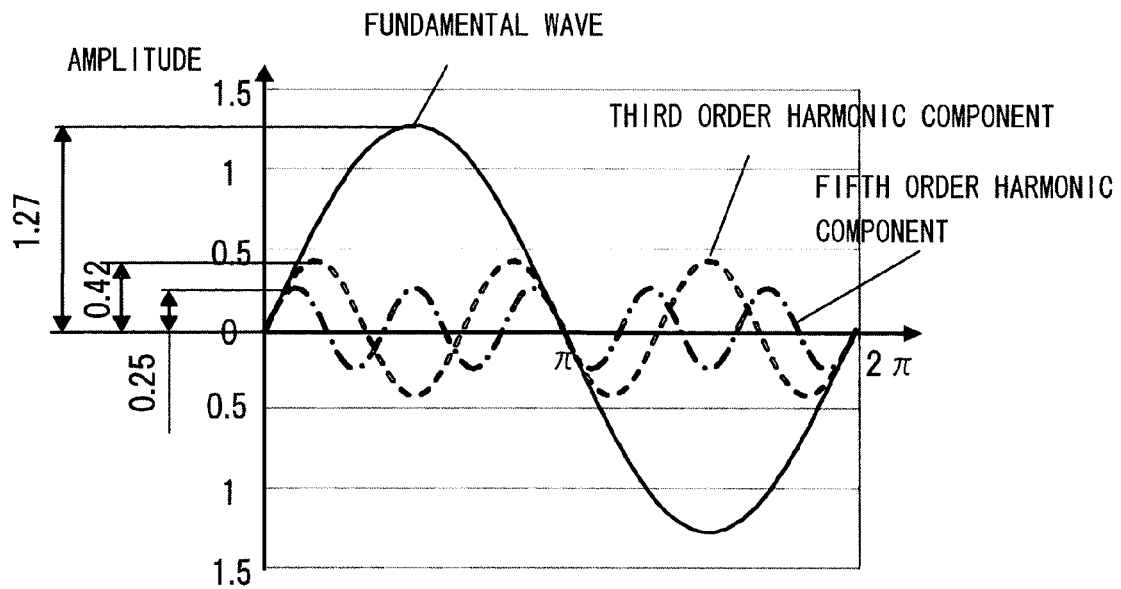

If AC power is generated by the square wave control method for control to make the switching elements go continuous and interrupted according to a square wave pattern, then an example of the harmonic components in the generated AC power is shown in FIGS. 4A and 4B. FIG. 4A is an example in which an AC waveform that varies in a square wave pattern has been decomposed into a sine wave (this is the fundamental wave) and harmonics of the fifth order, the seventh order, the eleventh order, . . . and so on. The Fourier series expansion of the square wave shown in FIG. 4A is as given by Equation (1):

$$f(\omega t)=4/\pi \times \{\sin \omega t+(\sin 3\omega t)/3+(\sin 5\omega t)/5+(\sin 7\omega t)/7+\ldots\} \quad (1)$$

Equation (1) shows that the square wave shown in FIG. 4A is made up from the fundamental sine wave given by $4/\pi \cdot \sin(\omega t)$ and components of the third order, the fifth order, the seventh order ... and so on, that are its harmonic components. It will be understood that, by combining higher order harmonic components with the fundamental wave in this manner, the result can be made to approach arbitrarily close to a square wave.

FIG. 4B shows the waveforms in which the amplitudes of the fundamental wave, the third order harmonic component, and the fifth order harmonic component are compared together. If the amplitude of the square wave of FIG. 4A is taken as unity, then the amplitude of the fundamental wave is 1.27, the amplitude of the third order harmonic component is 0.42, and the amplitude of the fifth order harmonic component is 0.25. Since the amplitude of each harmonic component becomes smaller in this manner as its order becomes higher, it will be understood that the influence that it exerts upon square wave control also becomes smaller.

From the point of view of torque pulsations, which ma by generated when the switching elements are made continuous and discontinuous in a square wave shape, by eliminating those harmonic components of lower order whose influence is large while ignoring the influence of those harmonic components of higher order whose influence is small and allowing them to remain, while the number of times that switching of the switching elements of the switching circuit is performed is increased as compared to the case of employing the square wave control method, it becomes possible to reduce the number of times that switching of the switching elements of the switching circuit is performed as compared to the PWM method, so that it is possible to reduce the switching losses entailed by performing switching a large number of times. Since the influence of higher order harmonic components in relation to torque pulsations is low, accordingly it is possible to implement a power converter that can suppress the increase of torque pulsations to a low level. With the PHM control used in this embodiment, AC output is produced in which, according to the state of control, the harmonic components included in a square wave AC current are somewhat reduced, and, due to this, the influence of torque pulsations upon control of the motor-generator 192 is restricted to a range in which no particular problem occurs during use, and it is also possible greatly to reduce the switching losses engendered by the number of times that switching is performed. As described above, in this specification, this type of control method is termed the PHM control method.

Next, a structure for the control circuit 172 for implementing the PHM control described above will be explained with reference to FIG. 5. It should be understood that, in order to control the motor-generator 192, the control circuit 172 described above has the capability of generating control signals for the switching elements of the switching circuit according to control methods of two types, and the control signals described above may be generated according to two formats, corresponding to these two types of control method. In the following, these two types of control method for the motor-generator 192 will be described in connection with the embodiments of the present invention.

-The First Embodiment-

Figure 5:
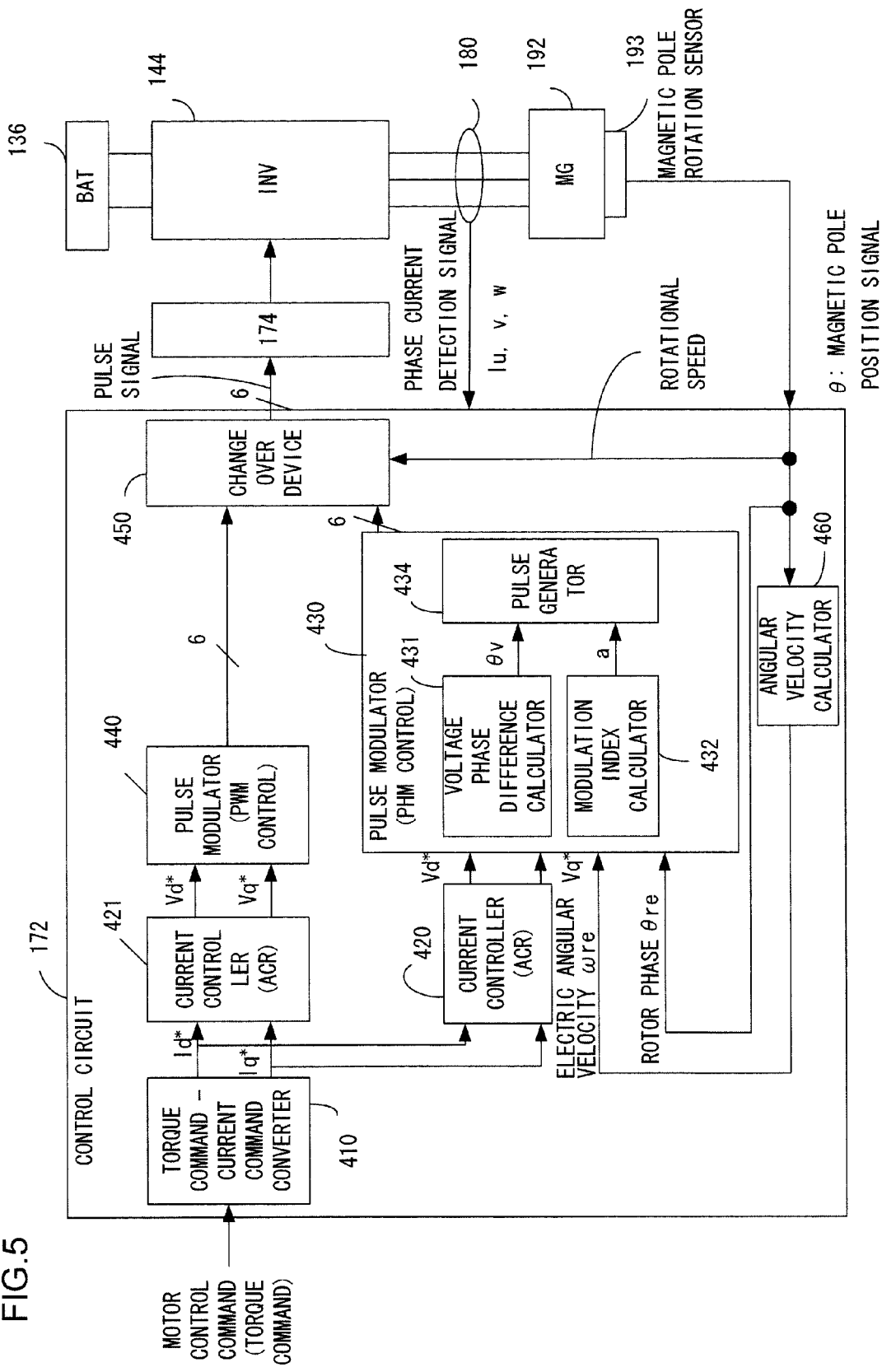
FIG. 5 is a figure showing a control system for a motor-generator.

A control system of the motor-generator 192 employing this control circuit 172 according to the first embodiment of the present invention are shown in FIG. 5. A torque command T* that provides a target torque value is inputted to the control circuit 172 by a higher level control device. Using data in a torque/rotational speed map that has been stored in advance, a current command converter 410 converts a torque command to a d axis current command signal Id* and a q axis current command signal Iq* on the basis of this torque command T* that has been inputted, and on the basis of an electric angular velocity $\omega$re that has been calculated by an angular velocity calculator 460 on the basis of a magnetic pole position signal $\theta$ detected by a magnetic pole rotation sensor 193. The d axis current command signal Id* and the q axis current command signal Iq* thus produced by the current command converter 410 are respectively outputted to current controllers (ACRs) 420 and 421.

On the basis of the d axis current command signal Id* and the q axis current command signal Iq* outputted from the current command converter 410, and on the basis of Id and Iq current signals obtained by phase current detection signals Iu, Iv, and Iw for the motor generator 192 detected by the current sensor 180 being converted to d and q axes by a three phase/two phase converter, not shown in the figures but incorporated in the control circuit 172, according to the magnetic pole position signal from a rotation sensor, the current controllers (ACRs) 420 and 421 respectively calculate a d axis voltage command signal Vd* and a q axis voltage command signal Vq*, so that the currents flowing to the motor-generator 192 track the d axis current command signal Id* and the q axis current command signal Iq*. The d axis voltage command signal Vd* and the q axis voltage command signal Vq* obtained by the current controller (ACR) 420 are outputted to a pulse modulator 430 for PHM control. On the other hand, the d axis voltage command signal Vd* and the q axis voltage command signal Vq* obtained by the current controller (ACR) 421 are outputted to a pulse modulator 440 for PWM control.

The pulse modulator 430 for PHM control includes a voltage phase difference calculator 431, a modulation index calculator 432, and a pulse generator 434. The d axis voltage command signal Vd* and the q axis voltage command signal Vq* outputted from the current controller 420 are inputted to the voltage phase difference calculator 431 and the modulation index calculator 432 in the pulse modulator 430.

The voltage phase difference calculator 431 calculates the phase difference between the magnetic pole position of the motor-generator 192 and the voltage phase of the d axis voltage command signal Vd* and the q axis voltage command signal Vq*, in other words the voltage phase difference. If this voltage phase difference is termed $\delta$, then the voltage phase difference $\delta$ is given by the following Equation (2):

$$\delta = \arctan(-Vd^*/Vq^*) \quad (2)$$

Furthermore, the voltage phase difference calculator 431 calculates a voltage phase by adding a rotor phase angle given by the magnetic pole position signal θ from the magnetic pole rotation sensor 193 to the above described voltage phase difference δ. And it outputs a voltage phase signal θv corresponding to this calculated voltage phase to the pulse generator 434. If the rotor phase angle given by the magnetic pole position signal θ is termed θre, then this voltage phase signal θv is given by the following Equation (3):

$$\theta v = \delta + \theta re + \pi \quad (3)$$

The modulation index calculator 432 calculates the modulation index by normalizing the magnitude of the vector given by the d axis voltage command signal Vd* and the q axis voltage command signal Vq* by the voltage of the battery 136, and outputs a modulation index signal a corresponding to this modulation index to the pulse generator 434. In this embodiment, the modulation index signal a described above is determined on the basis of the battery voltage supplied to the power switching circuit 144 shown in FIG. 2, i.e. the DC voltage, and, when the battery voltage becomes higher, this modulation index a has a tendency to become smaller. Moreover, when the amplitude value of the command value becomes high, the modulation index a has a tendency to become high. In concrete terms, if the battery voltage is termed Vdc, then the modulation index a is given by Equation (4). It should be understood that, in Equation (4), Vd is the value of the amplitude of the d axis voltage command signal Vd* and Vq is the value of the amplitude of the q axis voltage command signal Vq*.

$$a = (\sqrt{(2/3)})(\sqrt{(Vd^2 + Vq^2)})/(Vdc/2) \quad (4)$$

On the basis of the voltage phase signal θv from the voltage phase difference calculator 431 and the modulation index signal a from the modulation index calculator 432, the pulse generator 434 generates six pulse signals based upon PHM control corresponding to the upper and lower arms in the inverter circuit for the U phase, the V phase, and the W phase. And these pulse signals that have been generated are outputted to the changeover device 450, and (when the changeover device 450 is switched over to them) are outputted from the changeover device 450 to the driver circuit 174, and based thereupon drive signals are generated and outputted to the switching elements. It should be understood that the method by which the pulse signals are generated on the basis of PHM control will be explained in detail hereinafter. In this specification, these pulse signals may be termed "PHM pulse signals" specifically, in addition to "pulse signals" simply.

On the other hand, by a per se known PWM method, the pulse modulator 440 for PWM control generates six pulse signals based upon PWM control (hereinafter termed "PWM pulse signals") for controlling each switching elements of the upper and lower arms for the U phase, the V phase, and the W phase on the basis of the d axis voltage command signal Vd* and the q axis voltage command signal Vq* outputted from the current controller 421, and on the basis of the electric angular velocity ωre that has been calculated by the angular velocity calculator 460 on the basis of the magnetic pole position signal θ from the magnetic pole rotation sensor 193. By these six PWM signals, the switching elements are controlled to go continuous or discontinuous. The PWM pulse signals that have been generated are outputted to the changeover device 450.

The changeover device 450 selects either the PHM pulse signals outputted from the pulse modulator 430 for PHM control or the PWM pulse signals outputted from the pulse modulator 440 for PWM control, and outputs pulse signals to the driver circuit 174 on the basis of the signals that have been selected. The driver circuit 174 generates the drive signals for control of the switching operations of the switching elements on the basis of the pulse signals that are selected by the changeover device 450, and supplies current to each gate of the switching elements. This selection of pulse signals by the changeover device 450 is performed according to the rotational speed of the motor-generator 192 and so on, as previously described. For example, if the rotational speed of the motor-generator 192 is less than a predetermined threshold value that has been set as a changeover line, then the pulse signals generated by the pulse modulator 440 using the PWM method are selected. Thus, when the rotational speed of the motor-generator 192 is less than the threshold value, the power conversion device 140 controls the motor-generator 192 with the PWM control method. On the other hand, if the rotational speed of the motor-generator 192 is high, then the pulse signals generated by the pulse generator 434 are selected by the changeover device 450, and thus the power conversion device 140 controls the motor-generator 192 with the PHM control method.

While the PHM control method provides the beneficial effect that it is possible to reduce the number of times that the switching elements of the switching circuit are switched, there is the problem that distortion or the like can easily be generated in a state in which the frequency of the AC to be outputted is low, since the switching operations are performed on the basis of the phase of the AC to be outputted. Thus, by employing a per se conventional PWM control method in the state in which the frequency of the AC to be outputted is low, the advantageous effect is obtained that it is possible to improve the control characteristics.

As has been explained above, either the PHM pulse signals or the PWM pulse signals are outputted from the control circuit 172 to the driver circuit 174. On the basis of these pulse signals that are outputted, the driver circuit 174 outputs the drive signals to each IGBTs 328 and 330 of the power switching circuit 144.

Figure 6:
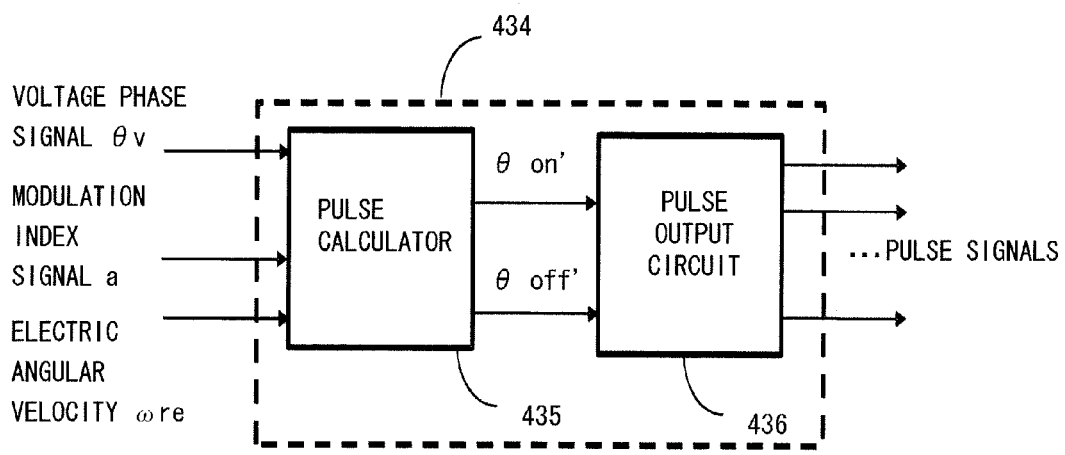
FIG. 6 is a figure showing the structure of a pulse generator.
Figure 7:
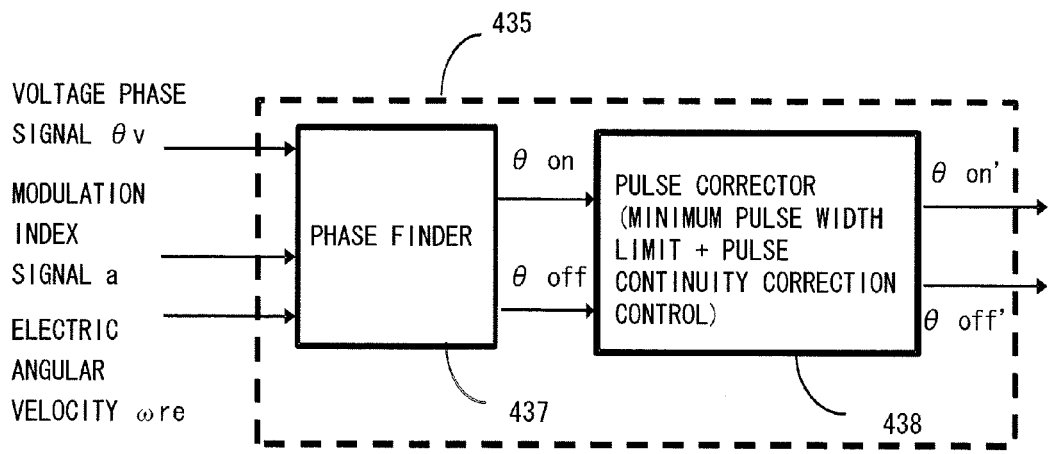
FIG. 7 is a figure showing the structure of a pulse calculator.

Now, the details of the pulse generator 434 of FIG. 5 will be explained. In this embodiment, as for example shown in FIG. 6, the pulse generator 434 includes a pulse calculator 435 and a pulse output circuit 436 that generates pulse signals on the basis of the results of calculation by this pulse calculator 435. As shown for example in FIG. 7, the pulse calculator 435 includes a phase finder 437 and a pulse corrector 438. In this embodiment, the functions of the current command converter 410, the current controller (ACR) 420, the current controller (ACR) 421, the voltage phase difference calculator 431, and the modulation index calculator 432 in FIG. 5, and of the phase finder 437 and the pulse corrector 438 in FIG. 7, are performed by processing executed by a processor that operates according to a control program. Furthermore, the pulse modulator 440 includes a calculation unit and a pulse output unit as shown in FIG. 6, and the calculation unit of the pulse modulator 440 also is implemented by processing executed by a processor that operates according to a control program. Moreover, in this specification, apart from actual algebraic calculations, also processing is included for comparison of magnitudes and finding values from data tables and so on, and these processes are also termed "calculation".

Figure 53:
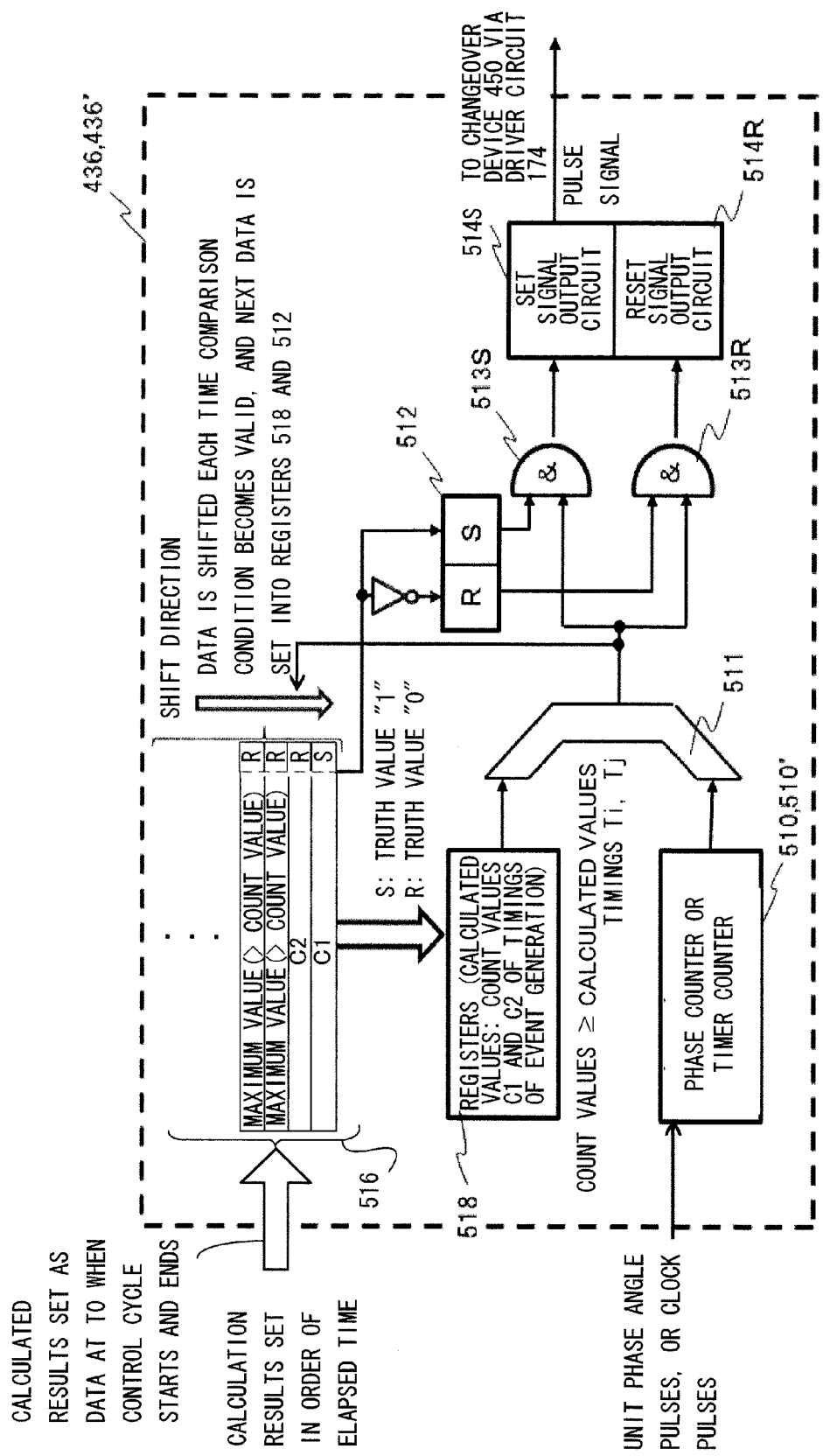
FIG. 53 is a circuit diagram showing an example of a pulse output circuit.

The rising phase θon' and the falling phase θoff' for generating pulse signals, which are the results of calculation by the pulse calculation unit as described above, are inputted to the pulse output circuit 436 for generating pulse signals, and this circuit 436 outputs corresponding pulse signals to the switching elements of the power switching circuit. The detailed circuitry of the pulse output circuit 436 of FIG. 6 is shown in FIG. 53. It should be understood that, since the circuit for generating the pulse signals for each of the switching elements from the results of calculation related to continuity and discontinuity (i.e. interception) of the switching elements outputted by the pulse calculator 434 operates in the same manner with the same circuitry for each of the switching elements, accordingly only the circuit for generating one of these pulse signals for one of the switching elements will here be disclosed and explained as a representative, and description of the other similar circuits will be omitted in order to save needless repetition. Moreover, the pulse modulator 440 also fundamentally includes a pulse calculator and a pulse output circuit as shown by the structure of FIG. 6, and this pulse output circuit is a similar circuit to the one shown in FIG. 53.

On the basis of the voltage phase signal θv from the voltage phase difference calculator 431, the modulation index signal a from the modulation index calculator 432, and the electric angular velocity signal ωre from the angular velocity calculator 460, the phase finder 437 of FIG. 7 finds the rising phases θon and the falling phases θoff of the pulse signals for the upper and lower arms of the U phase, the V phase, and the W phase from a table of pulse signal phase information that has been stored in advance, and outputs the results of this table lookup to the pulse corrector 438. Here, these pulse signals are signals that are employed for the continuity operation of each of the IGBTs 328 and 330, that are the six switching elements incorporated in the power switching circuit 144 of FIG. 2. When, on the basis of these pulse signals, drive pulses are applied from the driver circuit 174 to the gate terminals of the IGBTs 328 and 330, the IGBTs to which they are applied go to continuous during the intervals that the corresponding pulse signals go to high level (i.e. during the intervals that their truth values are "1"). Here, by the pulse signals being high level means, not intervals in which their voltage values are high or low, but the intervals in which they make the switching elements continuous; and the pulse signals being low level (i.e. having truth values "0") means, not intervals in which their voltage values are high or low, but the intervals in which they make the switching elements discontinuous. The pulse corrector 438 performs pulse correction processing or the like, in other words minute adjustment, in order to implement minimum pulse width limitation and pulse continuity compensation for the rising phases θon and the falling phases θoff obtained by the calculations performed by the phase finder 437 for data lookup, and the results are outputted to the pulse output circuit 436 as rising phases θon' after correction and falling phases θoff' after correction of the pulses. Here, the phase θon and the phase θon' mean positions (i.e. timings) at which the pulse signal changes to high level (i.e. to truth value "1"), and, similarly, the phase θoff and the phase θoff' mean positions (i.e. timings) at which the pulse signal changes to low level (i.e. to truth value "0"). In concrete terms, the phase θon and the phase θon', and the phase θoff and the phase θoff', mean values counted by a phase counter 510 of FIG. 53 for determining timings, and, if instead of a phase function the result of calculating a time function were outputted, then the phase counter 510 would operate as a timer counter 510' that counts clock pulses, instead of counting pulses on the basis of a unit phase angle as described above.

On the basis of the rising phases θon' and the falling phases θoff' of the pulses after correction outputted from the pulse corrector 438 of the pulse calculator 435, the pulse output circuit 436 generates pulse signals corresponding to each of the switching elements, for commanding the upper and lower arms for the U phase, the V phase, and the W phase to perform switching operation. The six PHM pulse signals to each of the upper and lower arms created by the pulse output circuit 436 are outputted to the changeover device 450, as previously described, and are supplied to the gates of the IGBTs shown in FIG. 2 via the changeover device 450 and the driver circuit 174.

Figure 8:
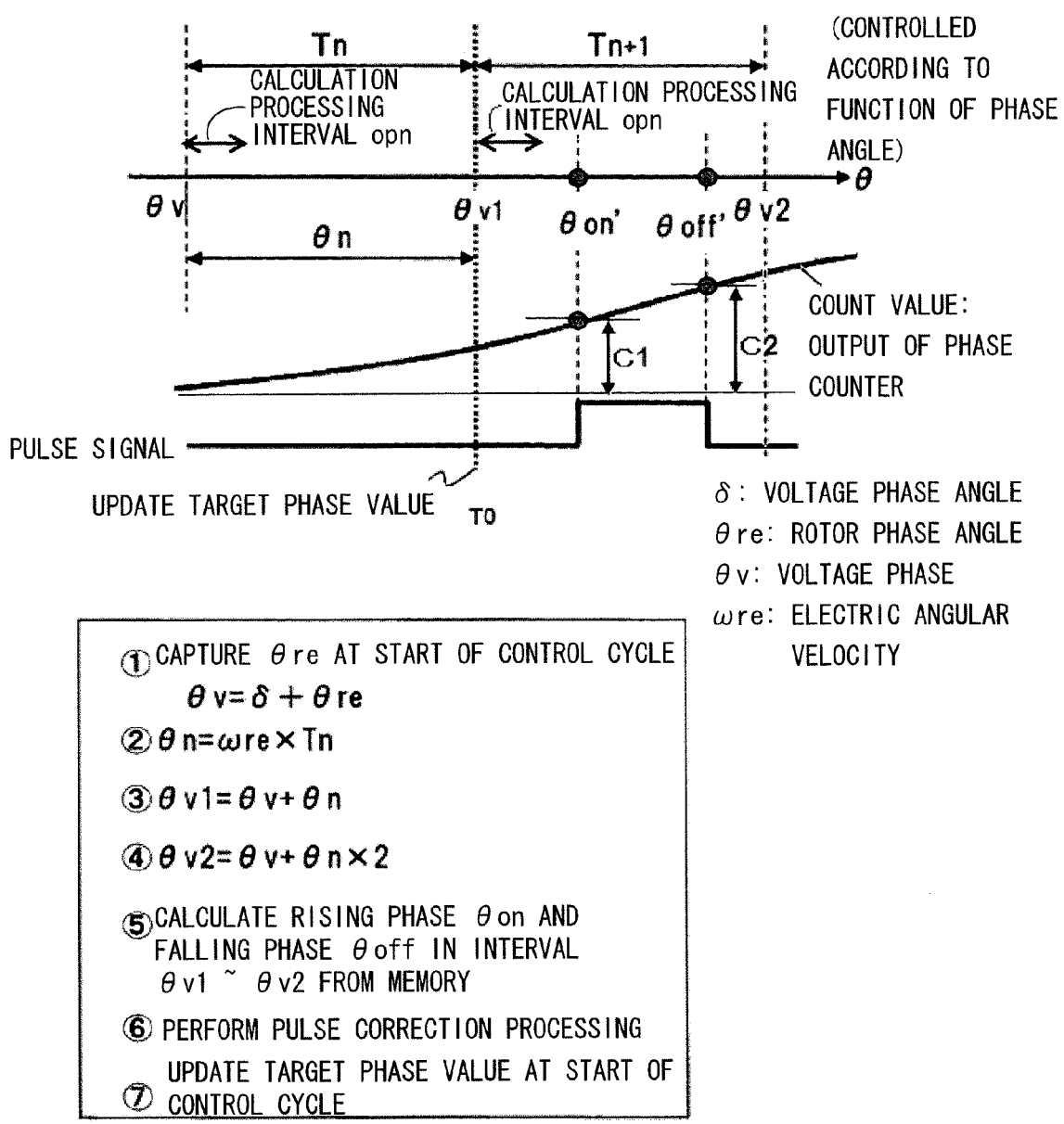
FIG. 8 is a figure showing the basic operation of a pulse generator.
Figure 52:
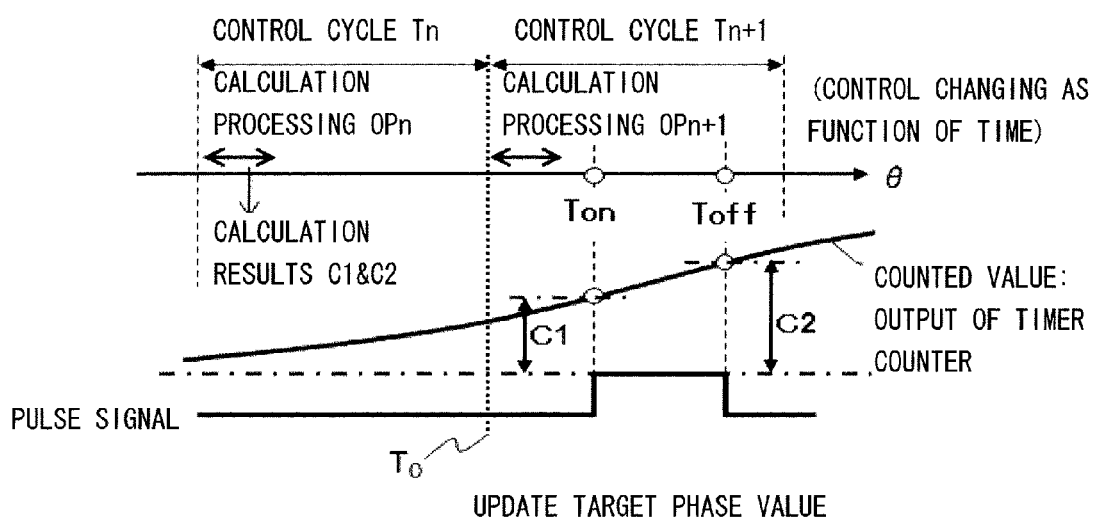
FIG. 52 is a figure showing operation of a pulse generator according to a timing function.

The basic operation of the pulse generator 434 of this embodiment will now be explained with reference to FIGS. 8 and 52. While FIG. 8 and FIG. 52 show basically the same contents, FIG. 8 is an example that operates on the basis of a function of phase angle, while in FIG. 52 the phase angle has been converted to a function of time, so that this figure is an example that operates on the basis of a function of time. The operation according to a function of time is fundamentally the same as the operation according to a function of phase angle, but the result of calculation as a function of phase angle is converted into a function of time using data for the rotational speed, and is then inputted to the pulse output circuit. In this case it is possible to generate count values to be subjects for comparison with the results of calculation by using a timer counter that counts clock pulses, so that there is the beneficial effect that the circuitry becomes simpler.

With the control system for the motor-generator 192 shown in FIG. 5, the control period T for the motor-generator 192 is determined according to performance requests from the control system or the like. This control period T may, for example, be of the order of several hundreds of μs. The calculation processing of FIG. 7 described above is executed in each control cycle, and the rising phases θon' and the falling phases θoff' of the pulse signals to be generated during the next control cycle are calculated. The operation for generating the pulse signals on the basis of these calculation results will now be explained using FIGS. 8 and 52.

Now, it is supposed that the timing for executing the calculation processing of FIG. 7 is at the time point that the control cycle Tn−1 ends, in other words at the start timing of the control cycle Tn. Although this is not shown in the figure, it should be understood that calculation is performed in the control cycle Tn−1 for the pulse signals that are to be generated in the interval of the control cycle Tn, and the results of this calculation are temporarily stored in a working memory (i.e. a RAM). Since it happens that, in the examples shown in FIGS. 8 and 52, no pulse signals are generated in the control cycle Tn, accordingly the result of the calculation in the control cycle Tn−1 is that no details for generating any pulse signals are provided.

In this embodiment, the calculation interval for the pulse signals that are to be generated in the control cycle Tn is the control cycle Tn−1, and the results of this calculation are read out from the working memory (i.e. the RAM) at the start of the next control cycle Tn, and are set in the pulse output circuit 436 of FIG. 6. FIG. 53 shows an example of the detailed circuitry for this pulse output circuit 436 of FIG. 6: the above-mentioned calculation intervals are set in registers 516 of FIG. 53. On the basis of these calculation results that have been set, the pulse output circuit 436 shown in FIG. 6 or FIG. 53 operates and the pulse signals are outputted. However since, as described above, in this case the calculation result written into the register 516 is data having the significance that no pulse signals are to be outputted, accordingly the pulse output circuit 436 does not generate any pulse signals in this particular control cycle Tn. While in this embodiment the timing at which the calculation results are set into the pulse output circuit 436 of FIG. 6 or FIG. 53 is the start timing of the control cycle, this is only an example; it would also be acceptable for these calculation results to be set, not when the control cycle Tn starts, but at the end of the calculation in the previous control cycle Tn−1. For example, it would be acceptable to arrange for the new calculation results to be inputted after the rising phases θon' and the falling phases θoff' already stored in the registers 516 of FIG. 53. The operation of outputting the pulse signals is performed on the basis of the calculation results, since the pulse output circuit 436 outputs pulse signals based upon the inputted calculation results in the order that they were inputted. In other words the situation will be satisfactory provided that the calculation results are set into the pulse output circuit 436, before the timings at which the pulse signals based upon the calculation results are to be generated.

On each control cycle, the pulse calculator 435 of the pulse generator 434 repeatedly calculates the rising timings and the falling timings for the pulse signals, in order to control the operation of the IGBTs 328 and 330, i.e. of the switching elements. As described above, the calculation function of the pulse generator 434 is actually implemented by processing performed by a computer that operates according to a computer program. Since the computer described above also executes other programming that is necessary for the system, and not only the programming of the embodiment of the present application, accordingly the computer described above completes the calculation described in FIG. 7 (FIG. 9) in a relatively short interval within the control cycle described above. This calculation processing of FIG. 7 (FIG. 9) is performed repeatedly in each execution cycle. For the calculation processing of FIG. 7, the details of the processing by the phase finder 437 are, in concrete terms, shown in the steps 801 through 805 of FIG. 9, and the details of the processing by the pulse corrector 438 are, in concrete terms, shown in the step 806 of FIG. 9 and in FIG. 14. The calculation interval for the computer described above is shown as being the calculation processing interval opn in FIGS. 8 and 52.

Calculations related to the pulse signal to be generated in the control cycle Tn+1 are performed in the calculation processing interval opn of the control cycle Tn. When the control cycle Tn starts, the calculation results obtained in the previous calculation cycle Tn−1 by the pulse calculator 435 are set, and then the next calculation of FIG. 7 (FIG. 9) is executed. Moreover, the calculation related to the pulse signals to be generated in the control cycle Tn+2 are executed in the calculation processing interval opn of the control cycle Tn+1.

In the calculation processing interval opn of the control cycle Tn, the rotor phase angle θre is acquired by the voltage phase difference calculator 431. On the basis of this rotor phase angle θre, the voltage phase is calculated by the voltage phase difference calculator 431 according to Equation (3) described above, and a voltage phase signal θv is outputted to the phase finder 437 of the pulse generator 434. And, from this voltage phase signal θv and the electric angular velocity signal ωre from the angular velocity calculator 460, the phase finder 437 of the pulse generator 434 calculates the start phase θv1 and the end phase θv2 of the next control cycle Tn+1, and then calculates the rising phase θon and the falling phase θoff within this range by looking them up in a table in the memory in which results of calculations are stored in advance. Then, on the basis of this rising phase θon and falling phase θoff, the rising phase θon' and falling phase θoff' after pulse correction processing are calculated by the pulse corrector 438. And, on the basis of the results of this calculation, pulse signals are outputted by a compare and match function with the phase counter of the pulse output circuit 436. It should be understood that, as described above, FIGS. 8 and 53 are given as examples, and they show the operation to generate one of the six pulse signals for controlling the continuity operation of one of the six switching elements.

In the calculation processing for the control cycle Tn by the operation shown in FIG. 8, count values C1 and C2 of the counter 518 (see FIG. 53) for determining the timings of the rising phases θon' of the pulse signals and the falling phases θoff' of the pulse signals in the control cycle Tn+1 are determined by calculation. And, in FIG. 52, count values C1 and C2 that correspond to the functions of time Ton and Toff corresponding to the timings of the rising phases θon' of the pulse signals and the falling phases θoff' of the pulse signals are obtained by calculation. Along with setting in the registers 516 these values C1 and C2 for determining the phases θon' and θoff' or the times Ton and Toff that are the results of the above calculation, contents based upon the results of the calculation are set in bits (the R/S portions of the registers 516) that designate whether the pulse signals are falling or rising. For example a binary "0" (i.e. "R") in the R/S portion may mean that the corresponding pulse signal is falling, while a binary "1" (i.e. "S") may mean that it is rising.

When the control cycle Tn+1 starts, the calculated value C1 and "S" and the calculated value C2 and "R" based upon the calculated results are inputted in order into the registers 516. On the basis of this inputted data, the calculated value C1 is stored in registers 518, and the signal "S" is inputted to a flip-flop 512. The flip-flop 512 goes into the set state on the basis of the "S" signal in the data initially inputted to the registers 516, so that a set signal "1" is transmitted to an AND gate 513S, while on the other hand a signal "0" is sent to an AND gate 513R, so that the AND gate 513S goes into the opened state. On the other hand, the AND gate 513R goes into the closed state.

The counter 510 counts pulse signals that represent unit phase angles. As shown in FIG. 8, if the calculated value C1 is a function of angle, then the counter 510 counts pulse signals that give unit phase angle.

At the phase θon', the count value of the counter 510 and the value in the register 518 agree with one another, and the output of the comparator 511 is inputted to the flip-flop 514S via the gate 513S, so that the output of the flip-flop 514S rises. A pulse signal is supplied to the driver circuit 174 from the flip-flop 514, a drive current is supplied to the corresponding switching element from the driver circuit 174, and the corresponding switching element goes into the continuous state. At the rising timing of the pulse signal, due to the output of the flip-flop 512, the gate 513S opens while the gate 513R closes. On the other hand, with falling data as the calculation result, the flip-flop 512 goes into the reset state, and the gate 513S closes while the gate 513R opens.

When the output of the comparator 511 is generated at the timing of the phase θon' described above, along with the flip-flop 514 going into the set state due to the output of the comparator, also a signal is sent to the register 516, and the data in the register 516 is shifted towards the register 518, so that the calculation result C2 is inputted to the register 518, a signal "R" that means "falling" is inputted to the flip-flop 512, and a signal "1" is sent from the reset side of the flip-flop 512 to the gate 513R. Thus the gate 513S closes while the gate 513R opens. And at the timing of the phase θoff', the output of the comparator 511 is inputted via the gate 513R to the reset side of the flip-flop 514, and the output pulse from the flip-flop 514 falls. Due to this operation, the pulse signal shown in FIG. 8 or FIG. 52 is generated.

It should be understood that since the pulse generated in the interval of the control cycle Tn+1 ends here, for example, values greater than the count value of the counter 510 may be inputted into the remaining portions of the registers 516. And, due to the output of the comparator 511 at the timing of the phase θoff', a value that is larger than the maximum count of the counter is stored in the register 516. However subsequently, until the data in the registers 516 is rewritten, the condition of the comparator 511 does not become valid, so that no output signal is generated.

The details of the operation of the pulse calculator 435 of FIGS. 6 and 7 described above will now be explained with reference to the flow chart of FIG. 9. The program for performing the operations in this flow chart starts its execution simultaneously with the start of a control cycle of FIG. 8 or FIG. 52. In a step 801, the calculation results that were calculated in the previous cycle and that have been temporarily stored in the RAM memory are inputted to the pulse output circuit 436. In other words the calculation results are inputted to the registers 516 of FIG. 53. Next in a step 802 the voltage phase signal θv from the voltage phase difference calculator 431, the modulation index signal a from the modulation index calculator 432, and the electric angular velocity signal ωre from the angular velocity calculator 460 are acquired by the phase finder 437 within the pulse calculator 435. Then in a step 803 the phase change amount θn per one control cycle is calculated by the phase finder 437, by multiplying the electrical angular velocity ωre acquired in the step 801 by the length of the control cycle Tn. Next in a step 804 the end phase of this control cycle Tn, in other words the start phase θv1 of the next control cycle Tn+1, is obtained by the phase finder 437 by adding the phase change amount θn calculated in the previous step 803 to the voltage phase θv acquired in the step 802. Furthermore, by adding twice the value of the phase change amount θn to the voltage phase θv, the end phase θv2 of the next control cycle Tn+1 is obtained.

In the step 805, the rising phase θon and the falling phase θoff within the interval of the next control cycle Tn+1, in other words from its start phase θv1 to its end phase θv2, are calculated by the phase finder 437, on the basis of a table of phase information that is stored in the memory. The phase finder 437 performs searching of the ROM at this time. In this ROM lookup, on the basis of the modulation index a acquired in the step 801, and within the range of voltage phase calculated in the step 803, the rising phase that prescribes the timing for switching ON and the falling phase that prescribes the timing for switching OFF are looked up from a table that is stored in advance within a ROM (not shown in the figures). An example of such a table of rising phases and falling phases that is used for this ROM lookup is shown in FIG. 10. Here, there is shown an example in which the rising phases and the falling phases for various modulation indices from MF1 to MFn have been laid out as a table. The rising phases θon and the falling phases θoff calculated in this step 805 are outputted to the pulse corrector 438.

Then in a step 806 pulse correction processing is performed by the pulse corrector 438 within the pulse calculator 435, in order to implement minimum pulse width limitation and pulse continuity compensation upon the rising phase θon and the falling phase θoff calculated in the step 805. And the rising phase θon' and the falling phase θoff' of the pulse after correction are outputted to the pulse output circuit 436. The details of this pulse correction processing will be explained in concrete terms hereinafter. After the processing described in the steps 801 through 806 explained above being executed on the basis of the start condition for this control cycle, the calculation results are inputted to the pulse output circuit 436, and pulse signals are sent from the pulse output circuit 436 to the changeover device 450.

Next, the pulse correction processing performed in the step 806 of FIG. 9 will be explained. As previously described, this pulse correction processing is executed by the pulse corrector 438 in order to impose minimum pulse width limitation and pulse continuity compensation upon the NAM pulses that are generated. By a minimum pulse width is meant that, if the pulse width that corresponds to the rising phase θon and the falling phase θoff calculated in the step 805 is less than a predetermined minimum pulse width, then that minimum pulse width is outputted as being the width of a minimum pulse. At this time, the minimum pulse width is determined according to the response speeds of the IGBTs 328 and 330, which are the switching elements, or the like. And by pulse continuity compensation is meant that, if the pulse continuity would not be maintained without adjustment since the pulse pattern has changed between the pulse waveform generated on the basis of the previous control cycle and the pulse waveform that is to be generated for this control cycle, then the pulse waveform is altered before being outputted, in order to maintain continuity of the pulses, or in order to avoid the occurrence of an anomaly, or in order for the operational characteristics not to be deteriorated. It should be understood that this type of alteration of the pulse pattern can occur due to change of the input values for calculation, in particular when the state of the motor-generator 192 changes abruptly due to some cause such as a disturbance or the like, or when the control mode is changed over, or the like.

Figure 11:
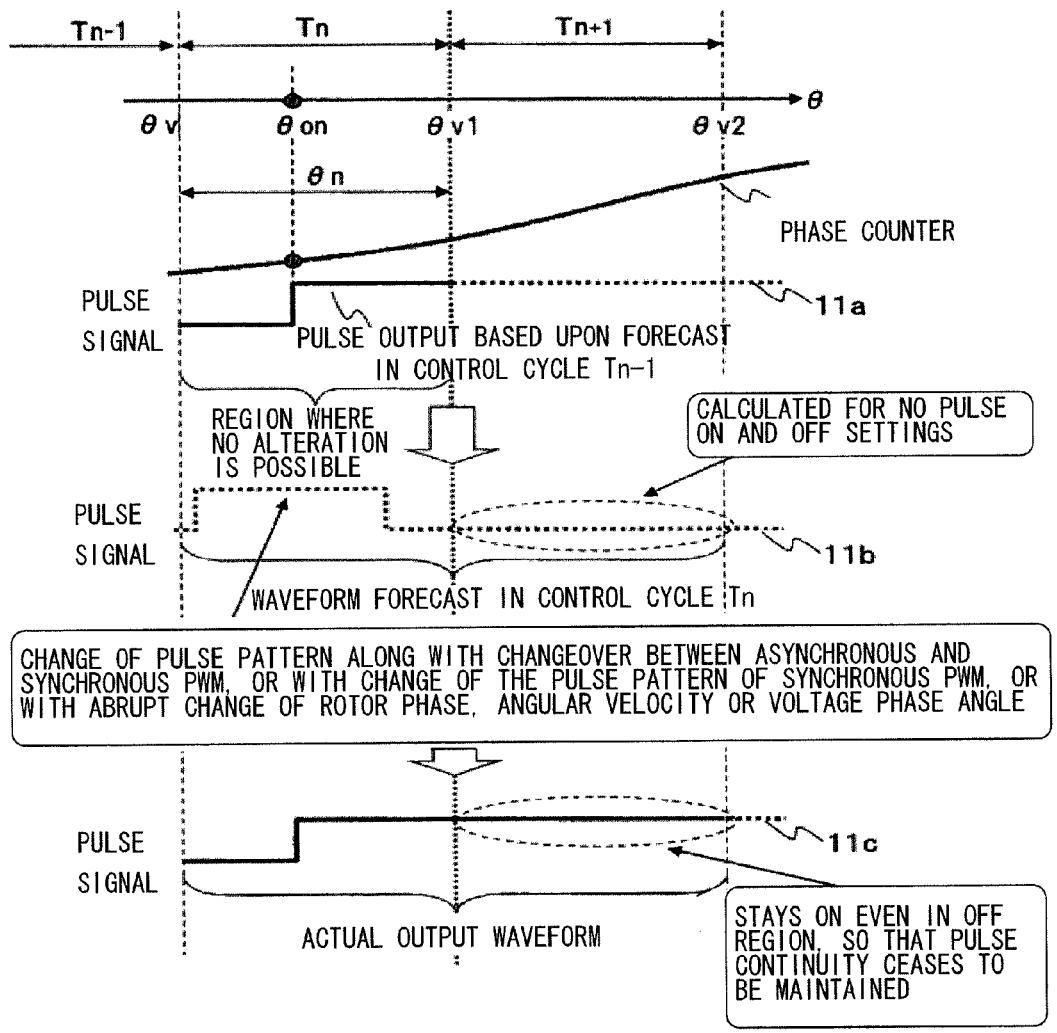
FIG. 11 is a figure showing an example of a pulse signal waveform that is outputted when pulse continuity compensation is not being performed.

FIG. 11 shows an example in which change of the pulse pattern of the pulse signal takes place when the continuity compensation described above is not being performed. We suppose that, in the control cycle Tn−1, the rising phase θon is calculated by the method described above, and then in the control cycle Tn the pulse signal 11a shown by the solid line is outputted. This pulse signal 11a is the result that has already been calculated in the control cycle Tn−1, and it cannot be changed by the calculations performed in the control cycle Tn. Due to change of the input parameters for the control cycle Tn as compared to those for the previous control cycle, change of the results of calculation in the control cycle Tn takes place as compared to the state in the previous control cycle Tn−1. In the example shown in FIG. 11, the pulse signal 11a based upon the calculations in the previous control cycle Tn−1 takes the values shown by the solid line in the control cycle Tn and further was projected to fall in the next control cycle Tn+1 shown by the dotted line portion; and the position where it falls was projected to be calculated in the control cycle Tn. However, due to change of the input parameters, the result calculated in the control cycle Tn has changed to the waveform of the pulse signal 11b falling in the control cycle Tn, which cannot actually be produced by the calculation in the control cycle Tn. If the input parameters change in this manner along with change of the state of the motor-generator or the like, then the problem arises that it is not possible to maintain continuity of the pulse signals between successive control cycles.

In the calculation in the control cycle Tn, calculation is performed relating to the pulse signal 11b to be generated in the control cycle Tn+1, and, in the case shown in FIG. 11, the result is that no change takes place of the rising or falling in the waveform of the pulse signal 11b to be generated in the next control cycle Tn+1. Since no rising phase θon or falling phase θoff is present in this pulse signal 11b during the control cycle interval Tn+1, the possibility might arise that no setting of data takes place, or that a situation arises in which a larger value than the maximum value of the counter 510 of FIG. 53 is newly inputted, so that no operation is performed for generating rising and falling timing pulses from the comparator 511, or the like.

However, with the pulse waveform 11a that has already been outputted in the control cycle Tn, since at the phase θv1 it is not at OFF (low level) but at ON (high level), accordingly the pulse signal 11c that is actually outputted from the pulse output circuit 436 undesirably becomes ON (high level) although it ought really to be at OFF (low level) in the control cycle Tn+1; and this is different from the result of the calculation, and the problem arises that an anomalous pulse signal that is continuously at high level over a long interval is outputted. For example, if the pulse signal continues at high level for a long interval, the continuity time period of the corresponding switching element becomes abnormally long, and problems may arise, such as the value of the current increasing abnormally or the like, that can entail the further problem of safety being compromised.

Figure 12:
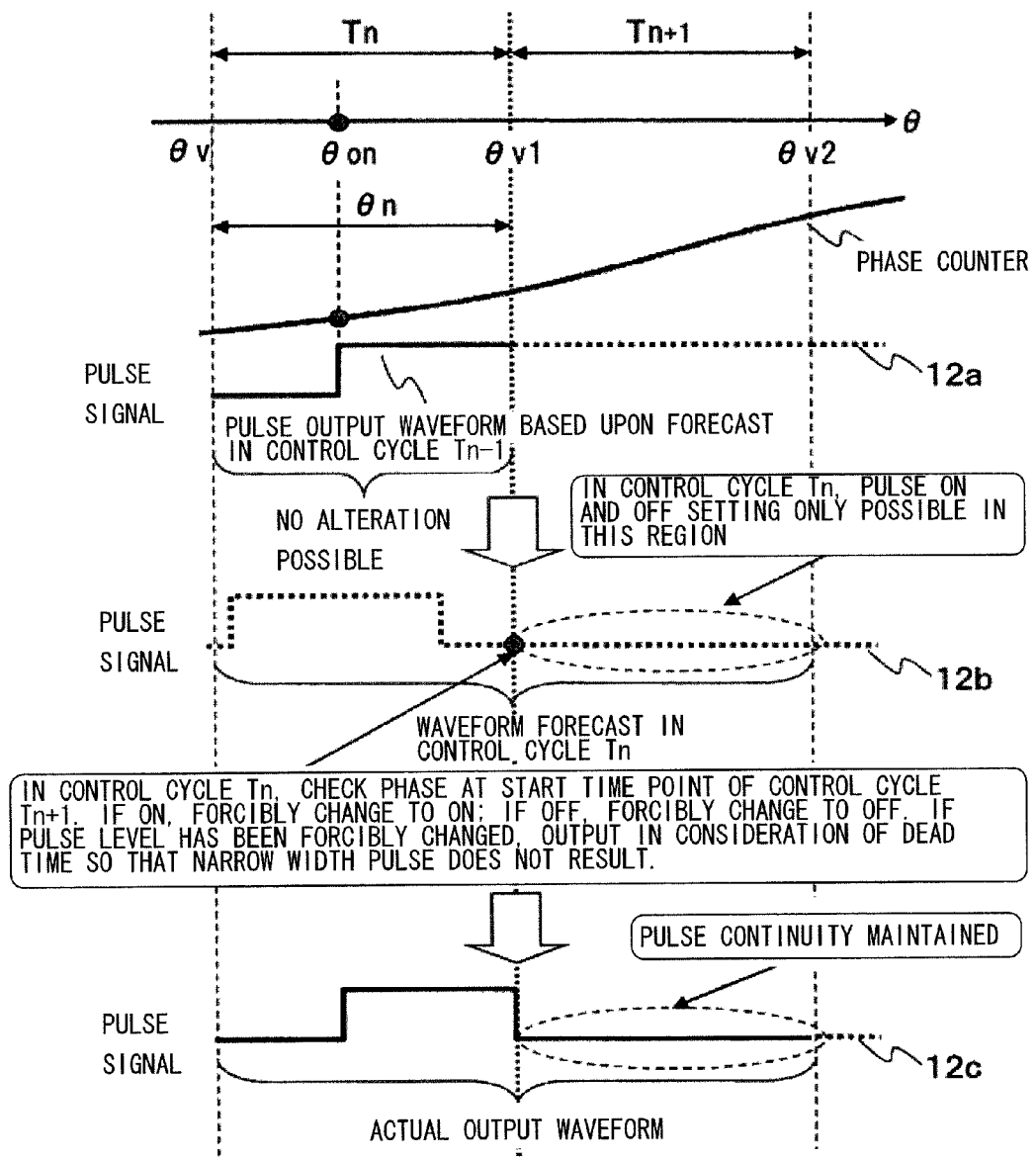
FIG. 12 is a figure showing an example of a pulse signal waveform that is outputted when pulse continuity compensation is being performed.

FIG. 12 shows the pulse signal that is outputted when pulse signal continuity compensation is being performed in order to solve the problems described above related to continuity of pulse signals that straddle over several control cycles. In this case, when the pulse signal 12b for the next control cycle Tn+1 is calculated in the control cycle Tn, the state of the pulse signal 12b (high level or low level) at the phase θv1 that is the start position of operation to generate this pulse signal and, in this embodiment, the start position of the control cycle, in other words the control state of continuity or discontinuity of the IGBTs 328 and 330, which are the switching elements, is checked, and is compared with the pulse signal 12a for the control cycle Tn. If, as a result, the states of the signal level (high or low) of the pulse signal 12a and of the pulse signal 12b do not agree with one another at the phase θv1, so that the pulse signals at the boundary between successive control cycles are in a discontinuous relationship, then correction processing is performed. The pulse signal after this correction processing is given by the pulse signal 12c. Processing is performed so as forcibly to match the state of the level (high or low) of the pulse signal 12c at the phase θv1 to the state of the level of the previous pulse signal (high or low). By doing this, it is possible to solve the problem of discontinuity of the pulse signal.

Although this matter has been mentioned previously, in this specification, the high level of the pulse signal, i.e. of the high one of the two values thereof, is a signal meaning that the corresponding switching element is put into the continuous state. Moreover, the other of the two values of the pulse signal (i.e. of the low level thereof) is a signal meaning that the corresponding switching element is put into the discontinuous state. The high level and the low level of the pulse signal mean the two logical values described above, and do not necessarily directly mean that the actual voltage value of the pulse signal is high or low.

In FIG. 12, at the phase θv1 that is the timing of writing the new calculation result into the pulse output circuit 436, if the pulse signal 12a is at high level and the pulse signal 12b is at low level, then the above described correction operation is performed. In this case, operation is performed so as forcibly to make the pulse signal 12c after correction go to at low level at the phase θv1. For example, data to establish the falling phase θoff of the pulse after correction at the phase θv1 is newly set to the pulse output circuit 436. On the other hand if, oppositely to the details shown in FIG. 12, at the phase θv1, i.e. at the time point that the control cycle changes over, the pulse signal 12a is at low level and the pulse signal 12b is at high level, then the pulse signal 12d after correction is forcibly set to high level at the phase θv1. In this case, data is set to establish the phase θon' so that the pulse signal after correction rises at the phase θv1. It should be understood that it is possible to resolve any problems originating in discontinuity of the pulse signal by performing this type of correction so that the ON/OFF states of the pulse signal 12a and the pulse signal 12b agree according to the data settings at the phase θv1.

Figure 13:
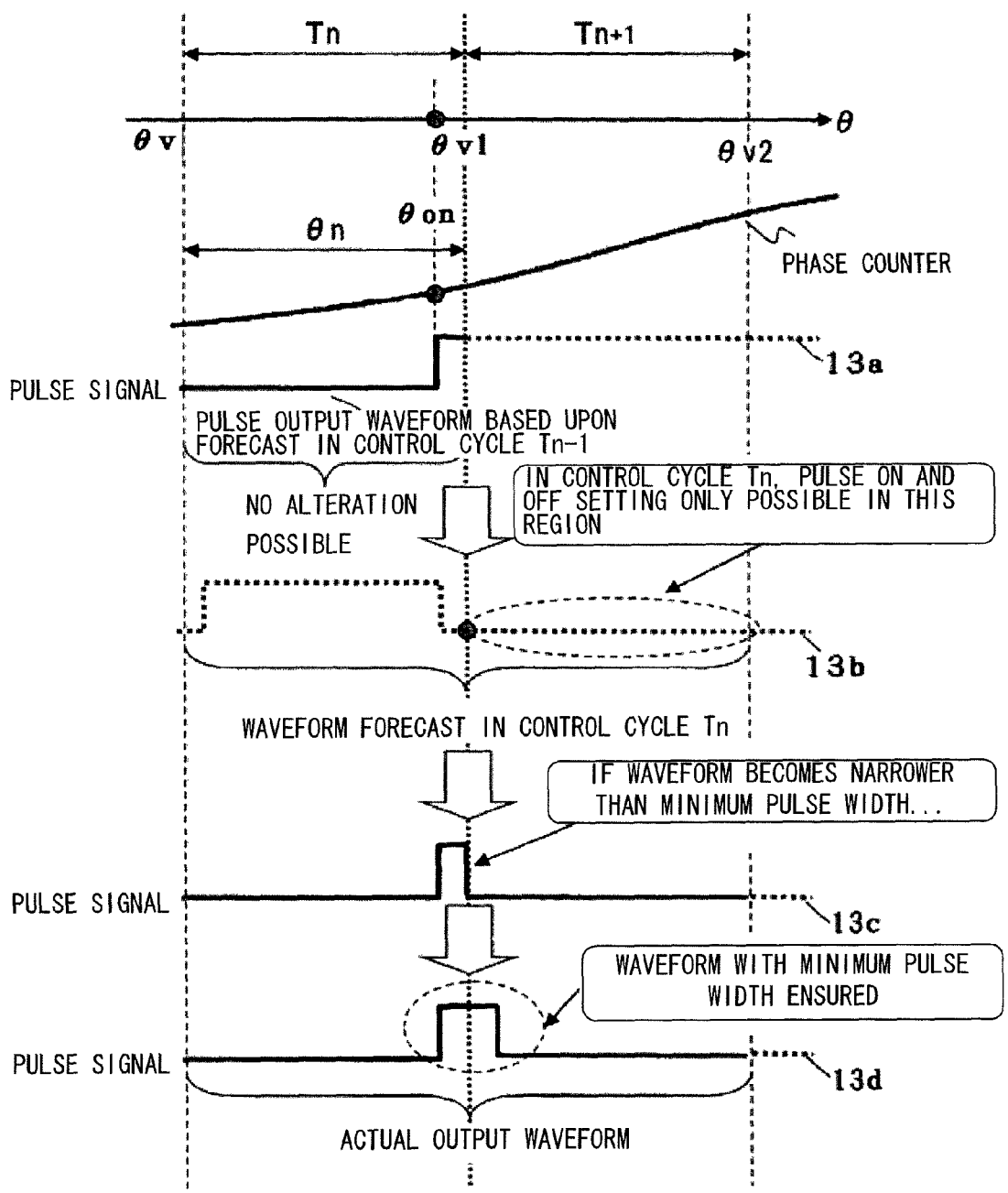
FIG. 13 is a figure showing an example of a pulse signal waveform that is outputted when minimum pulse width control is being performed.

When forcibly changing the level of the pulse signal as described above in order to perform this compensation control based upon continuity of the pulse signal, it is desirable to take into consideration the dead time of the inverter circuit by performing the minimum pulse width limitation so that the pulse width does not become less than the minimum pulse width previously described. FIG. 13 shows an example of a pulse signal that satisfies the condition of the minimum pulse width limitation. The pulse signal 13a is calculated in the control cycle Tn−1, and has a waveform that rises at the timing of the phase Bon of the control cycle Tn. The broken line portion of this pulse signal 13a is the portion calculated in the control cycle Tn.

In this calculation in the control cycle Tn, the input parameters change as compared to the control cycle Tn−1, and as a result the calculation result in this control cycle Tn has the waveform shown by the broken line of the pulse signal 13b, and is different from the pulse signal 13a. If the pulse signal were to be forcibly changed to low level when the control cycle Tn+1 starts, then, as explained in connection with FIG. 12, the pulse signal would have the waveform of the pulse signal 13c. The width of the high level portion of this pulse signal is extremely short. As described above, the high levels of the pulse signals correspond to the continuous states of the IGBTs that are the switching elements of the power switching circuit 144. In order to obtain accurate operation of the switching elements, it is necessary to supply drive signals having width greater than a certain time interval to their gate terminals in order to make them continuous. Accordingly, it is necessary to make the width of the high level pulse signals described above be greater than or equal to some predetermined minimum pulse width.

In the pulse signal 13c, this limitation described above upon the minimum pulse width is not satisfied. In this type of case, it is necessary to increase the width of the high level pulse signal so that it becomes greater than or equal to the minimum pulse width. The pulse signal 13d is an example in which correction control has been performed so as to make the width of the high level pulse signal greater than or equal to the minimum pulse width.

FIG. 13 is an example in which the width of the high level pulse signal has been increased so as to be greater than or equal to the minimum pulse width, but a problem also occurs if the width of a low level pulse signal becomes extremely short. In order to obtain accurate operation of the switching elements, if the discontinuous interval of a switching element is short, it is not possible to obtain accurate operation. This is linked to the serious problem that a short circuit will occur in the series circuits of the upper and lower arms of the power switching circuit 144. Due to this, one or the other of the upper and lower arms included in series circuits must be put into the discontinuous state. If the width of the low level pulse signal is extremely short, then it becomes difficult to make the switching element go discontinuous in a stable manner, and there is a fear that the problem of short circuiting of the series circuit may occur. Due to this, if the width of the low level pulse signal is short, then operation is performed to increase the width of the low level pulse signal so that it is greater than or equal to a predetermined time interval.

Figure 14:
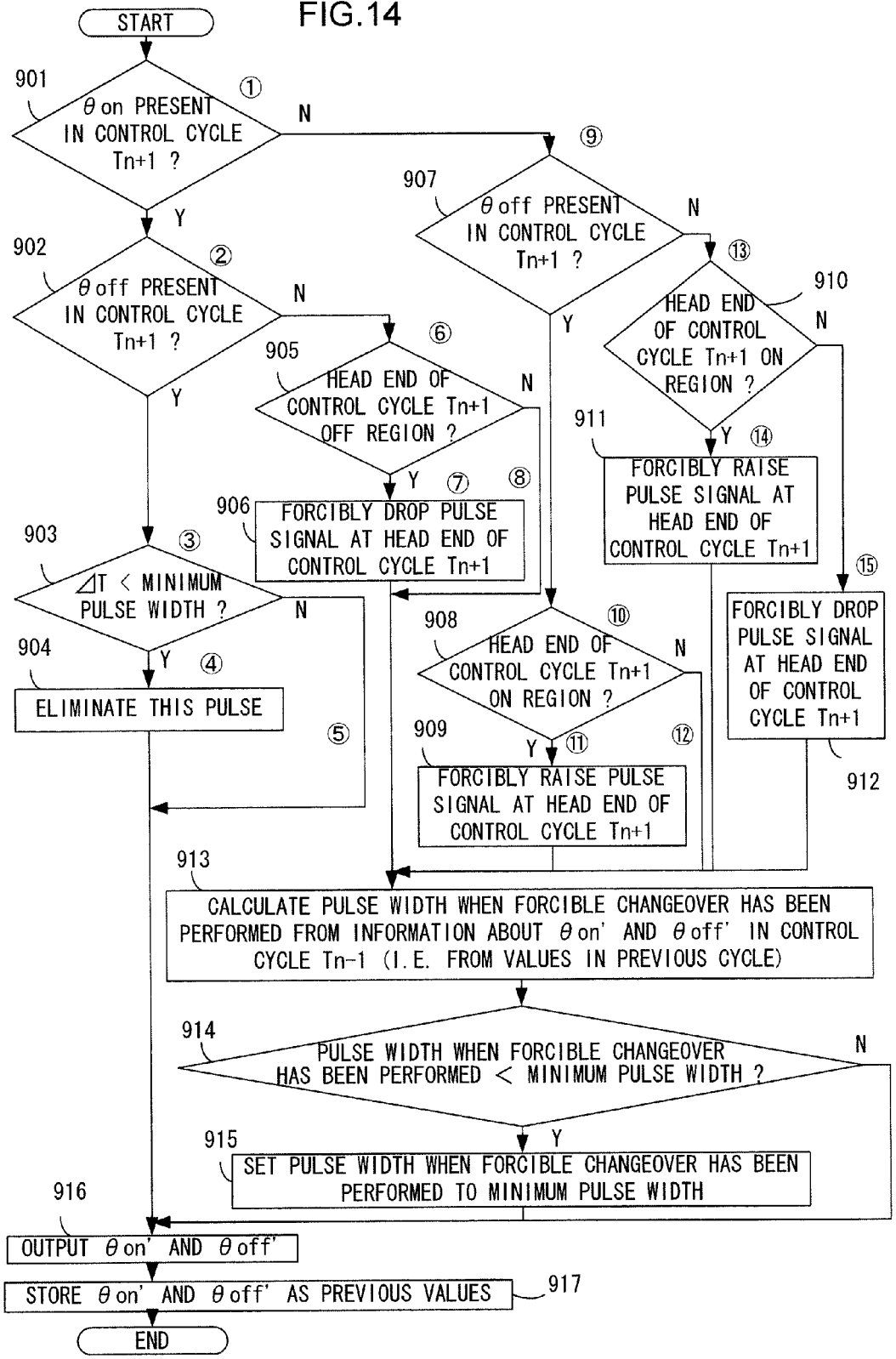
FIG. 14 is a flow chart showing pulse correction processing.

The procedure for correction processing in order to solve the problems explained above when the pulse signal straddles over control cycles will now be explained in detail using the flow chart shown in FIG. 14. This flow chart is processing for solving the problems explained using FIGS. 11 through 13, and, by way of example, correction processing for the pulse signal performed in the calculation processing of the control cycle Tn will now be explained. The calculation result that has been processed by the flow chart according to FIG. 14 is inputted to the pulse output circuit 436 when the control cycle Tn+1 starts, and is reflected in the operation to generate the pulse signal in the control cycle Tn+1.

Figure 9:
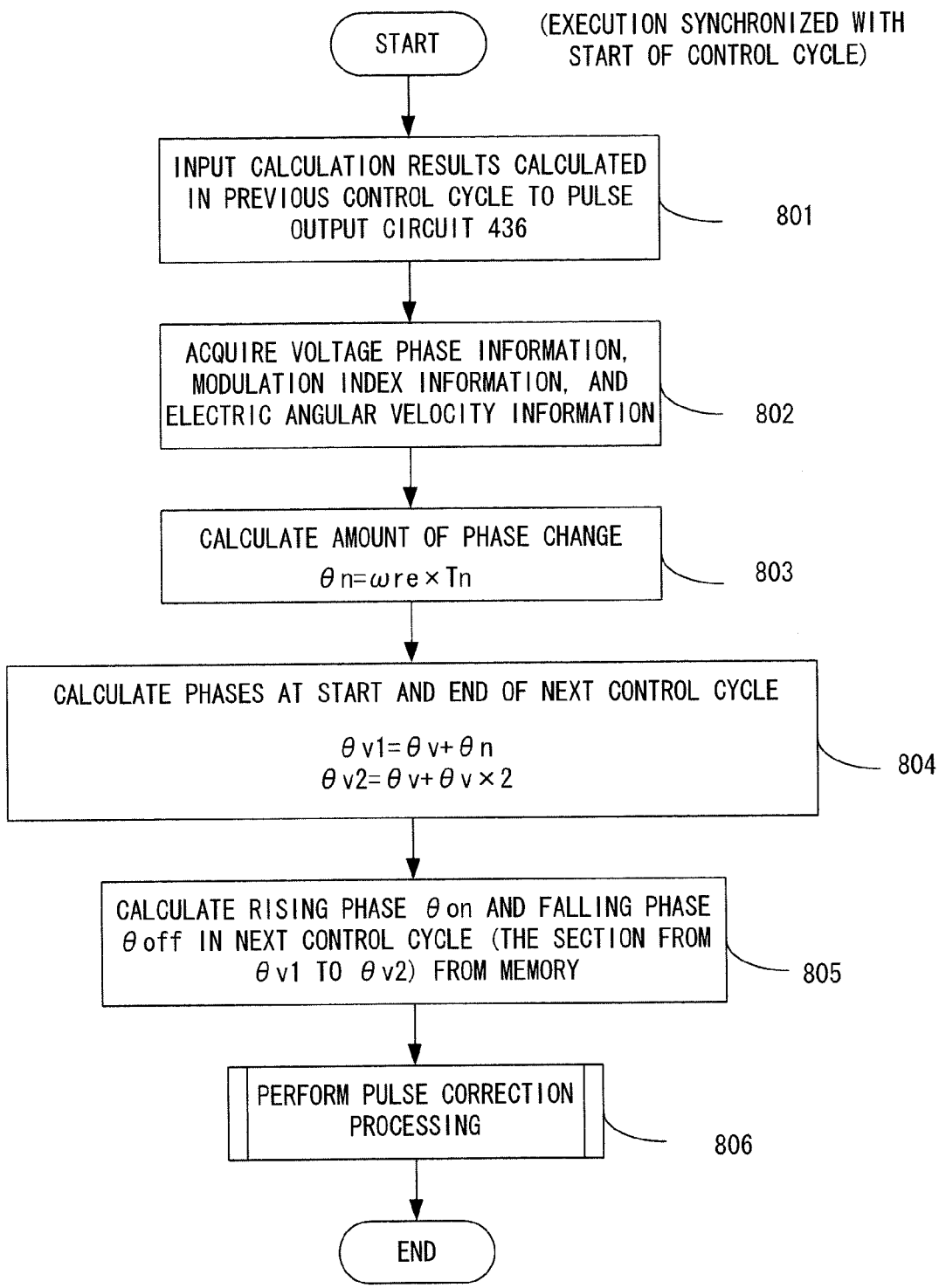
FIG. 9 is a flow chart showing the operation of a pulse calculator of this pulse generator.

In a step 901, the pulse corrector 438 makes a decision as to whether or not any rising phase θon that has been calculated by the phase finder 437 in the step 805 of FIG. 9 is present during the next control cycle Tn+1. If such a rising phase θon is present during the next control cycle Tn+1, then the flow of control proceeds to the next step 902, whereas if no such rising phase θon is present then the flow of control is transferred to a step 907. In the step 902, the pulse corrector 438 makes a decision as to whether or not any falling phase θoff that has been calculated by the phase finder 437 in the step 805 of FIG. 9 is present during the next control cycle Tn+1. If such a falling phase θoff is present during the next control cycle Tn+1, then the flow of control proceeds to the next step 903, whereas if no such falling phase θoff is present then the flow of control is transferred to a step 905.

In the step 903, the pulse corrector 438 makes a decision as to whether or not a pulse width ΔT that corresponds to the interval from the rising phase θon to the falling phase θoff, or to the interval from the falling phase θoff to the rising phase θon, is less than a predetermined minimum pulse width. It should be understood that this pulse width ΔT may be obtained by obtaining the phase difference between the rising phase θon and the falling phase θoff, and by dividing this phase difference by the electric angular velocity ωre. Moreover, the minimum pulse width may be determined in advance, as previously described, in correspondence to the response speed of the IGBTs 328 and 330 that are the switching elements, or the like. If the pulse width ΔT is less than the minimum pulse width then the flow of control proceeds to a step 904, whereas if it is greater than or equal to the minimum pulse width then the flow of control is transferred to a step 916.

In the step 904, the pulse corrector 438 eliminates the pulse that has been calculated by the phase finder 437. In other words, irrespective of the values of the rising phase θon and the falling phase θoff that were outputted from the phase finder 437, neither the rising phase θon' nor the falling phase θoff0 of the pulse after correction is outputted to the pulse output circuit 436. Due to this, the PHM pulse signal generated by the pulse output circuit 436 does not change within the interval of the control cycle Tn+1, so that the continuous or discontinuous control states of the IGBTs 328 and 330 that are the switching elements are maintained just as they are. When this step 904 has been executed, the flow of control proceeds to the step 916.

In the step 905, the pulse corrector 438 makes a decision as to whether or not the head end of the next control cycle Tn+1 is an OFF region. If it is an OFF region, in other words if the pulse signal calculated by the phase finder 437 in the control cycle Tn is in the OFF state at the phase θv1, then the flow of control proceeds to a step 906. On the other hand, if it is an ON region, in other words if the pulse signal calculated by the phase finder 437 in the control cycle Tn is in the ON state at the phase θv1, then the flow of control proceeds to a step 913.

In the step 906, the pulse corrector 438 forcibly lowers the pulse calculated by the phase finder 437 at the head end of the next control cycle Tn+1. In other words, by newly setting the phase θv1 as the falling phase θoff0 of the pulse after correction, the PHM pulse signal generated by the pulse output circuit 436 is forcibly brought to OFF at the head end of the next control cycle Tn+1. Due to this, if the relationship between the discontinuous state of the IGBT 328 or 330 in the control cycle Tn and the discontinuous state of the IGBT 328 or 330 in the next control cycle Tn+1 was discordant in this way, then control is additionally performed by the pulse corrector 438 to make the IGBT 328 or 330 go to discontinuous. After this step 906 has been performed, the flow of control is transferred to the step 913.

In the step 907, the pulse corrector 438 makes a decision as to whether or not any falling phase θoff that has been calculated by the phase finder 437 in the step 805 of FIG. 9 is present during the next control cycle Tn+1. If such a falling phase θoff is present during the next control cycle Tn+1, then the flow of control proceeds to the next step 908, whereas if no such falling phase θoff is present then the flow of control is transferred to a step 910.

In the step 908, the pulse corrector 438 makes a decision as to whether or not the head end of the next control cycle Tn+1 is an ON region. If it is an ON region, in other words if the pulse signal calculated by the phase finder 437 in the control cycle Tn is in the ON state at the phase θv1, then the flow of control proceeds to a step 909. On the other hand, if it is an OFF region, in other words if the pulse signal calculated by the phase finder 437 in the control cycle Tn is in the OFF state at the phase θv1, then the flow of control proceeds to the step 913.

In the step 909, the pulse corrector 438 forcibly raises the pulse calculated by the phase finder 437 at the head end of the next control cycle Tn+1. In other words, by newly setting the phase θv1 as the rising phase θon' of the pulse after correction, the PHM pulse signal generated by the pulse output circuit 436 is forcibly brought to ON at the head end of the next control cycle Tn+1. Due to this, if the relationship between the continuous state of the IGBT 328 or 330 in the control cycle Tn and the discontinuous state of the IGBT 328 or 330 in the next control cycle Tn+1 was discordant in this way, then control is additionally performed by the pulse corrector 438 to make the IGBT 328 or 330 go to continuous. After this step 909 has been performed, the flow of control is transferred to the step 913.

In the step 910, the pulse corrector 438 makes a decision as to whether or not the head end of the next control cycle Tn+1 is an ON region. If it is an ON region, in other words if the pulse signal calculated by the phase finder 437 in the control cycle Tn is in the ON state at the phase θv1, then the flow of control proceeds to a step 911. On the other hand, if it is an OFF region, in other words if the pulse signal calculated by the phase finder 437 in the control cycle Tn is in the OFF state at the phase θv1, then the flow of control proceeds to a step 912.

In the step 911, in a similar manner to the step 909, the pulse corrector 438 forcibly raises the pulse calculated by the phase finder 437 at the head end of the next control cycle Tn+1. In other words, by newly setting the phase θv1 as the rising phase θon' of the pulse after correction, the PHM pulse signal generated by the pulse output circuit 436 is forcibly brought to ON at the head end of the next control cycle Tn+1. Due to this, if the relationship between the continuous state of the IGBT 328 or 330 in the control cycle Tn and the continuous state of the IGBT 328 or 330 in the next control cycle Tn+1 was discordant in this way, then control is additionally performed by the pulse corrector 438 to make the IGBT 328 or 330 go to continuous. After this step 911 has been performed, the flow of control is transferred to the step 913.

In the step 912, in a similar manner to the step 906, the pulse corrector 438 forcibly drops the pulse calculated by the phase finder 437 at the head end of the next control cycle Tn+1. In other words, by newly setting the phase θv1 as the falling phase θoff' of the pulse after correction, the PHM pulse signal generated by the pulse output circuit 436 is forcibly brought to OFF at the head end of the next control cycle Tn+1. Due to this, if the relationship between the discontinuous state of the IGBT 328 or 330 in the control cycle Tn and the discontinuous state of the IGBT 328 or 330 in the next control cycle Tn+1 was conflicting in this way, then control is additionally performed by the pulse corrector 438 to make the IGBT 328 or 330 go to discontinuous. After this step 912 has been performed, the flow of control is transferred to the step 913.

In the step 913, the pulse corrector 438 acquires information about the rising phase θon' or the falling phase θoff' of the pulse after correction, calculated in the previous control cycle Tn−1 as being the previous value thereof, and calculates the pulse width when forcible changeover has been performed on the basis of its previous value. In other words, it obtains the phase difference between the phase θv1 newly set in the step 906, 909, 911, or 912 as the rising phase θon' or the falling phase θoff' of the pulse after correction this time, and the previous value of the rising phase θon' or of the falling phase θoff', and calculates the pulse width when forcible changeover has been performed by dividing this phase difference by the electric angular velocity ωre. It should be understood that this information about the previous value of the rising phase θon' or of the falling phase θoff' is acquired by having been stored in the step 917 that will be described hereinafter. If a plurality of phase values are stored as previous values of the rising phase θon' or of the falling phase θoff, then the one among these that is closest to the phase θv1 is acquired.

In the step 914, the pulse corrector 438 makes a decision as to whether or not the pulse width when forcible changeover has been performed, calculated in the step 913, is less than the minimum pulse width. It should be understood that the minimum pulse width is the same as that used in the decision of the previously described step 903. If the pulse width when forcible changeover has been performed is less than the minimum pulse width, then the flow of control proceeds to a step 915, whereas if it is greater than or equal to the minimum pulse width, then the flow of control is transferred to a step 916.

In the step 915, the pulse corrector 438 sets the pulse width when forcible changeover has been performed, calculated in the step 913, so that it becomes equal to the minimum pulse width. In other words, the pulse corrector 438 changes the value of the rising phase θon' or the falling phase θoff' of the pulse after correction this time that was set in the step 906, 909, 911, or 912 from θv1, i.e. its initially set value, to the value that is obtained by adding a phase value corresponding to the minimum pulse width to the previous value of the rising phase θon' or the falling phase θoff'.

Due to this, a limit is imposed by the pulse corrector 438 so that the pulse width when forcible changeover has been performed does not become less than the minimum pulse width. It should be understood that, if none of the steps 906, 909, 911, or 912 is executed, then it would also be acceptable to arrange for the processing of the steps 913 through 915 to be omitted.

In the step 916, the pulse corrector 438 outputs the rising phase θon' or the falling phase θoff' of the pulse after correction, as finally determined by the various processing steps described above, to the pulse output circuit 436. In other words, if in the step 903 it was decided that the pulse width ΔT was greater than or equal to the minimum pulse width, then the rising phase θon' or the falling phase θoff' is outputted from the phase finder 437 just as it is as the rising phase θon' or the falling phase θoff' of the pulse after correction. On the other hand, in the step 906, 909, 911, or 912, the value of the rising phase θon' or of the falling phase θoff' of the pulse after correction was set when the pulse was forcibly made to rise or to fall, then this set value is outputted. However, if the value was changed by executing the step 915, then the set value after this change is outputted.

Finally in the step 917, the pulse corrector 438 stores the value of the rising phase θon' or of the falling phase θoff' of the pulse after correction that was outputted in the step 916 in a memory not shown in the figures. The value that is stored here is acquired as the previous value when the flow chart of FIG. 14 is executed in the next control cycle Tn+1.

The pulse correction processing by the pulse corrector 438 is performed by the processing of the steps 901 through 917 explained above.

Figure 15:
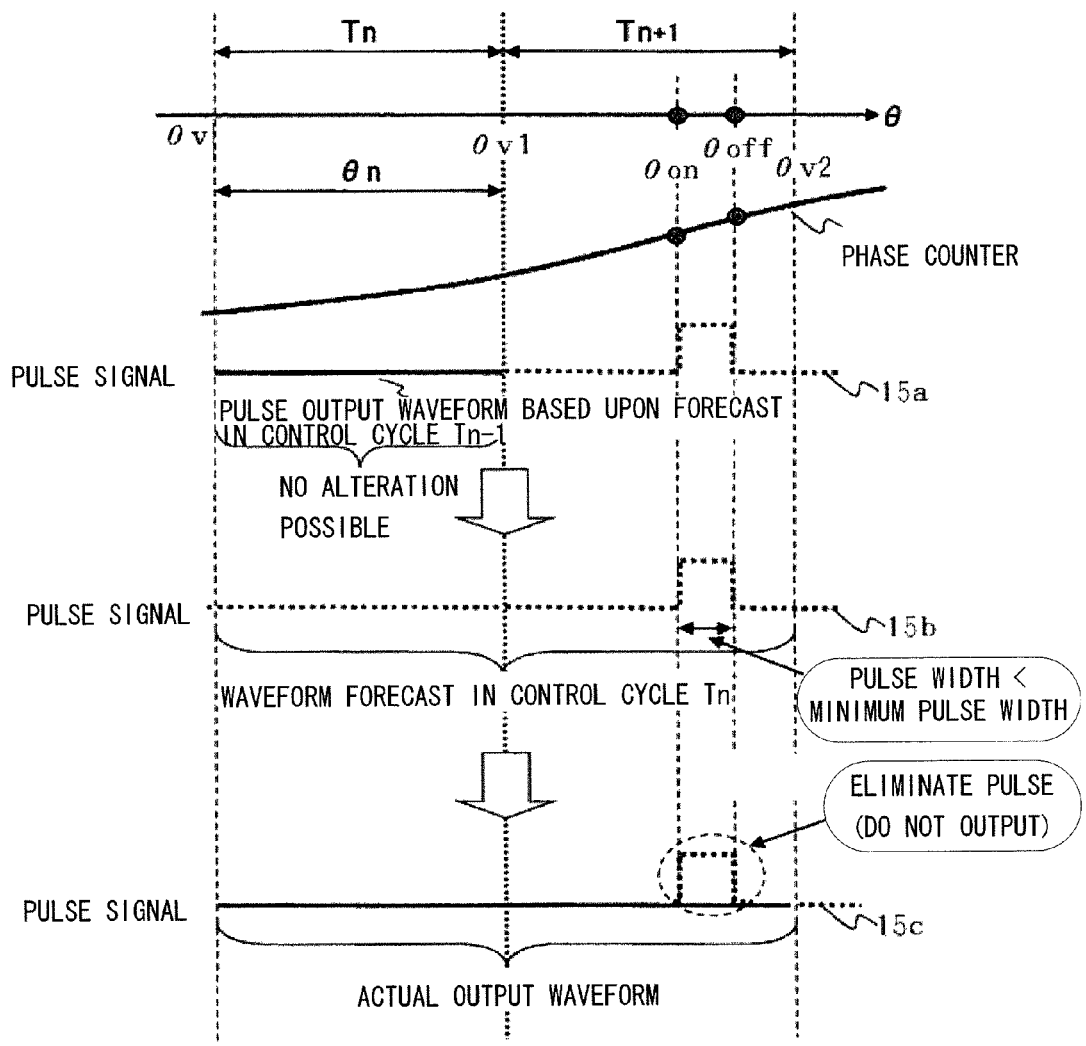
FIG. 15 is a figure showing an example of a pulse signal waveform that is outputted by pulse correction processing.

Examples of pulse signals outputted by the pulse correction processing described above are shown in FIGS. 15 through 22. FIG. 15 shows an example of a pulse signal when the processing stages described in the steps 901, 902, 903, and 904 of the flow chart shown in FIG. 14 have been executed in that order. In this case, for example, the pulse signal 15a is outputted in the control cycle Tn. This pulse signal 15a is one based upon the forecasting calculations that were performed in the control cycle Tn−1, and it cannot change in the control cycle Tn. Rather, in the control cycle Tn, calculation is performed to forecast the pulse signal 15b for the next control cycle Tn+1. When it is decided in the step 903 that the pulse width ΔT for this pulse signal 15b is narrower than the minimum pulse width, then this pulse is eliminated in the step 904. As a result, the pulse signal that is actually outputted on the basis of this correction calculation becomes the pulse signal 15c, in which the high level portion of the pulse signal has been eliminated. By doing this, the generation of a pulse signal having a high level width (i.e. that commands a continuity width of the corresponding switching element) that is less than the minimum pulse width is suppressed.

Figure 16:
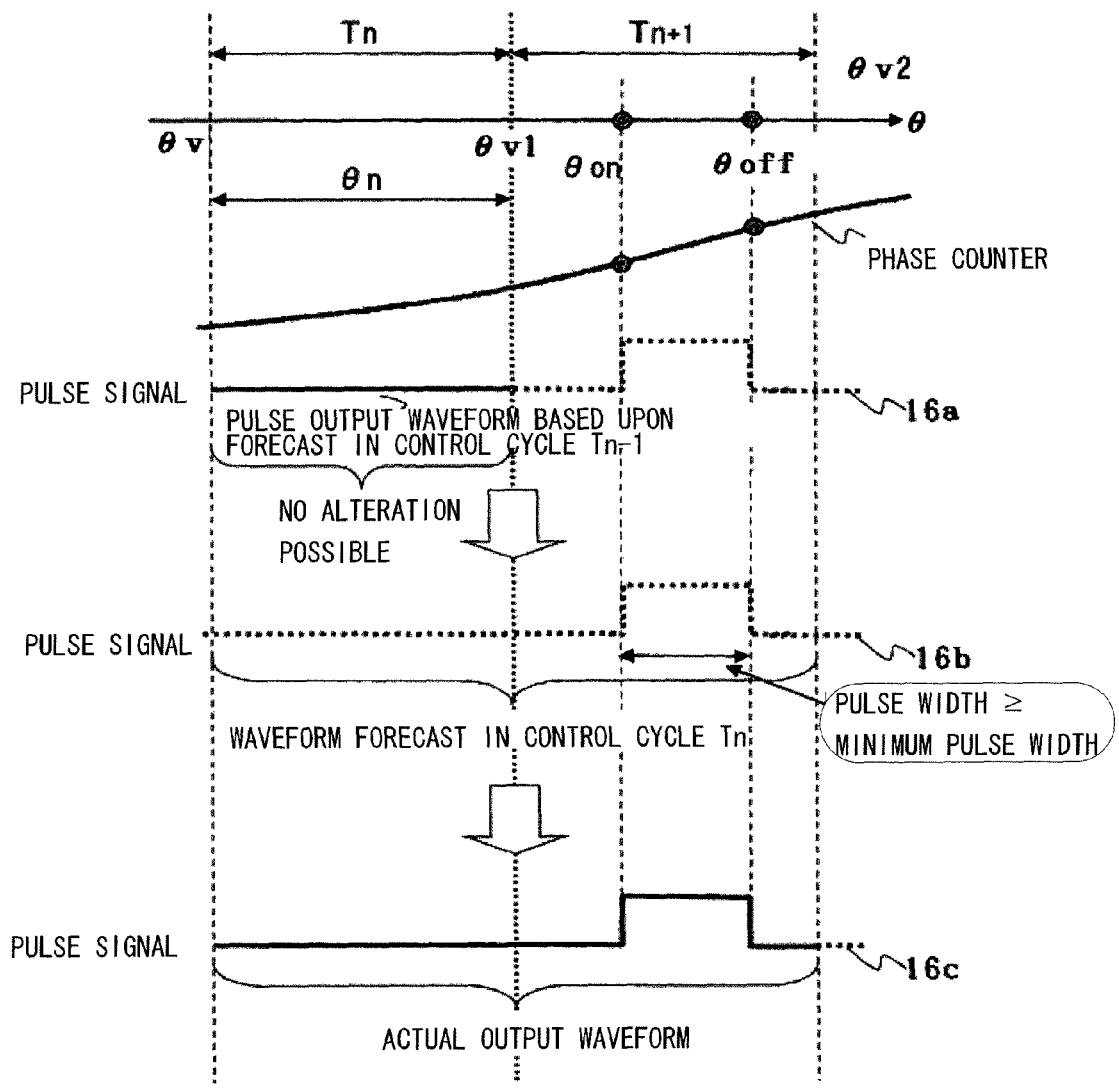
FIG. 16 is another figure showing an example of a pulse signal waveform that is outputted by pulse correction processing.

And FIG. 16 shows an example of a pulse signal when the processing stages described in the steps 901, 902, and 903 of the flow chart shown in FIG. 14 have been executed in that order, but the processing stage described in the step 904 has not been executed. In this case, for example, the pulse signal 16a is outputted in the control cycle Tn. This pulse signal 16a is one based upon the forecasting calculations that were performed in the control cycle Tn−1, and it cannot change in the control cycle Tn. Rather, in the control cycle Tn, calculation is performed to forecast the pulse signal 16b for the next control cycle Tn+1. When it is decided in the step 903 that the pulse width ΔT for this pulse signal 16b is greater than or equal to the minimum pulse width, then the step 904 is not executed. As a result, the pulse signal 16b is outputted just as it is as the pulse signal 16c after correction processing.

Figure 17:
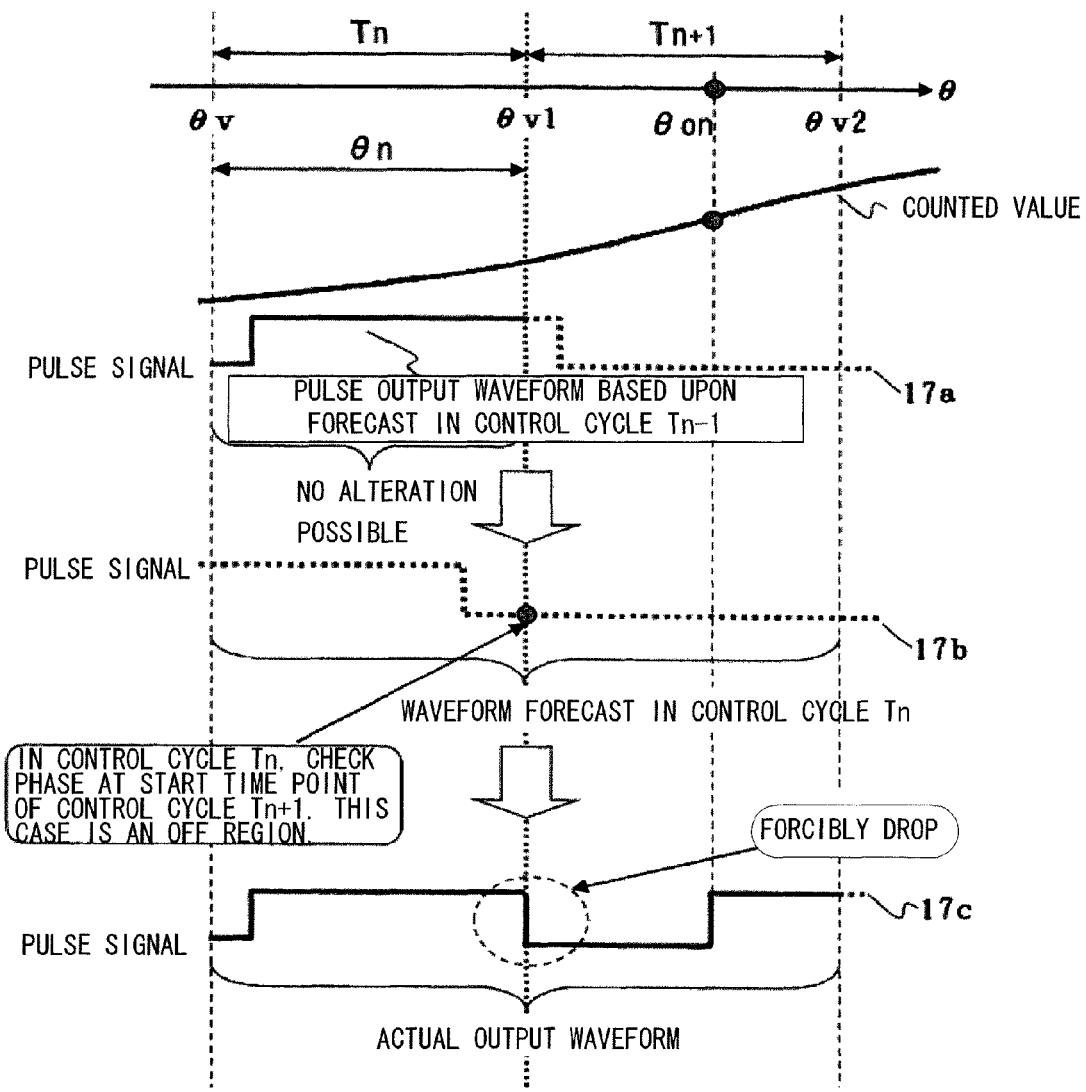
FIG. 17 is another figure showing an example of a pulse signal waveform that is outputted by pulse correction processing.

FIG. 17 shows an example of a pulse signal when the processing stages described in the steps 901, 902, 905 and 906 of the flow chart shown in FIG. 14 have been executed in that order. In this case, for example, the pulse signal 17a is outputted in the control cycle Tn. This pulse signal 17a is one based upon the forecasting calculations that were performed in the control cycle Tn−1, and it cannot change in the control cycle Tn. Rather, in the control cycle Tn, calculation is performed to forecast the pulse signal 17b for the next control cycle Tn+1. When in the step 905 it is decided that, due to this pulse signal 17b, the phase θv1 of the start time point of the next control cycle Tn+1 is the OFF state (i.e. the low level state), then in the step 906 data for making the phase θv1 be the falling phase θoff' of the pulse after correction is newly set to the pulse output circuit 436. As a result, the pulse signal that is actually outputted on the basis of this correction calculation has the waveform shown by the pulse signal 17c. This pulse signal 17c is forcibly dropped at the start time point of the control cycle Tn+1. By doing this, it is possible to solve the problem of the high level state of the pulse signal continuing for an abnormally long time period by this correction processing.

Figure 18:
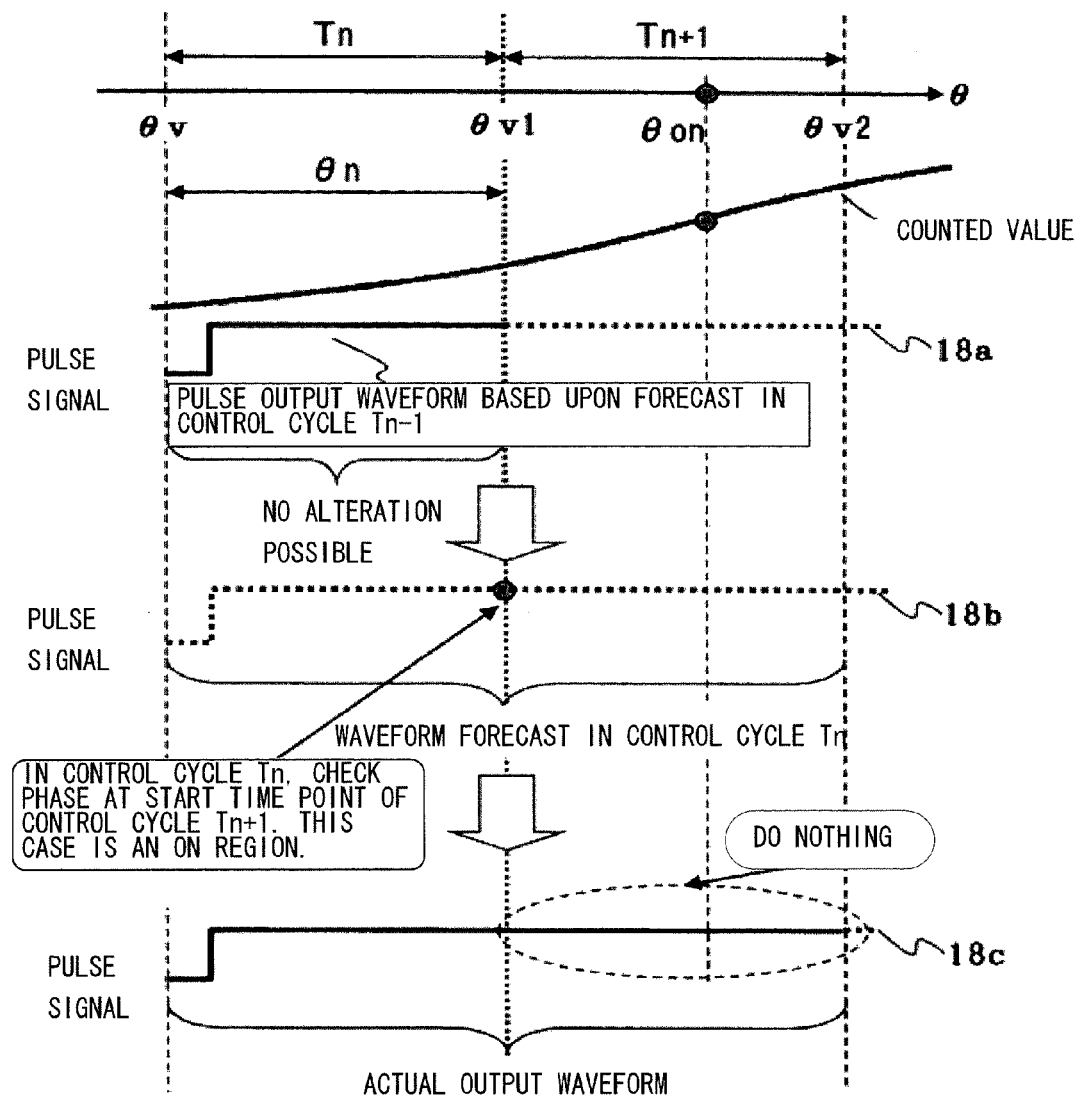
FIG. 18 is another figure showing an example of a pulse signal waveform that is outputted by pulse correction processing.

And FIG. 18 shows an example of a pulse signal when the processing stages described in the steps 901, 902, and 905 of the flow chart shown in FIG. 14 have been executed in that order, but the processing stage described in the step 906 has not been executed. In this case, for example, the pulse signal 18a is outputted in the control cycle Tn. This pulse signal 18a is one based upon the forecasting calculations that were performed in the control cycle Tn−1, and it cannot change in the control cycle Tn. Rather, in the control cycle Tn, calculation is performed to forecast the pulse signal 18b for the next control cycle Tn+1. When in the step 905 it is decided that, due to this pulse signal 18b, the phase θv1 of the start time point of the next control cycle Tn+1 is the ON state (i.e. the high level state), then the step 906 is not executed. As a result, the pulse signal 18b is outputted just as it is as the pulse signal 18c after correction processing.

Figure 19:
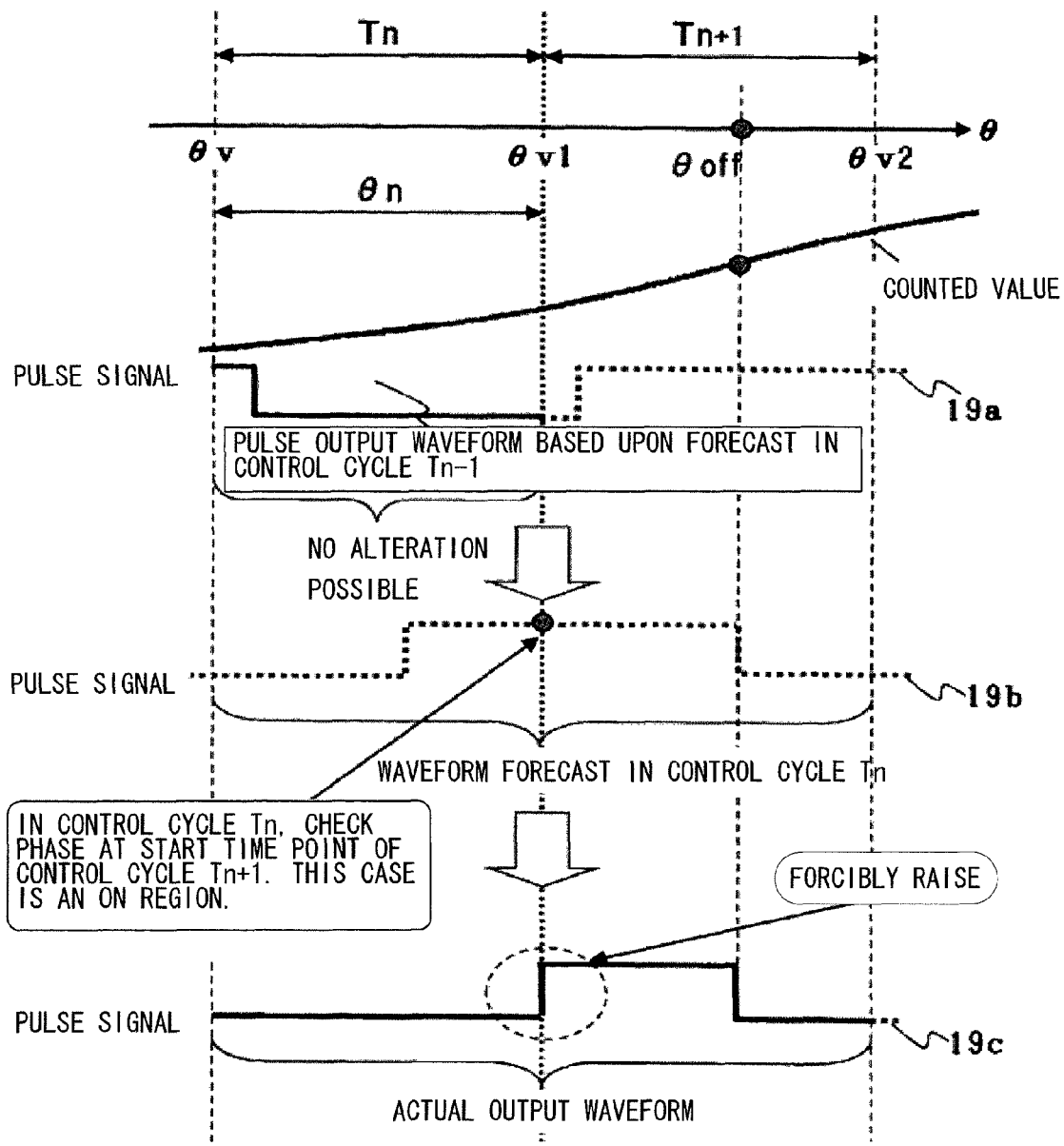
FIG. 19 is another figure showing an example of a pulse signal waveform that is outputted by pulse correction processing.

FIG. 19 shows an example of a pulse signal when the processing stages described in the steps 901, 907, 908, and 909 of the flow chart shown in FIG. 14 have been executed in that order. In this case, for example, the pulse signal 19a is outputted in the control cycle Tn. This pulse signal 19a is one based upon the forecasting calculations that were performed in the control cycle Tn−1, and it cannot change in the control cycle Tn. Rather, in the control cycle Tn, calculation is performed to forecast the pulse signal 19b for the next control cycle Tn+1. When in the step 908 it is decided that, due to this pulse signal 19b, the phase θv1 of the start time point of the next control cycle Tn+1 is the ON state (i.e. the high level state), then in the step 909 data for making the phase θv1 be the rising phase θon' after pulse correction processing is newly set to the pulse output circuit 436. As a result, the pulse signal 19c after correction processing that is actually outputted is forcibly raised at the start time point of the control cycle Tn+1. By doing this, it is possible to make the pulse signal be close to the processing result with the new parameters, so that the controllability is improved.

Figure 20:
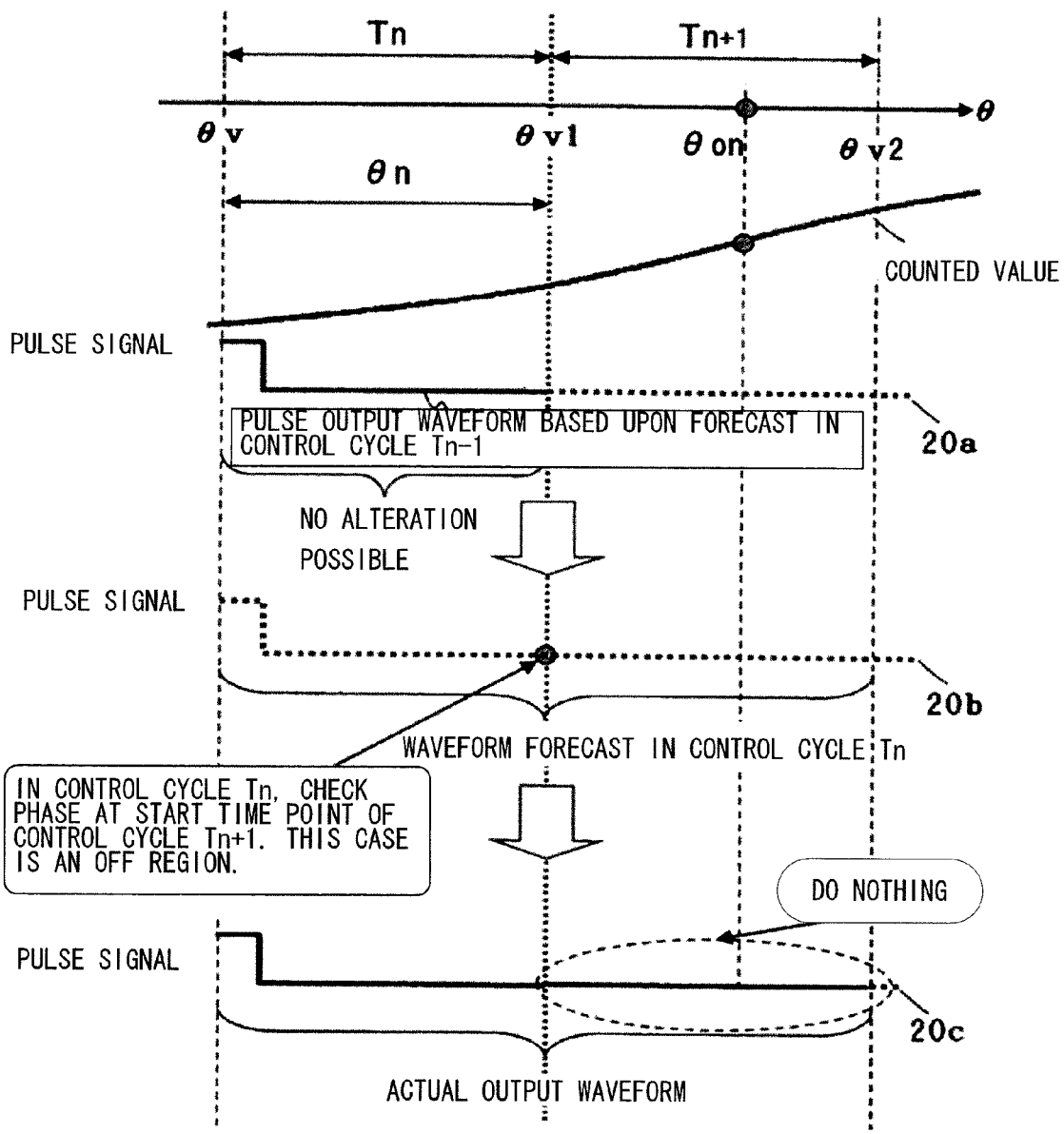
FIG. 20 is another figure showing an example of a pulse signal waveform that is outputted by pulse correction processing.

And FIG. 20 shows an example of a pulse signal when the processing stages described in the steps 901, 907, and 908 of the flow chart shown in FIG. 14 have been executed in that order, but the processing stage described in the step 909 has not been executed. In this case, for example, the pulse signal 20a is outputted in the control cycle Tn. This pulse signal 20a is one based upon the forecasting calculations that were performed in the control cycle Tn−1, and it cannot change in the control cycle Tn. Rather, in the control cycle Tn, calculation is performed to forecast the pulse signal 20b for the next control cycle Tn+1. When in the step 908 it is decided that, due to this pulse signal 20b, the phase θv1 of the start time point of the next control cycle Tn+1 is the OFF state (i.e. the low level state), then the step 909 is not executed. As a result, the pulse signal 20b is outputted just as it is as the pulse signal 20c after correction processing.

Figure 21:
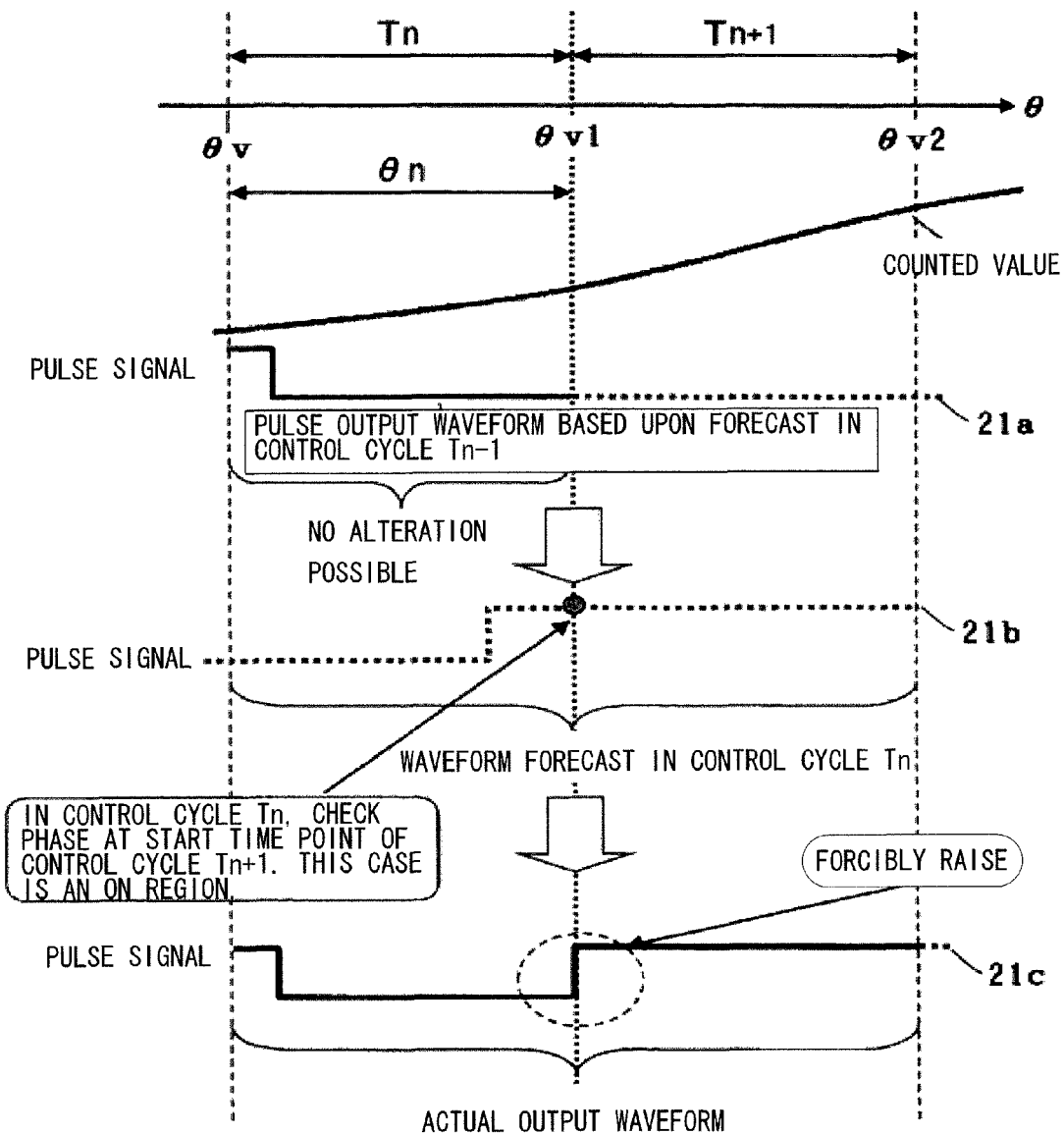
FIG. 21 is another figure showing an example of a pulse signal waveform that is outputted by pulse correction processing.

FIG. 21 shows an example of a pulse signal when the processing stages described in the steps 901, 907, 910, and 911 of the flow chart shown in FIG. 14 have been executed in that order. In this case, for example, the pulse signal 21a is outputted in the control cycle Tn. This pulse signal 21a is one based upon the forecasting calculations that were performed in the control cycle Tn−1, and it cannot change in the control cycle Tn. Rather, in the control cycle Tn, calculation is performed to forecast the pulse signal 21b for the next control cycle Tn+1. When in the step 910 it is decided that, due to this pulse signal 21b, the phase θv1 of the start time point of the next control cycle Tn+1 is the ON state (i.e. the high level state), then in the step 911 data for making the phase θv1 be the rising phase θon' after pulse correction processing is newly set to the pulse output circuit 436. As a result, the pulse signal 21c after correction processing that is actually outputted is forcibly raised at the start time point of the control cycle Tn+1. By doing this, it is possible to make the pulse signal be close to the calculation result with the new parameters, so that the control characteristics are improved.

Figure 22:
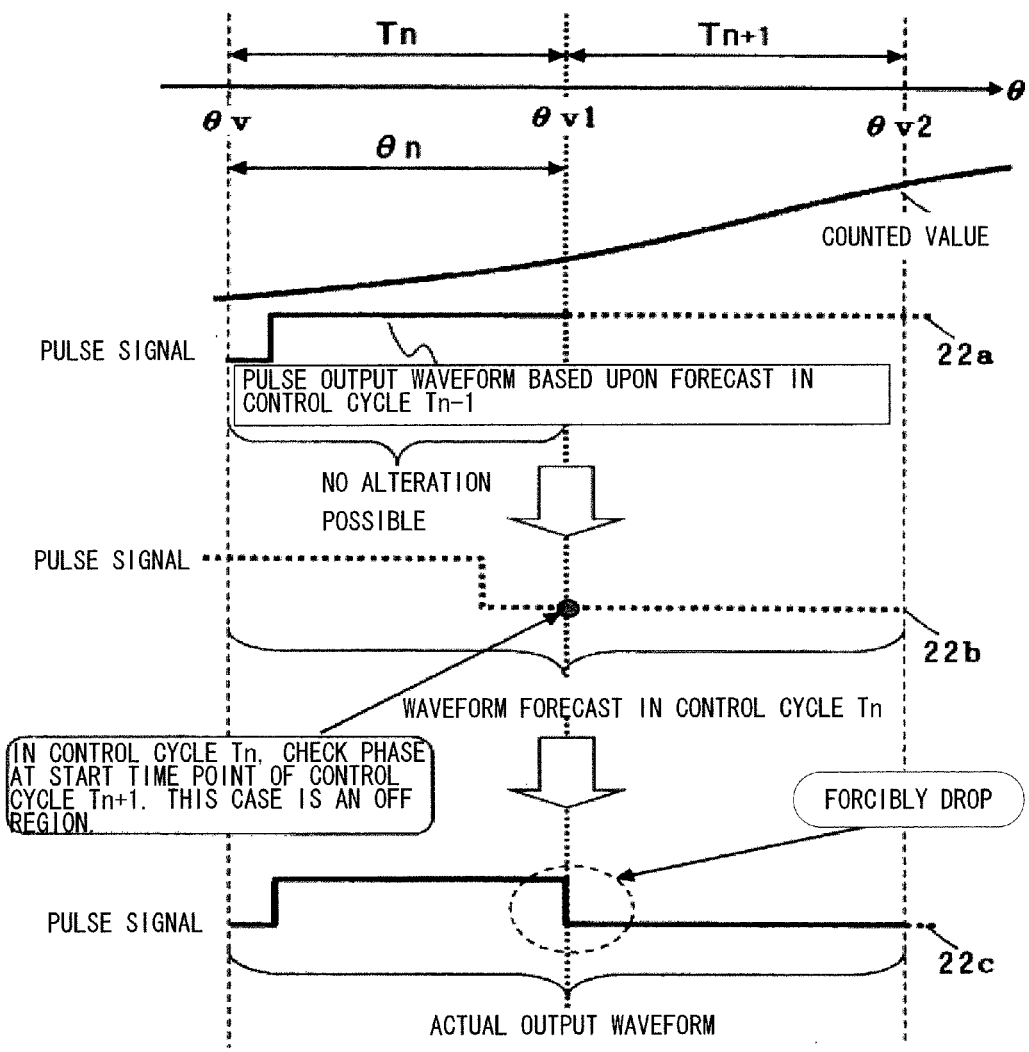
FIG. 22 is another figure showing an example of a pulse signal waveform that is outputted by pulse correction processing.

And FIG. 22 shows an example of a pulse signal when the processing stages described in the steps 901, 907, 910, and 912 of the flow chart shown in FIG. 14 have been executed in that order. In this case, for example, the pulse signal 22a is outputted in the control cycle Tn. This pulse signal 22a is one based upon the forecasting calculations that were performed in the control cycle Tn−1, and it cannot change in the control cycle Tn.

Rather, in the control cycle Tn, calculation is performed to forecast the pulse signal 22b for the next control cycle Tn+1. When in the step 910 it is decided that, due to this pulse signal 22b, the phase θv1 of the start time point of the next control cycle Tn+1 is the OFF state (i.e. the low level state), then in the step 912 data for making the phase θv1 be the falling phase Doff after pulse correction processing is newly set to the pulse output circuit 436. As a result, the pulse signal 22c after correction processing that is actually outputted is forcibly dropped at the start time point of the control cycle Tn+1. By doing this, it is possible to ameliorate the problem of the high level state of the pulse signal continuing for an abnormally long time so that the current that flows in the corresponding switching element increases abnormally.

Next, a method for determining the rising phase and the falling phase of the pulse signal, that is a method of calculation performed by the phase finder before pulse correction, will be explained. The rising and falling phases shown in the table of FIG. 10 may be calculated in advance according to the matrix equations shown in the following Equations (5) through (8).

Here, as a typical example, a case will be described in which the harmonic components of the third order, the fifth order, and the seventh order are to be eliminated.

When the harmonic components of the third order, the fifth order, and the seventh order have been designated as the harmonic components for elimination, the following matrix calculation is performed.

Here, a row vector like that shown in Equation (5) is constructed for the harmonic components of the third order, the fifth order, and the seventh order that are to be eliminated.

$$[x_1 x_2 x_3] = \pi/2 [k_1/3 \, k_2/5 \, k_3/7] \tag{5}$$

The elements within the right side brackets of Equation (5) are $k_1/3$, $k_2/5$, and $k_3/7$. Now, $k_1$, $k_2$, and $k_3$ may be selected to be any desired odd numbers. However, $k_1$ is never selected to be 3, 9, or 15, $k_2$ is never selected to be 5, 15, or 25, $k_3$ is never selected to be 7, 21 35, and so on. Under these conditions, the harmonic components of the third order, the fifth order, and the seventh order are perfectly eliminated.

To describe the above more generally, the value of each of the terms in Equation (5) may be determined by making the value of the denominator be the order of a harmonic component that is to be eliminated, and by making the value of the numerator be any desired odd number except for an odd multiple of the denominator. Thus in the example shown in Equation (5) the number of elements in the row vector is 3, because there are harmonic components of three orders to be eliminated (i.e. the third order, the fifth order, and the seventh order). In a similar manner, for elimination of harmonic components of N orders, it is possible to construct a row vector whose number of elements is N, and to determine the value of each of its elements.

It should be understood that it is also possible, by making the values of the numerator and of the denominator of each of the elements in Equation (5) different from those described above, to perform waveform shaping of the spectrum, instead of eliminating the corresponding harmonic component. In this process, it would also be acceptable to arrange to select the values of the numerator and of the denominator of each of the elements as desired, with the principal objective not of completely eliminating the corresponding harmonic components, but rather of shaping the spectrum waveform. In this case, while there is no need for the numerators and the denominators necessarily to be integers, it still will be unacceptable to select an odd multiple of the denominator as the value of the numerator. Furthermore, it is not necessary for the values of the numerator and of the denominator to be constant; it would also be acceptable for them to be values that change with time.

If, as described above, there are three elements whose values are determined by combinations of a denominator and a numerator, then a three column vector may be established as shown in Equation (5). In a similar manner, a vector with N elements whose values are determined by combinations of a denominator and a numerator, in other words a vector of N columns, may be set up. In the following, this N column vector will be termed the "harmonic component reference phase vector".

If the harmonic component reference phase vector is a three column vector as in Equation (5), then Equation (6) is calculated by transposing this harmonic component reference phase vector. As a result, the pulse reference angles S1 through S4 are obtained.

These pulse reference angles S1 through S4 are parameters that specify the center positions of the pulses, and are compared with a triangular wave carrier that will be described hereinafter. If in this manner the number of pulse reference angles (S1 through S4) is four, then, generally, the number of pulses for one cycle of the voltages between lines will be 16.

$$\begin{bmatrix} S_1 \\ S_2 \\ S_3 \\ S_4 \end{bmatrix} = \left\{ 2 \begin{bmatrix} 1 & 0 & 0 \\ 1 & 0 & 1 \\ 1 & 1 & 0 \\ 1 & 1 & 1 \end{bmatrix} - \begin{bmatrix} 1 & 1 & 1 \\ 1 & 1 & 1 \\ 1 & 1 & 1 \\ 1 & 1 & 1 \end{bmatrix} \right\} \begin{bmatrix} x_1 \\ x_2 \\ x_3 \end{bmatrix} \quad (6)$$

Moreover, if the harmonic component reference phase vector is a four column vector as in Equation (7) instead of a three column vector as in Equation (5), then the matrix calculation Equation (8) is employed:

$$[x_1 x_2 x_3 x_4] = \pi/2[k_1/3k_2/5k_3/7k_4/11] \quad (7)$$

$$\begin{bmatrix} S_1 \\ S_2 \\ S_3 \\ S_4 \\ S_5 \\ S_6 \\ S_7 \\ S_8 \end{bmatrix} = \left\{ 2 \begin{bmatrix} 1 & 0 & 0 & 0 \\ 1 & 0 & 0 & 1 \\ 1 & 0 & 1 & 0 \\ 1 & 0 & 1 & 1 \\ 1 & 1 & 0 & 0 \\ 1 & 1 & 0 & 1 \\ 1 & 1 & 1 & 0 \\ 1 & 1 & 1 & 1 \end{bmatrix} - \begin{bmatrix} 1 & 1 & 1 & 1 \\ 1 & 1 & 1 & 1 \\ 1 & 1 & 1 & 1 \\ 1 & 1 & 1 & 1 \\ 1 & 1 & 1 & 1 \\ 1 & 1 & 1 & 1 \\ 1 & 1 & 1 & 1 \\ 1 & 1 & 1 & 1 \end{bmatrix} \right\} \begin{bmatrix} x_1 \\ x_2 \\ x_3 \\ x_4 \end{bmatrix} \quad (8)$$

As a result, the pulse reference angle outputs S1 through S8 are obtained. At this time, the number of pulses for one cycle of the voltages between lines is 32.

The relationship between the number of harmonic components to be eliminated and the number of pulses is generally as follows. That is: if there are two harmonic components to be eliminated, then the number of pulses for one cycle of the voltages between lines is 8; if there are three harmonic components to be eliminated, then the number of pulses for one cycle of the voltages between lines is 16; if there are four harmonic components to be eliminated, then the number of pulses for one cycle of the voltages between lines is 32; and if there are five harmonic components to be eliminated, then the number of pulses for one cycle of the voltages between lines is 64. In a similar manner, each time the number of harmonic components to be eliminated increases by one, the number of pulses for one cycle of the voltages between lines doubles.

However, in the case of a pulse configuration in which positive pulses and negative pulses are superimposed in the voltages between lines, sometimes it is the case that the number of pulses is not the same as described above.

The rising and falling phases corresponding to the pulse reference angles obtained as described above are stored in a ROM, laid out as a table according to the amount of variation. By the phase finder 437 performing ROM lookup using this table, the rising and falling phases of the PHM pulse signal are determined, and the three pulse signals for the voltages between lines, i.e. for the voltage between the U and V lines, the voltage between the V and W lines, and the voltage between the W and U lines, are generated. These pulse signals for the voltages between lines are the same pulse signal, but spaced apart by mutual phase differences of $2\pi/3$. Accordingly in the following, as a representative example, only the voltage between the U and V lines will be explained.

The relationship between the reference phase $\theta uvl$ of the voltage between the U and V lines and the voltage phase signal $\theta v$ and the rotor phase $\theta re$ is as in the following Equation (9):

$$\theta uvl = \theta v + \pi/6 = \theta re + \delta + \pi/6 \text{ [rad]} \quad (9)$$

The waveform of the voltage between the U and V lines shown by Equation (9) is bilaterally symmetric about the positions $\theta uvl = \pi/2$ and $3\pi/2$ as centers, and moreover is point symmetric about the positions $\theta uvl = 0$ and $\pi$ as centers. Accordingly, the waveform of one cycle of the pulses of the voltage between the U and V lines (from $\theta uvl = 0$ to $2\pi$) may be expressed based upon the pulse waveform from $\theta uvl = 0$ to $\pi/2$ by duplicating it symmetrically left and right or symmetrically up and down for each interval of $\pi/2$.

One method of implementing this is an algorithm for comparing the center phases of the pulses of the voltage between the U and V lines in the range $0 \leq \theta uvl \leq \pi/2$ with a four channel phase counter, and for generating the pulses of the voltages between the U and V lines for a full cycle, in other words for the range $0 \leqq \theta uvl \leqq 2\pi$, on the basis of the result of this comparison. A conceptual figure for this is shown in FIG. 23.

Figure 23:
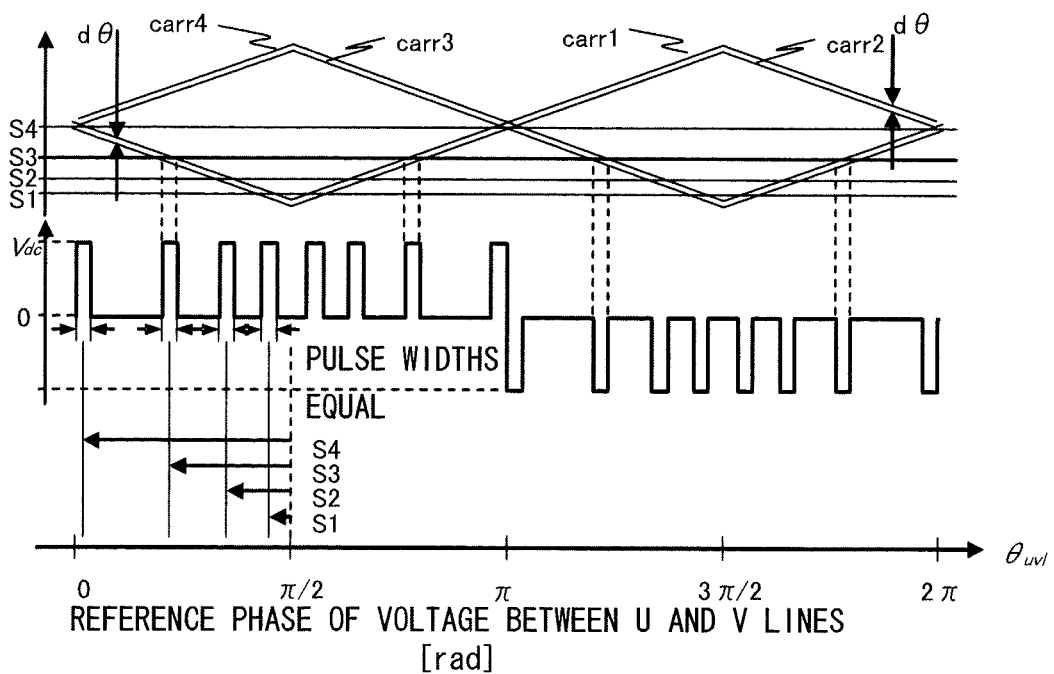
FIG. 23 is a figure illustrating a method of generating pulses with a phase counter.

FIG. 23 shows, as an example, a case in which the number of pulses of the voltage between lines in the range $0 \leqq \theta uvl \leqq \pi/2$ is 4. In FIG. 23, the pulse reference angles S1 through S4 are the center phases of these four pulses.

Each of carr1($\theta$uvl), carr2($\theta$uvl), carr3($\theta$uvl), and carr4($\theta$uvl) represents one of four phase counters on four channels. All of these phase counters are triangular waves having a period of $2\pi$ radians with respect to the reference phase $\theta$uvl. Moreover, carr1($\theta$uvl) and carr2($\theta$uvl) are deviated apart by a deviation d$\theta$ in the amplitude direction, and the same relationship holds for carr3($\theta$uvl) and carr4($\theta$uvl).

d$\theta$ denotes the width of the pulses of the voltage between lines. The amplitude of the fundamental wave changes linearly with respect to this pulse width d$\theta$.

The pulses of the voltage between lines are formed at each point of intersection of the phase counters carr1($\theta$uvl), carr2($\theta$uvl), carr3($\theta$uvl), and carr4($\theta$uvl) and the pulse reference angles S1 through S4 that give the center phases of the pulses in the range $0 \leqq \theta uvl \leqq \pi/2$. Due to this, the pulse signals are formed in a pattern that is symmetrical every 90°.

In more detail, pulses of width d$\theta$ and having a positive amplitude are generated at the points that carr1($\theta$uvl) and carr2($\theta$uvl) and S1 through S4 agree with one another. On the other hand, pulses of width d$\theta$ and having a negative amplitude are generated at the points that carr3($\theta$uvl) and carr4($\theta$uvl) and S1 through S4 agree with one another.

Examples of waveforms of the voltage between lines generated for various modulation indices using a method like that explained above are shown in FIG. 24. For FIG. 24, $k_1=1$, $k_2=1$, and $k_3=3$ are selected as values of $k_1$, $k_2$, and $k_3$ in Equation (5), and examples of the pulse waveform of the voltage between lines are shown as the modulation index changes from 0 to 1.0. According to FIG. 24, it will be understood that the pulse width increases almost proportionally to increase of the modulation index. By increasing the pulse width in this manner, it is possible to increase the effective value of the voltage. However, for modulation indices of 0.4 or greater, the widths of the pulses in the vicinity of $\theta uvl=0$, $\pi$, and $2\pi$ do not change even though the modulation index changes. This type of phenomenon is caused by pulses of positive amplitude and pulses of negative amplitude overlapping one another.

As described above, in the embodiment described above, switching operation is performed on the basis of the AC power that is required to be outputted, for example on the basis of the phase of the AC voltage, from the various switching elements of the power switching circuit 144 by the drive signals from the driver circuit 174 being supplied to the switching elements. The number of times that the switching elements are switched for each one cycle of the AC power has a tendency to increase along with increase of the types of harmonic components that are to be eliminated. Now since, if this three phase AC power is to be outputted for supply to a three phase AC rotating electrical machine, the harmonic components whose order is a multiple of three act to mutually cancel one another out, accordingly it will be acceptable not to include these harmonic components as ones that are to be eliminated.

To view this from another standpoint, the modulation index increases when the voltage of the DC power that is supplied decreases, and there is a tendency for the continuous intervals in which the switching operation goes to continuous to become longer. Furthermore, when driving a rotating electrical machine such as the motor-generator 192 or the like, if the torque to be generated by the rotating electrical machine becomes larger, then the modulation index becomes larger, and as a result the continuous intervals of the switching operation become longer; while, if the torque to be generated by the rotating electrical machine becomes smaller, then the continuous intervals of the switching operation become shorter. When the continuous intervals become longer and the discontinuous intervals have become shorter, in other words when the switching gaps have become somewhat shorter, there is a possibility that cutoff of the switching elements cannot be performed safely, and in this case control is performed to connect together successive continuous intervals so as not to perform cutoff but to maintain the continuous state.

To view this from yet another standpoint, in a state in which the frequency of serious influence of distortion of the AC output, for example of the AC current, is low, in particular in a state in which the rotating electrical machine is stopped or its rotational speed is extremely low, control is not performed according to the PHM method, but rather the power switching circuit 144 is controlled according to the PWM method employing a carrier wave having a fixed period, and control of the power switching circuit 144 is changed over to the PHM method in the state in which the rotational speed has increased. If the present invention is applied to a power conversion device for powering an automobile, then it is particularly desirable to minimize the influence of torque pulsations during the stage when the vehicle is being started off from rest in the stationary state and is being accelerated, in order to maximize the sense of comfort provided by the vehicle and so on. Due to this consideration, the power switching circuit 144 is controlled according to the PWM method at least at the stage in which the vehicle is being started off from rest in the stationary state, and the control method is changed over to the PHM method after the vehicle has accelerated somewhat. By doing this it is possible to perform control to minimize torque pulsations at least when the vehicle is starting off from rest, and it becomes possible to perform control according to the PHM method in which switching losses are lower at least in the state of normal traveling in which the vehicle is moving at a relatively constant speed, so that it is possible to implement control in which losses are reduced while at the same time suppressing the influence of torque pulsations.

According to the PHM pulse signals that are employed in the present invention, when the modulation index is fixed as described above, the specific characteristic is exhibited that the waveform of the voltage between lines consists of a train of pulses of equal widths, except for certain exceptions. It should be understood that, when exceptionally the widths of some pulses of the voltage between lines are not equal to the widths of the other pulses in the pulse train, this is because, as described above, a pulse that has positive amplitude and a pulse that has negative amplitude have become overlapped. In this case, if the portion where the pulses are overlapped is decomposed into the pulse that has positive amplitude and the pulse that has negative amplitude, then the widths of all of the pulses over the entire cycle necessarily become equal. In other words, the modulation index changes along with change of the pulse widths.

Now, the case in which exceptionally the width of a pulse of the voltage between lines is not equal to that of the other pulses in the train will be further explained in detail with reference to FIG. 25. In the upper portion of FIG. 25, the portion of the pulse waveform of the voltage between lines for modulation index of 1.0 in the range from $\pi/2 \leqq \theta uvl \leqq 3\pi/2$ is shown as enlarged. The two pulses near the center of this portion of the pulse waveform of the voltage between lines have a different width from the other pulses in this pulse train.

And, in the lower portion of FIG. 25, the situation is shown when this portion with two pulses of different width from the other pulses has been decomposed. From this figure it will be understood that, in this portion, a pulse having positive amplitude and a pulse having negative amplitude and both having the same pulse width as the other pulses are overlapped, and that two pulses having different pulse width from the other pulses have been created by these positive and negative pulses being thus combined. In other words, by decomposing the overlapped pulses in this manner, it will be understood that the pulse waveform of the voltage between lines created according to the PHM pulse signal consists of pulses all having the same constant width.

Figure 26:
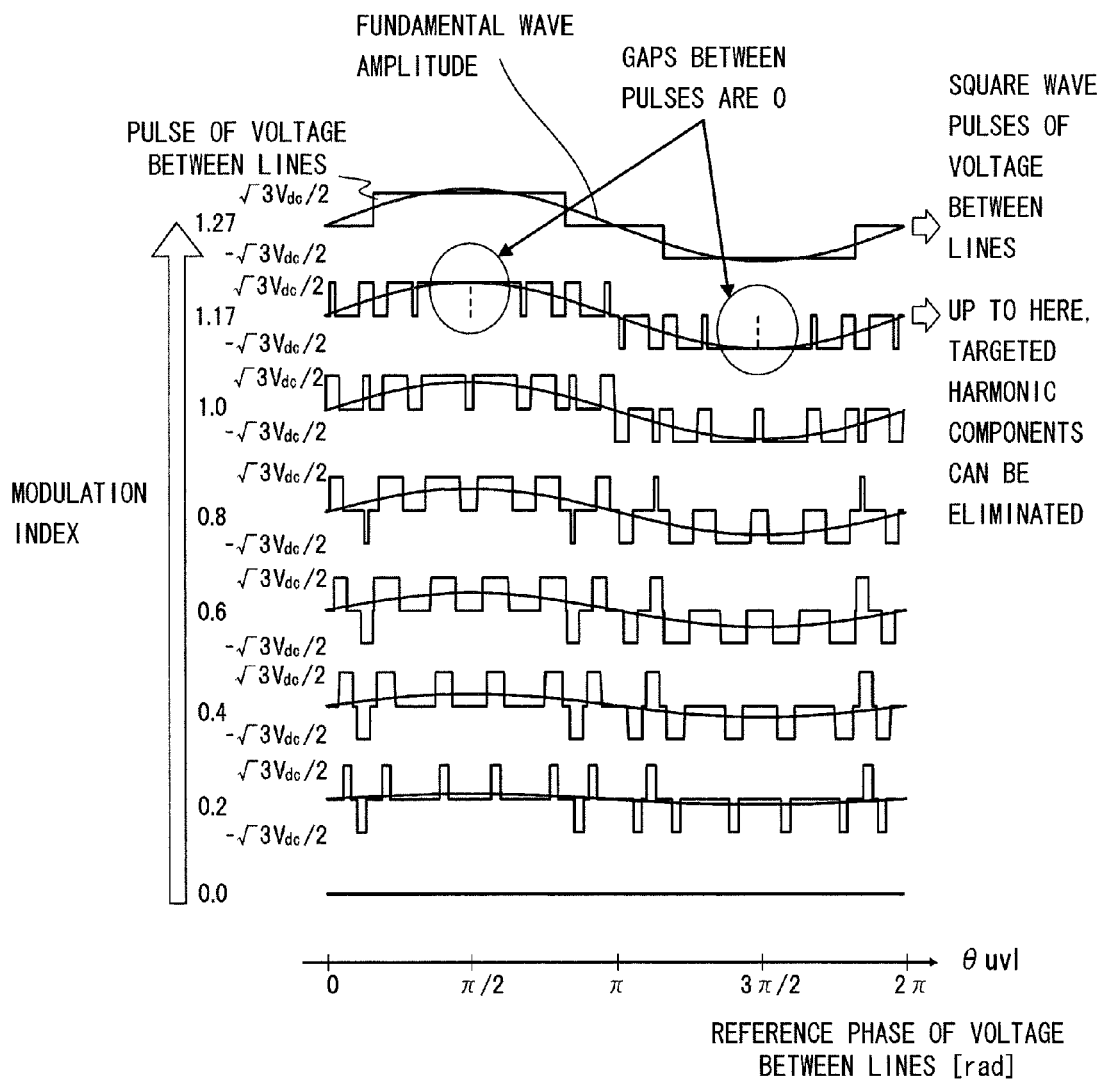
FIG. 26 is another figure showing examples of waveforms of a voltage between lines in the PHM control mode.

Another example of a pulse waveform of the voltage between lines due to an PHM pulse signal generated according to the present invention is shown in FIG. 26. Here, $k_1=1$, $k_2=1$, and $k_3=5$ are selected as values of $k_1$, $k_2$, and $k_3$ in Equation (5), and examples of the pulse waveform of the voltage between lines are shown as the modulation index changes from 0 to 1.27. According to FIG. 26, when the modulation index becomes 1.17 or greater, at the positions $\theta uvl=\pi/2$ and $3\pi/2$, the gap between the two adjacent pulses that are mutually symmetric left and right disappears. Accordingly it will be understood that, while it is possible to eliminate the targeted harmonic components in the range where the modulation index is less than 1.17, when the modulation index becomes greater than this value, it is not possible to eliminate the targeted harmonic components effectively. Moreover, as the modulation index progressively becomes greater, the gaps between adjacent pulses in other positions as well progressively diminish and disappear, and finally when the modulation index is 1.27 the pulse waveform of the voltage between lines becomes a square wave.

Figure 27:
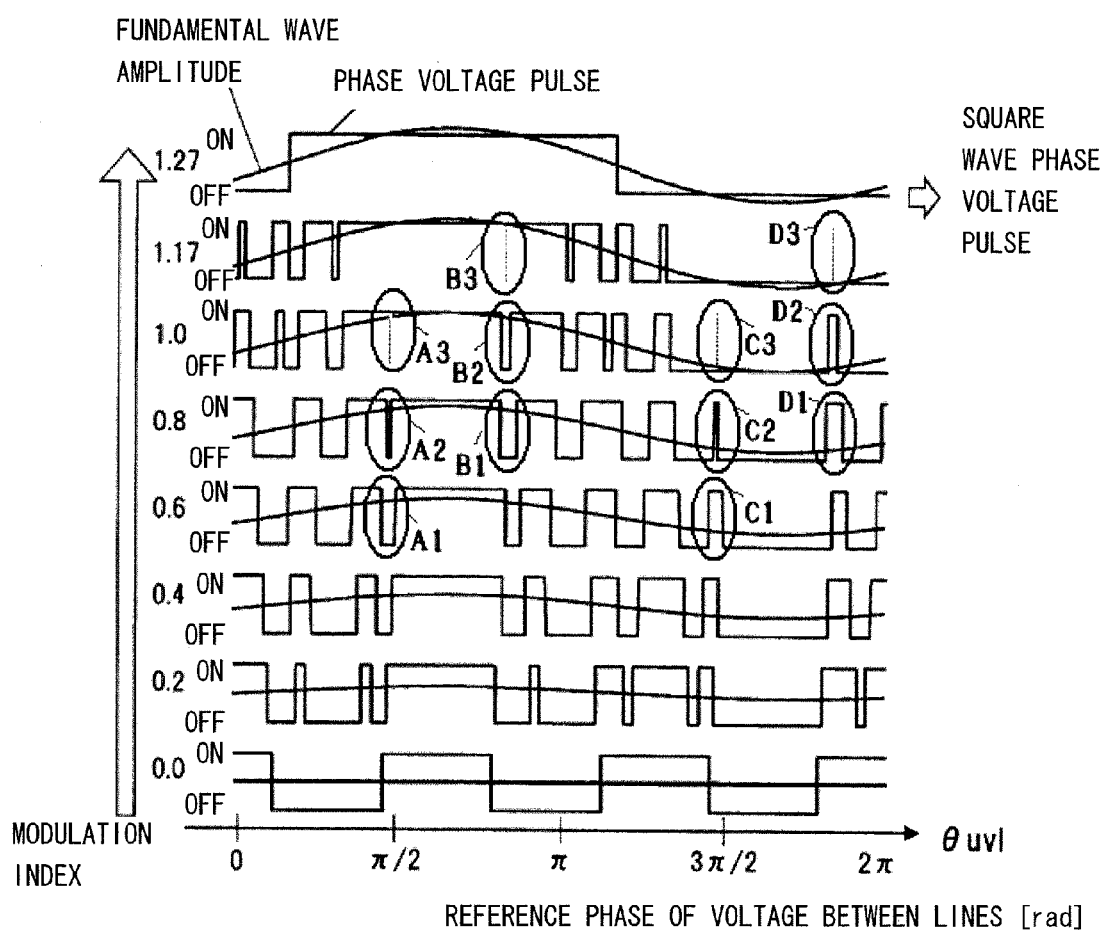
FIG. 27 is a figure showing examples of waveforms of phase voltages in the PHM control mode.

An example showing the pulse waveforms of the voltage between lines shown in FIG. 26 as the corresponding phase voltage pulse waveforms is shown in FIG. 27. It will be understood that, when in FIG. 27 the modulation index becomes 1.17 or greater, the gap between two adjacent pulses disappears, in a similar manner to the case in FIG. 26. It should be understood that there is a phase difference of $\pi/6$ between the phase voltage pulse waveform shown in FIG. 27 and the pulse waveform of the voltage between lines shown in FIG. 26.

In FIG. 27, as the modulation index becomes larger, the width of the low level PHM pulse signal generated by the pulse output circuit 436 gradually narrows down. The ellipses A1 through A3 in FIG. 27 show the intervals in which the corresponding power switching element is in the discontinuous state on the basis of the width of this low level pulse signal. As the modulation index increases, the width of the discontinuity interval of the switching element shown at A1 reduces to that of the discontinuity interval shown at A2, and, when the width of the low level pulse signal becomes shorter than the stipulated time period width as shown at A3, the operation to go discontinuous is eliminated, and the continuous state is maintained without interruption. This type of control is the same for the portion including the ellipses B1 through B3, and is also the same for other portions as well. As the modulation index becomes larger in this way, finally a transition is made to square wave control in which each of the switching elements goes to continuous once in each half cycle of the AC output waveform. The same holds for the second half cycle of the AC waveform, and the same change of operation takes place as shown by the ellipses C1 through C3 and by the ellipses D1 through D3. It should be understood that, since the polarity of the phase voltage in the second half cycle is opposite to its polarity in the first half cycle, accordingly the upper sides of the waveforms shown by the ellipses C1 through C3 and by the ellipses D1 through D3 become discontinuity intervals of the switching elements, and the lower sides of the waveforms become continuity intervals of the switching elements. With the PHM control method, due to the modulation index increasing, gradually the discontinuous intervals of the switching elements become shorter, and it is possible to execute a smooth transition to square wave control. Because of this, the advantageous effect is obtained that it is possible to control the torque and the rotational speed of the motor-generator in a smooth manner.

Figures 28, 29:
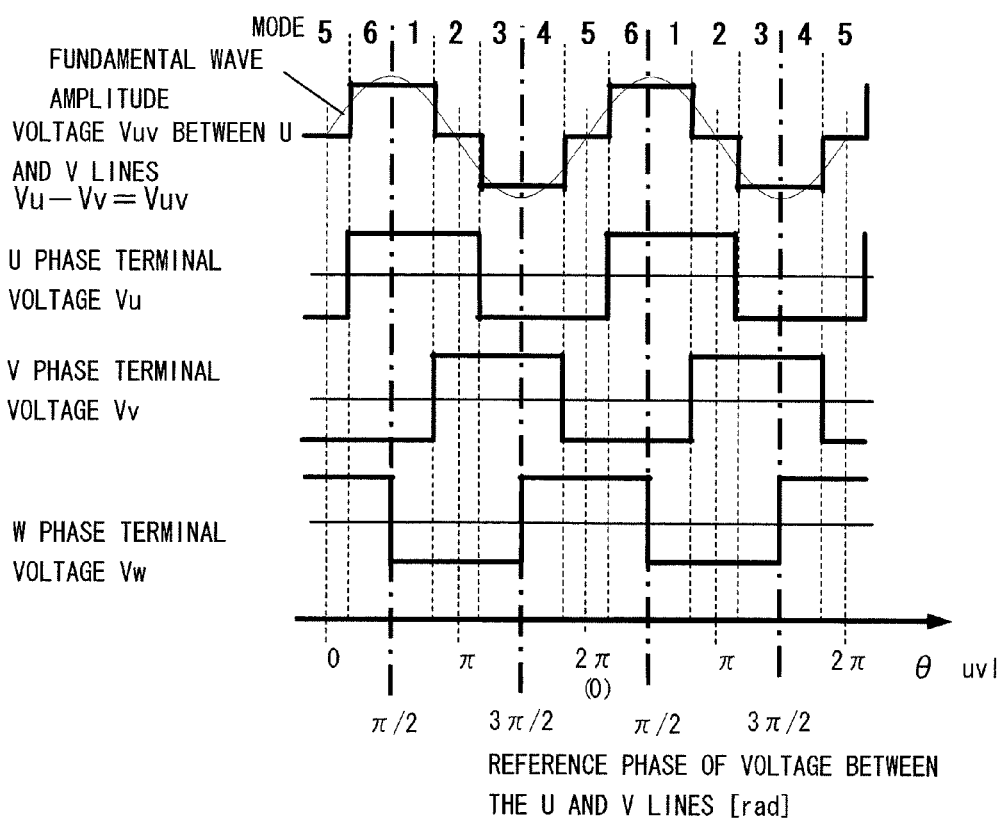
FIG. 28 is a figure showing a conversion table between voltages between lines and phase terminal voltages.
FIG. 29 is a figure showing an example of conversion of pulses of a voltage between lines to phase voltage pulses, in the square wave control mode.

Next, a method for converting the pulses of the voltage between lines to phase voltage pulses will be explained. In FIG. 28, there is shown an example of a conversion table that is employed for converting the pulses of the voltage between lines to phase voltage pulses. The six modes 1 through 6 listed in the column at the left end of this table are numbers allocated to the switching state that currently is in force. The relationships from the voltages between lines to the output voltages are one-to-one with the modes #1 through #6. Each mode is an active interval in which energy transfer takes place between the DC side and the three phase AC side. It should be understood that the voltages between lines of FIG. 28 have been adjusted by normalizing the patterns exhibited as potential differences between the different phases by the battery voltage Vdc.

In FIG. 28, for example, while in mode #1 it is shown that Vuv→1, Vvw→0, and Vwu→−1, this is the way of expressing the relationships Vu−Vv=Vdc, Vv−Vw=0, and Vw−Vu=−Vdc when normalized. The phase terminal voltages at this time (that are proportional to the gate voltages), according to the table of FIG. 28, are shown normalized as Vu→1 (the upper arm of the U phase is ON and the lower arm is OFF), Vv→0 (the upper arm of the V phase is OFF and the lower arm is ON), and Vw→0 (the upper arm of the W phase is OFF and the lower arm is ON). In other words, in the table of FIG. 28, they are shown normalized as Vu=Vdc, Vv=0, and Vw=0. The modes #2 through #6 are established according to similar principles.

An example of conversion of pulses of a voltage between lines to phase voltage pulses using the conversion table of FIG. 28 in the case in which the power switching circuit 144 is being controlled in the square wave mode is shown in FIG. 29. In FIG. 29, the upper portion shows the voltage Vuv between the U and V lines as a representative example of a voltage between lines, while the lower portion shows the corresponding U phase terminal voltage Vu, the corresponding V phase terminal voltage Vv, and the corresponding W phase terminal voltage Vw. As shown in FIG. 29, in the square wave control mode, the mode shown in the conversion table of FIG. 28 changes in order from 1 to 6. It should be understood that no three phase short circuited interval as described hereinafter exists in the square wave control mode.

Figure 24:
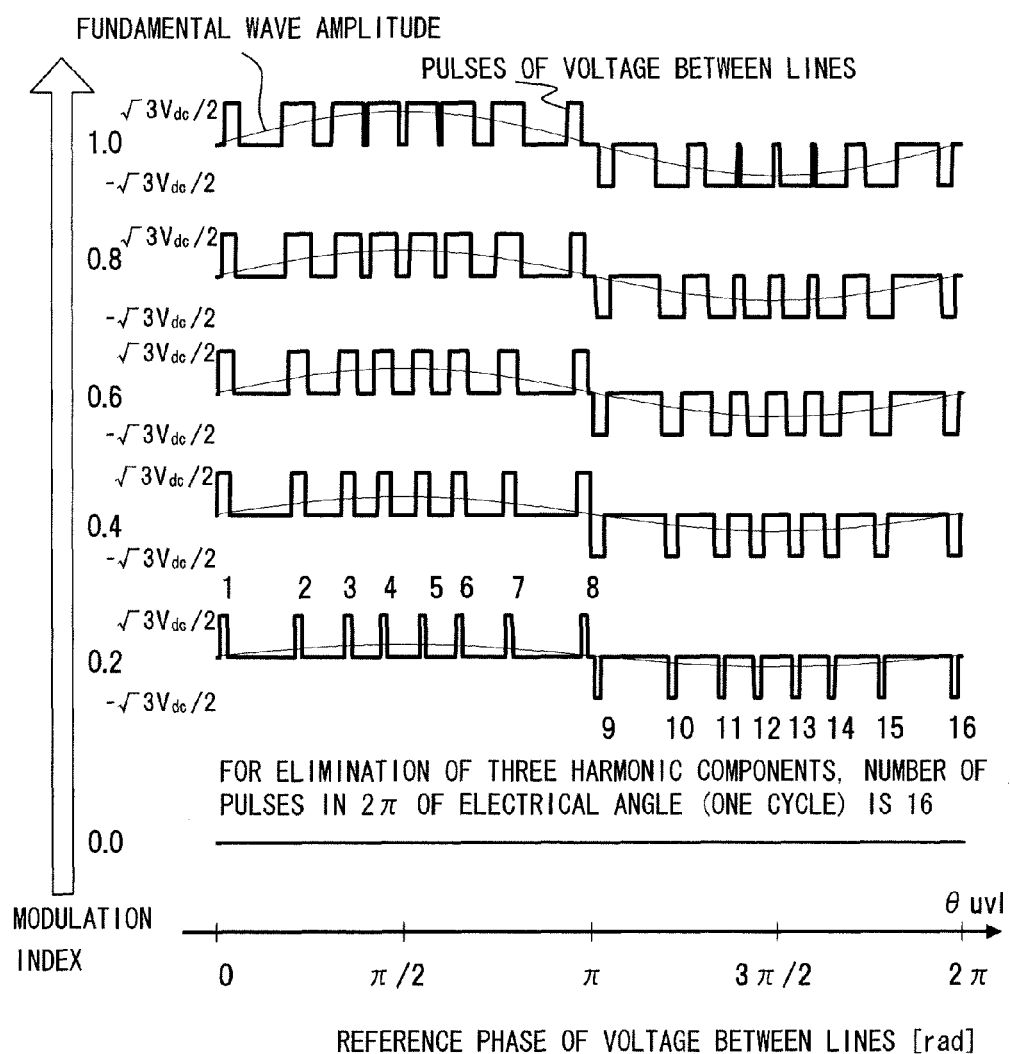
FIG. 24 is a figure showing examples of waveforms of a voltage between lines in the PHM control mode.
Figure 30:
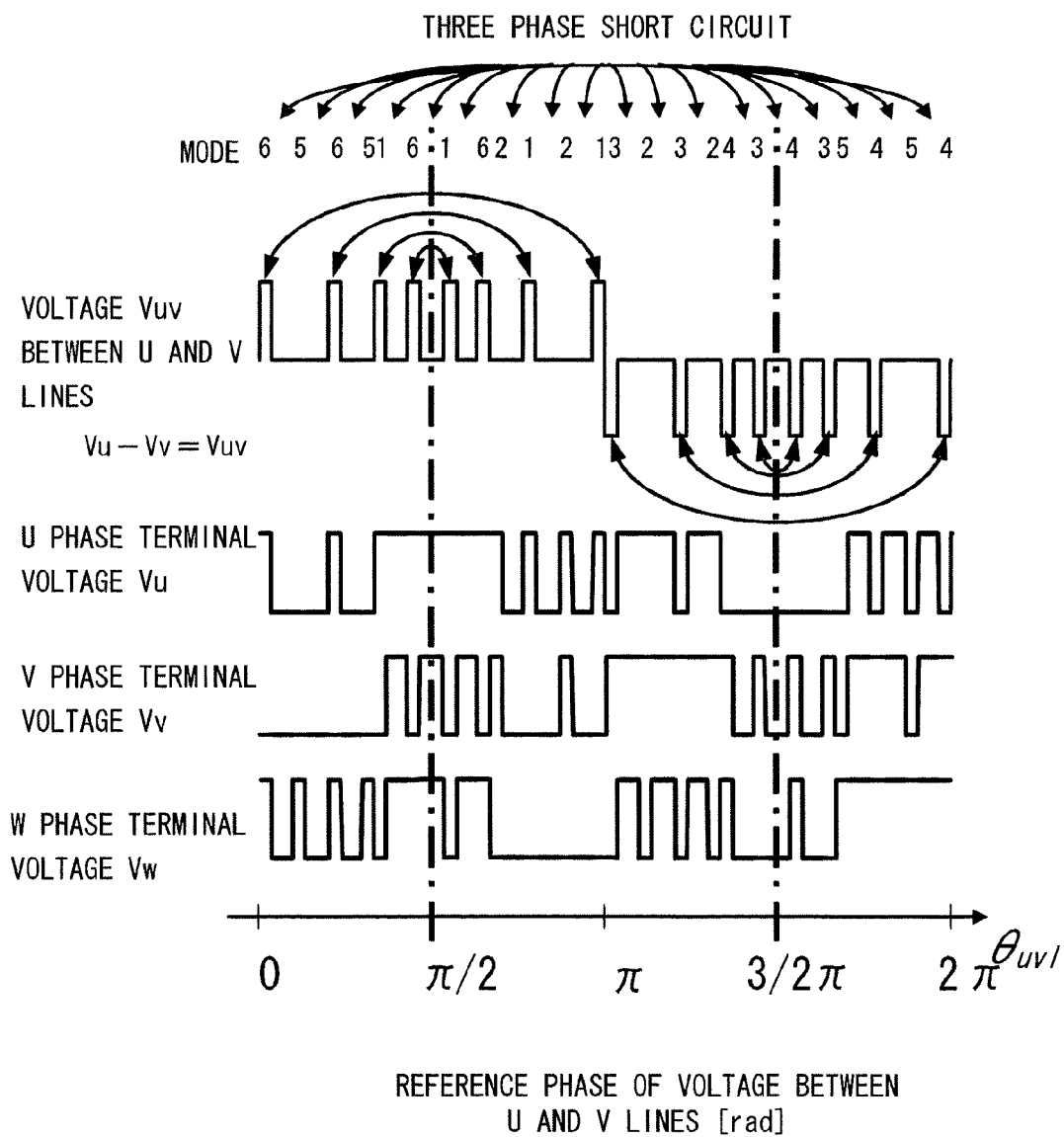
FIG. 30 is a figure showing an example of conversion of pulses of a voltage between lines to phase voltage pulses, in the PHM control mode.

FIG. 30 shows the situation when conversion of the pulse waveform of the voltage between lines shown in the example of FIG. 24 into phase voltage pulses is performed according to the conversion table of FIG. 28. The upper portion of this figure shows the pulses of the voltage between the U and the V lines as a representative example of the voltages between lines, while the lower portion shows the U phase terminal voltage Vu, the V phase terminal voltage Vv, and the W phase terminal voltage Vw.

The number of the mode (i.e. the active interval in which energy transfer takes place between the DC side and the three phase AC side) and the time interval over which a three phase short circuit is created are shown in the upper portion of FIG. 30. In this three phase short circuit interval, while either all of the upper arms for all of the three phases are ON or all of the lower arms for all of the three phases are ON, any of the switch modes may be selected, according to the situation with switching losses and continuity losses.

For example, when the voltage Vuv between the U and V lines is 1, the U phase terminal voltage Vu is 1 and the V phase terminal voltage Vv is 0 (modes #1 and #6). And, when the voltage Vuv between the U and V lines is 0, the U phase terminal voltage Vu and the V phase terminal voltage Vv have the same value, in other words either Vu is 1 and moreover Vv is 1 (mode #2, three phase short circuit), or Vu is 0 and moreover Vv is 0 (mode #5, three phase short circuit). And, when the voltage Vuv between the U and V lines is −1, the U phase terminal voltage Vu is 0 and the V phase terminal voltage Vv is 1 (modes #3 and #4). The phase terminal voltage pulses (i.e. the gate voltage pulses) are generated on the basis of this type of relationship.

Furthermore, in FIG. 30, the patterns of the pulses of voltage between lines and of phase terminal voltage pulses are patterns that repeat quasi-periodically with respect to the phase θuvl at a standard period whose minimum unit is π/3. In other words, the pattern of the U phase terminal voltage in the interval $0 \leq \theta uvl \leq \pi/3$ with 1 and 0 interchanged is the same as the pattern of the W phase terminal voltage in the interval $\pi/3 \leq \theta uvl \leq 2\pi/3$. Moreover, the pattern of the V phase terminal voltage in the interval $0 \leq \theta uvl \leq \pi/3$ with 1 and 0 interchanged is the same as the pattern of the U phase terminal voltage in the interval $\pi/3 \leq \theta uvl \leq 2\pi/3$, and also the pattern of the W phase terminal voltage in the interval $0 \leq \theta uvl \leq \pi/3$ with 1 and 0 interchanged is the pattern of the V phase terminal voltage in the interval $\pi/3 \leq \theta uvl \leq 2\pi/3$. In particular, this characteristic is exhibited prominently in the stationary state in which the rotational speed and the output of the motor-generator 192 are constant.

Here, the modes #1 through #6 described above are defined as a first interval in which the upper arm IGBTs 328 and the lower arm IGBTs 330 are turned ON at different phases and current is supplied to the motor-generator 192 from the battery 136 that constitutes a DC power supply. Furthermore, the three phase short circuit interval is defined as a second interval in which, for all phases, either the upper arm IGBTs 328 or the lower arm IGBTs 330 are turned ON, and the torque is maintained by energy accumulated in the motor-generator 192. It will be understood that, in the example shown in FIG. 30, this first interval and second interval are formed alternatingly according to the electrical angle.

Furthermore, in FIG. 30, in the interval $0 \leq \theta uvl \leq \pi/3$ for example, the modes #6 and #5 are repeated alternatingly as the first interval, on both sides of three phase short circuit intervals as the second interval. As will be understood from FIG. 28, here, in the mode #6, while for the V phase the lower arm IGBT 330 is switched to ON, for the other phases, i.e. for the U phase and the W phase, the IGBTs on the side opposite to that of the V phase, in other words the upper arm IGBTs 328, are switched to ON. On the other hand, in the mode #5, while for the W phase the upper arm IGBT 328 is switched to ON, for the other phases, i.e. for the U phase and the V phase, the IGBTs on the side opposite to that of the W phase, i.e. the lower arm IGBTs 330, are switched to ON. That is to say, in the first interval, some one phase of the U phase, the V phase, and the W phase is selected (in mode #6 the V phase, and in mode #5 the W phase), and, along with switching the upper arm IGBT 328 or the lower arm IGBT 330 for this selected one phase to ON, also, for the other two phases (in mode #6 the U phase and the W phase, and in mode #5 the U phase and the V phase), the IGBTs 328 or 330 for the arms on the side different from that of the one phase that is selected are switched to ON. Furthermore, the selected one phase (the V phase or the W phase) is changed over for each successive first interval.

And, in the intervals other than the interval $0 \leq \theta uvl \leq \pi/3$ as well, in a similar manner to that described above, certain ones of the modes #1 through #6 are alternatingly repeated as the first interval, interleaved with the three phase short circuit interval being repeated as the second interval. In other words: in the interval $\pi/3 \leq \theta uvl \leq 2\pi/3$, the modes #1 and #6 are repeated alternatingly; in the interval $2\pi/3 \leq \theta uvl \leq \pi$, the modes #2 and #1 are repeated alternatingly; in the interval $\pi \leq \theta uvl \leq 4\pi/3$, the modes #3 and #2 are repeated alternatingly; in the interval $4\pi/3 \leq \theta uvl \leq 5\pi/3$, the modes #4 and #3 are repeated alternatingly; and in the interval $5\pi/3 \leq \theta uvl \leq 2\pi$, the modes #5 and #4 are repeated alternatingly. Due to this, in a similar manner to that described above, in the first interval, any single one of the U phase, the V phase, and the W phase is selected, and, for the selected phase, the upper arm IGBT 328 or the lower arm IGBT 330 is switched to ON, and also, for the other two phases, the IGBTs 328 or 330 for the arms on the side that is different from the side of the single phase that is selected are switched to ON. Furthermore, the selection of the single phase is changed over for each successive first interval.

Now, according to a command to the motor-generator 192 for requesting torque or rotational speed or the like, it is possible to change the electrical angle position at which the first interval described above (in other words, the interval of the modes #1 through #6) is formed, and the length of that interval. In other words, in order to change the number of orders of harmonic components to be eliminated along with change of the rotational speed or the torque of the motor-generator 192 as previously described, the specified electrical angle position at which the first interval is formed may be changed. Or, according to change of the rotational speed or the torque of the motor-generator 192, the length of the first interval, in other words the pulse width, may be changed, so that the modulation index is changed. Due to this, the waveform of the AC current flowing in the motor-generator 192, in more concrete terms the harmonic components of this AC current, are changed to the desired values, and, due to this change, it is possible to control the power that is supplied from the battery 136 to the motor-generator 192. It should be understood that it would be acceptable either to change only one of the specified electrical angle position and the length of the first interval, or alternatively to change both of them simultaneously.

Now, the following relationship holds between the shape of the pulses and the voltage. The width of the pulses shown in the figure acts to change the effective value of the voltage, and when the pulse width of the voltage between lines is broad the effective value of the voltage is large, while when it is narrow the effective value of the voltage is small. Furthermore, since the effective value of the voltage is high when the number of harmonic components to be eliminated is small, accordingly the waveform approaches a rectangular wave at the upper limit of the modulation index. This effect is beneficial when the electric motor (i.e. the motor-generator 192) is rotating at high speed so that it is possible to perform output for the motor while exceeding the upper limit of output that could be obtained if control were being performed by normal PWM. In other words, by changing the length of the first interval during which power is supplied to the motor-generator 192 from the battery 136 that constitutes a DC power source and the specified electrical angle position at which this first interval is formed, it is possible to obtain output corresponding to the rotational state of the motor generator 192 by changing the effective value of the AC voltage that is applied to the motor-generator 192.

Furthermore, for each of the U phase, the V phase, and the W phase, the pulse shape of the drive signal shown in FIG. 30 is left and right asymmetric about any θuvl, in other words about any electrical angle. Moreover, at least one of the pulse ON interval or the pulse OFF interval includes a continuous interval over π/3 or more of θuvl (electrical angle). For example, for the U phase, there is an ON interval of π/6 or more in length both before and after a center near θuvl=π/2, and there is also an OFF interval of π/6 or more in length both before and after a center near θuvl=3π/2. In a similar manner, for the V phase, there is an OFF interval of π/6 or more in length both before and after a center near θuvl=π/6, and there is also an ON interval of π/6 or more in length both before and after a center near θuvl=7π/6; and, for the W phase, there is an OFF interval of π/6 or more in length both before and after a center near θuvl=5π/6, and there is also an ON interval of π/6 or more in length both before and after a center near θuvl=11π/6. The system has this type of characteristic pulse shape.

As has been explained above, according to the power conversion device of this embodiment, when the PHM control mode is selected, a first interval in which power is supplied from the DC power supply to the motor-generator 192, and a second interval in which the upper arms for all the phases or the lower arms for all the phases of this three phase full bridge circuit are switched to ON, are generated alternately at a specified timing according to electrical angle. Due to this, it is possible to manage with a switching frequency that is from 1/7 to 1/10 as compared to that for control in the PWM mode. Accordingly, it is possible to reduce the switching losses. In addition, it is also possible to alleviate EMC (electromagnetic noise).

Figure 31A:
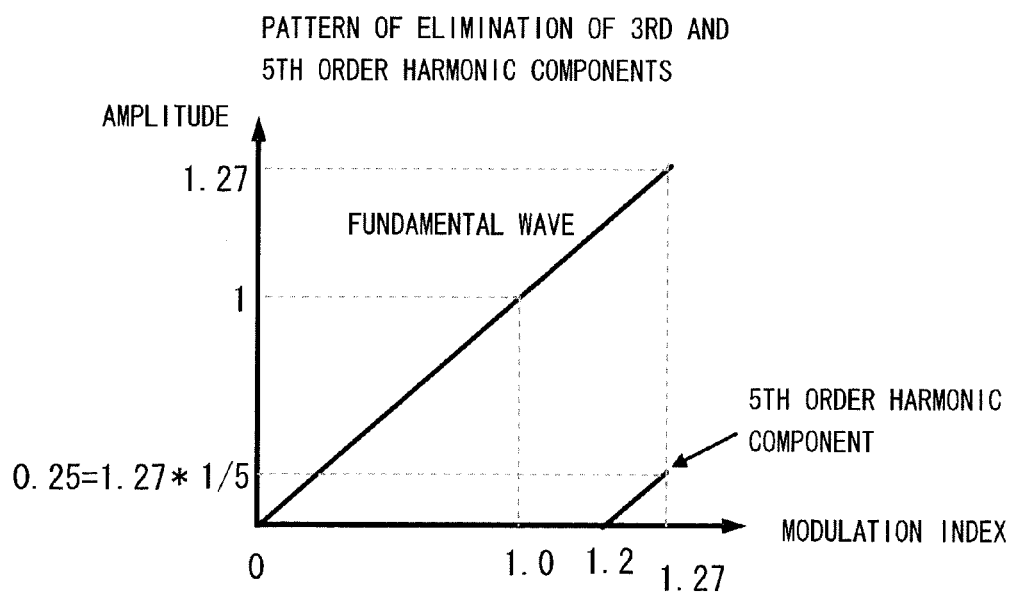
FIGS. 31A and 31B are figures showing the magnitude of the amplitude of the fundamental wave of a pulse voltage between lines, and the magnitudes of the amplitudes of the harmonic components that are to be eliminated, as the modulation index is changed.
Figure 31B:
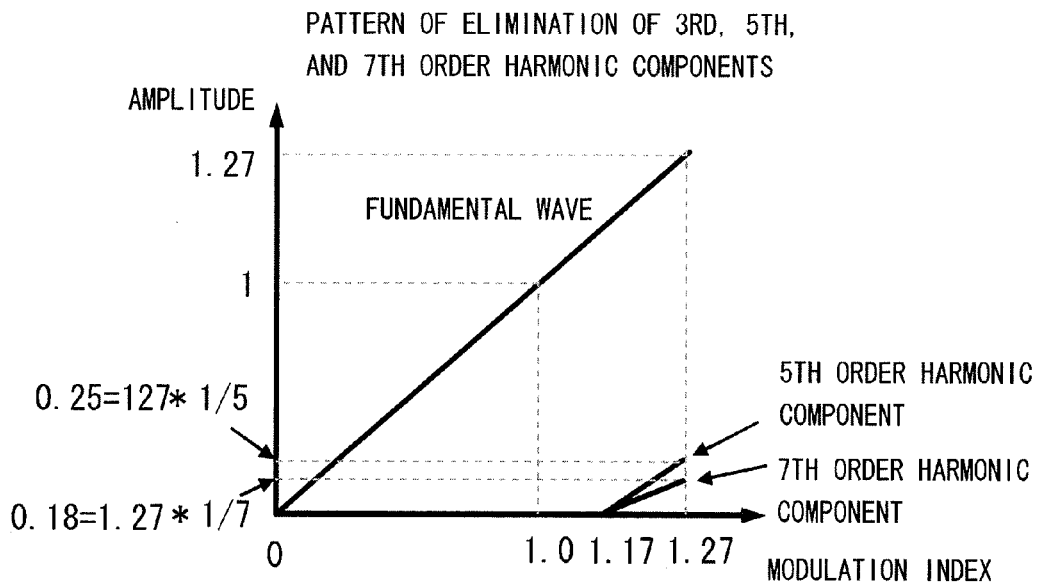

Next, the situation will be explained in relation to elimination of harmonic components in the pulse waveform of the voltage between lines when the modulation index is changed, as in the example shown in FIG. 26. FIGS. 31A and 31B are figures showing the magnitudes of the amplitudes of the harmonic components that are to be eliminated in the pulse waveform of the voltage between lines, as the modulation index is changed.

In FIG. 31A, by way of example, the amplitudes are shown of the fundamental wave and of certain harmonic components in a pulse voltage between lines that is a subject for elimination of the harmonic components of the third order and of the fifth order. According to this figure it will be understood that, in the range of modulation index of 1.2 and higher, the fifth order harmonic component appears to some extent because it can no longer be completely eliminated. And, in FIG. 31B, the amplitudes are shown of the fundamental wave and of certain harmonic components in a pulse voltage between lines that is a subject for elimination of the harmonic components of the third order, of the fifth order, and of the seventh order. According to this figure it will be understood that, in the range of modulation index of 1.17 and higher, the fifth order harmonic component and the seventh order harmonic component appear to some extent because they can no longer be completely eliminated.

Figure 32:
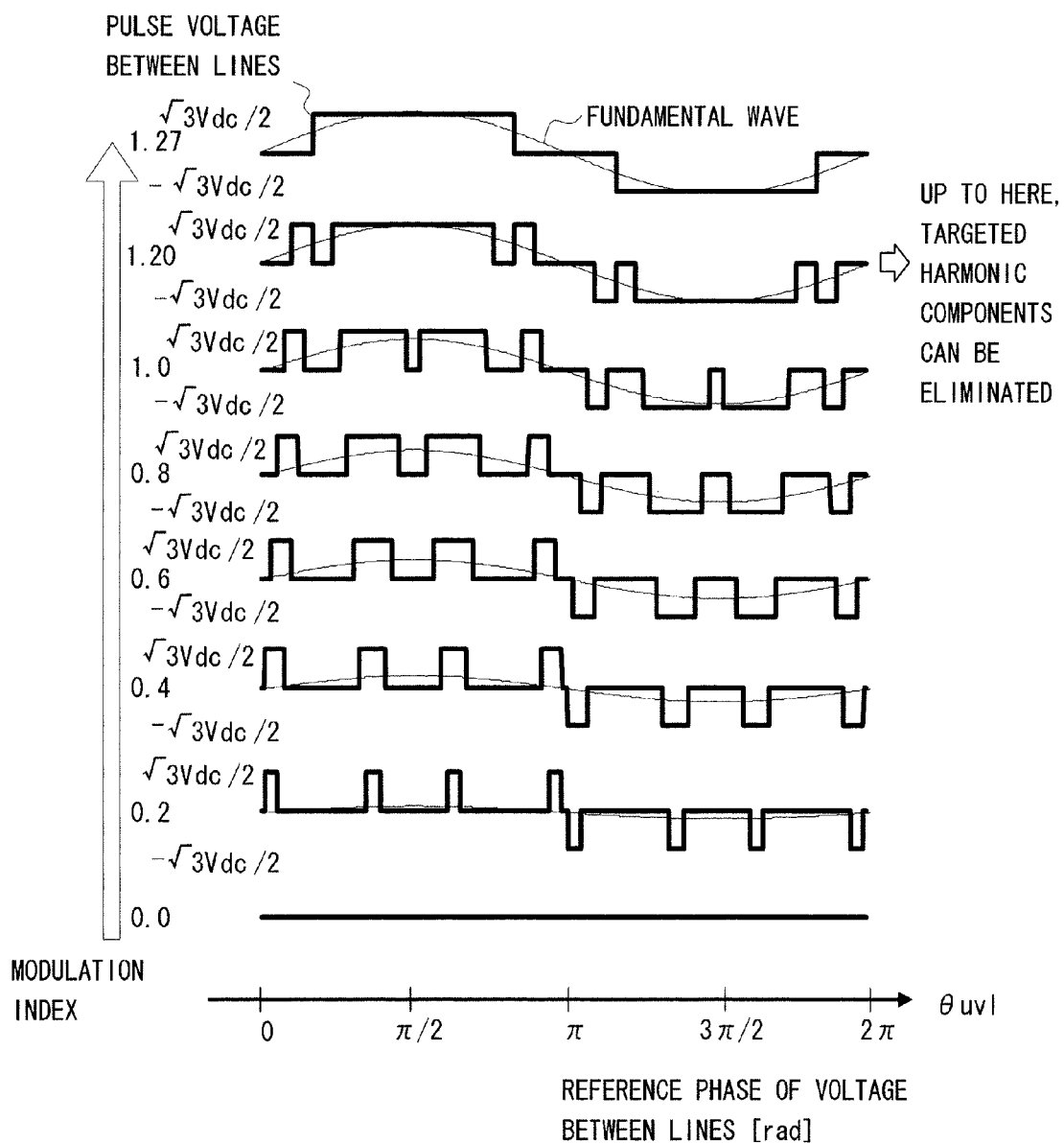
FIG. 32 is a figure showing an example of a waveform of a voltage between lines in the PHM control mode.
Figure 33:
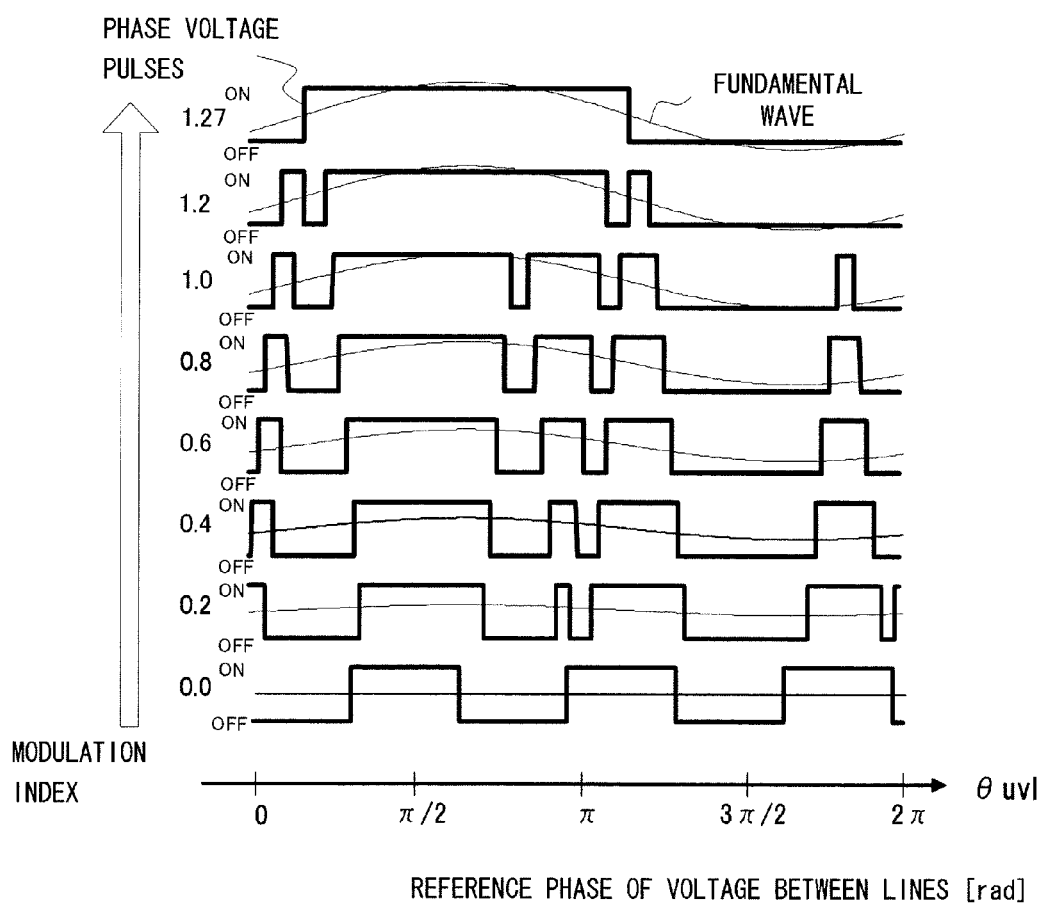
FIG. 33 is a figure showing an example of a phase voltage waveform in the PHM control mode.

It should be understood that examples of the pulse waveform of the voltage between lines and of the phase voltage pulse waveform corresponding to FIG. 31A are shown in FIGS. 32 and 33 respectively. Here, examples of the pulse waveform of the voltage between lines and of the phase voltage pulse waveform are shown that result from setting up a row vector whose number of elements is 2, selecting the values of $k_1=1$ and $k_2=3$ for the elements ($k_1/3$, $k_2/5$), and changing the modulation index from 0 to 1.27. Furthermore, FIG. 31B corresponds to the pulse waveform of the voltage between lines and of the phase voltage pulse waveform shown in FIGS. 26 and 27 respectively.

From the above explanation, it will be understood that, when a fixed threshold value of the modulation index is exceeded, the harmonic component or components that are the subject of elimination start to appear because they cannot be completely eliminated. Furthermore it will be understood that, the more are the types (i.e. the greater is the number) of harmonic components that are targeted for elimination, the lower is the threshold value of the modulation index at which it becomes no longer possible to eliminate those harmonic components entirely.

Figure 34A:
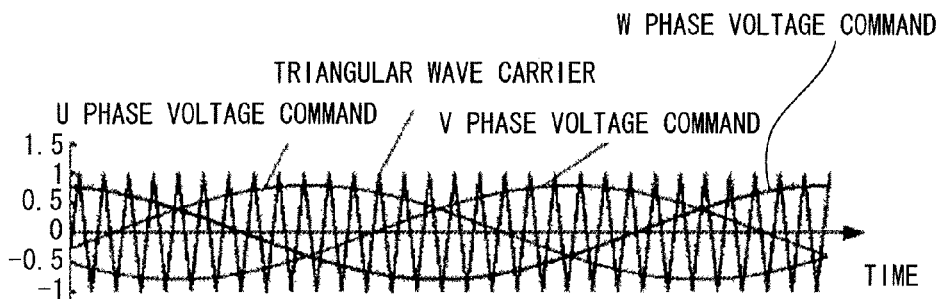
FIGS. 34A, 34B, 34C, 34D, and 34E are figures for explanation of a method of generating PWM pulse signals.
Figure 34B:
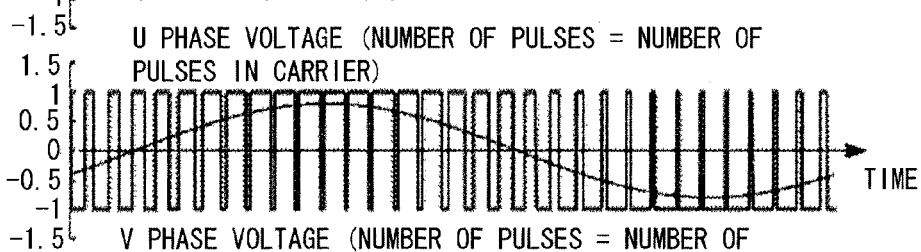
Figure 34C:
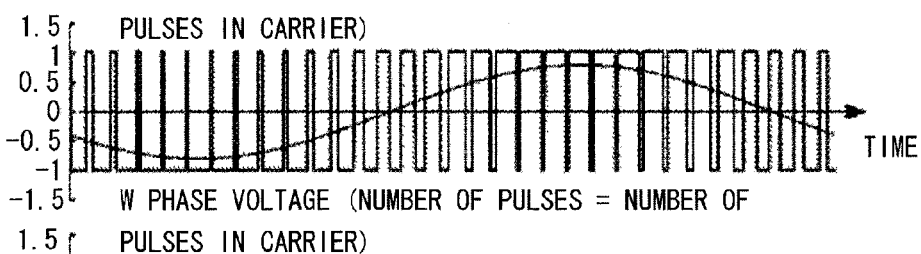
Figure 34D:
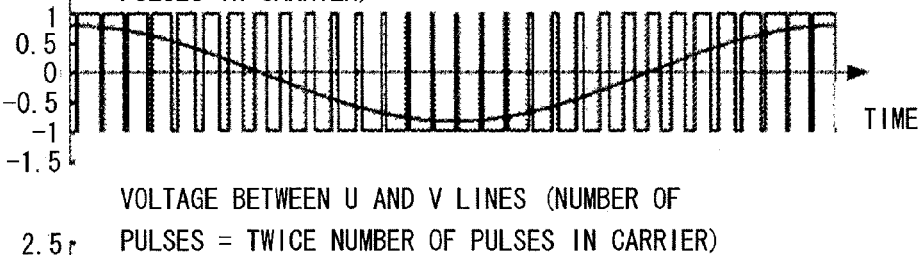

Next, the method by which the PWM pulse signals are generated by the pulse modulator 440 for PWM control will be explained with reference to FIGS. 34A through 34E. FIG. 34A shows the waveforms of the voltage command signals for each of the U phase, the V phase, and the W phase, and the waveform of the triangular wave carrier that is used for generating the PWM pulses. The voltage command signals for the three phases are sine wave command signals that are mutually phase shifted apart by 2π/3, and their amplitudes change according to the modulation index. These voltage command signals are compared with the triangular wave carrier signal for each of the U, V, and W phases, and the voltage pulse waveforms for each of the U phase, the V phase, and the W phase shown in FIGS. 34B, 34C, and 34D respectively are generated by taking their respective points of intersection as the timings for turning the respective pulses ON and OFF. It should be understood that the number of pulses in each of these pulse waveforms is equal to the number of triangular wave pulses in the triangular wave carrier.

Figure 34E:

And FIG. 34E shows the waveform of the voltage between the U and V lines. The number of pulses here is equal to twice the number of triangular wave pulses in the triangular wave carrier; in other words, the number of pulses is twice the number in each of the voltage pulse waveforms for each of the phases as described above. It should be understood that the same holds for the other voltages between lines, in other words for the voltage between the V and W lines and for the voltage between the W and U lines.

Figure 35:
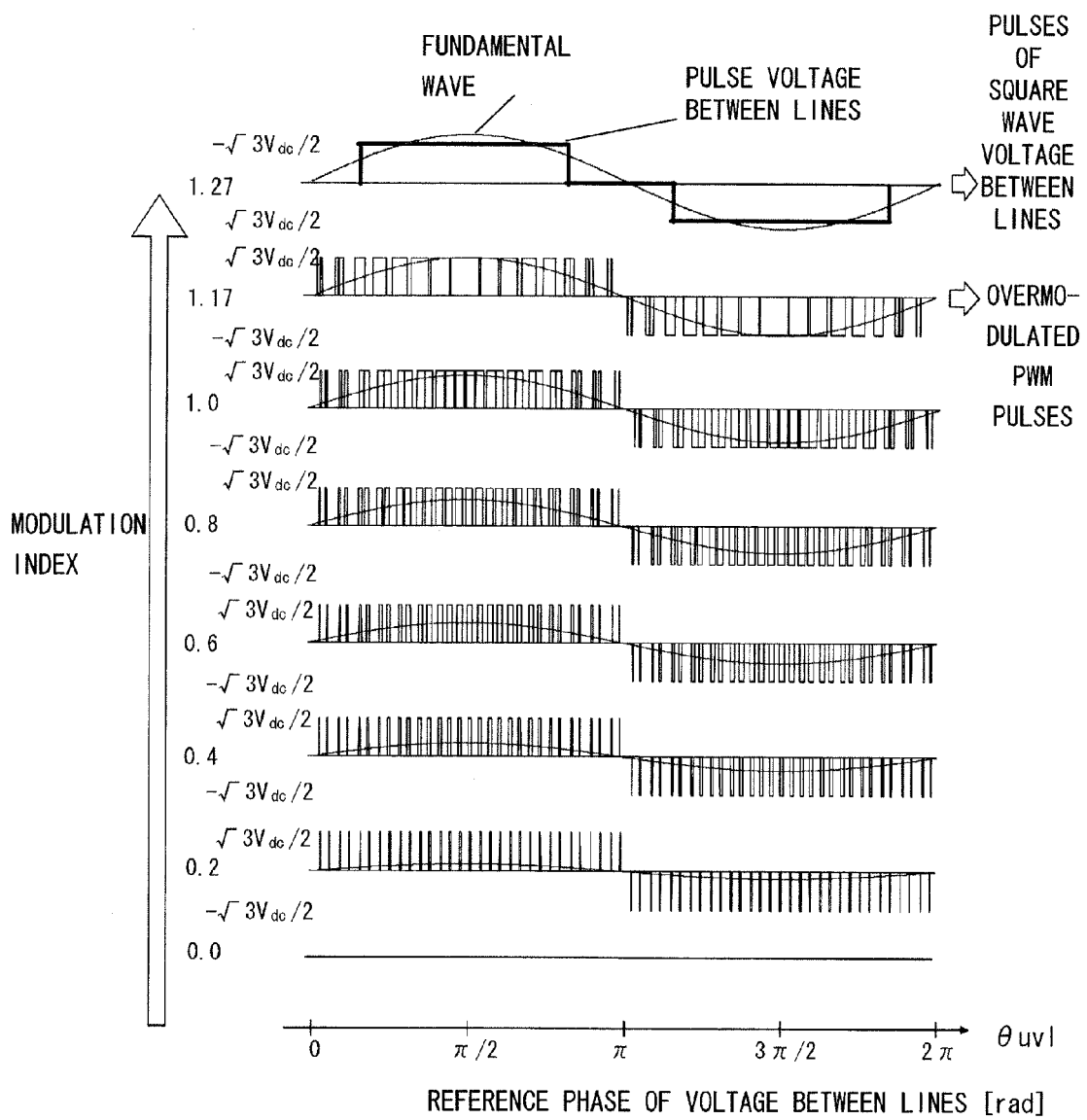
FIG. 35 is a figure showing examples of a waveform of a voltage between lines in the PWM control mode.

FIG. 35 shows examples of the waveforms of a voltage between lines created according to a PWM pulse signal, drawn for various modulation indices. Here, examples are shown of the pulse waveform of a voltage between lines when the modulation index changes from 0 to 1.27. In FIG. 35, when the modulation index becomes 1.17 or greater, the gaps between one or more pairs of adjacent pulses disappear, and they become combined into a single pulse. This type of pulse signal is termed an over-modulated PWM pulse signal. And finally, at a modulation index of 1.27, the pulse waveform of the voltage between lines becomes a square wave.

Figure 36:
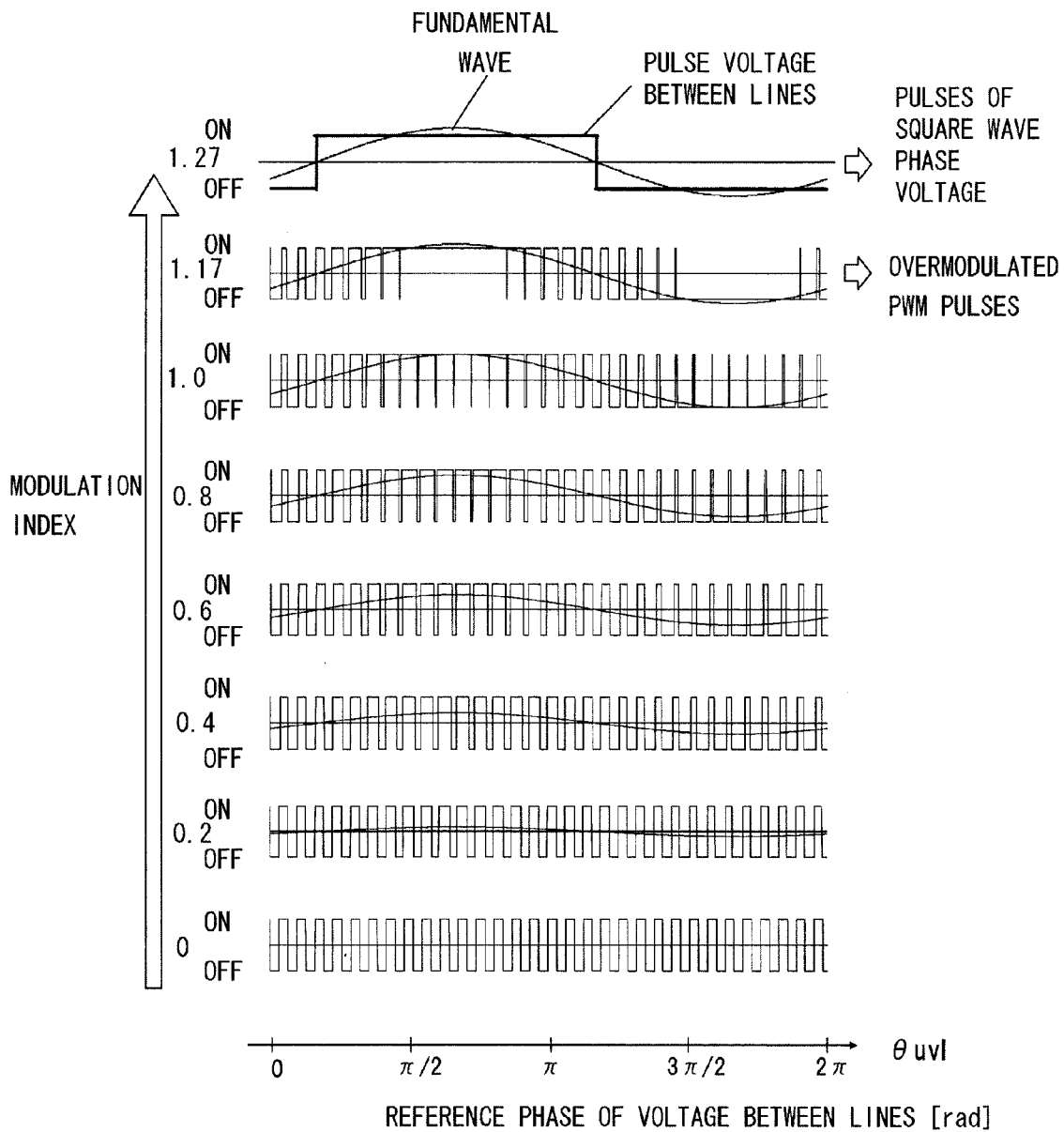
FIG. 36 is a figure showing examples of a phase voltage waveform in the PWM control mode.

Examples are shown in FIG. 36 of the phase voltage pulse waveforms that correspond to the waveforms of the voltage between lines shown in FIG. 35. It will be understood that in FIG. 36, in a similar manner to the case with FIG. 35, when the modulation index becomes 1.17 or greater, the gaps between one or more pairs of adjacent pulses disappear. It should also be understood that there is a phase difference of π/6 between the phase voltage pulse waveform shown in FIG. 36 and the pulse waveform of the voltage between lines shown in FIG. 35.

Figure 37A:
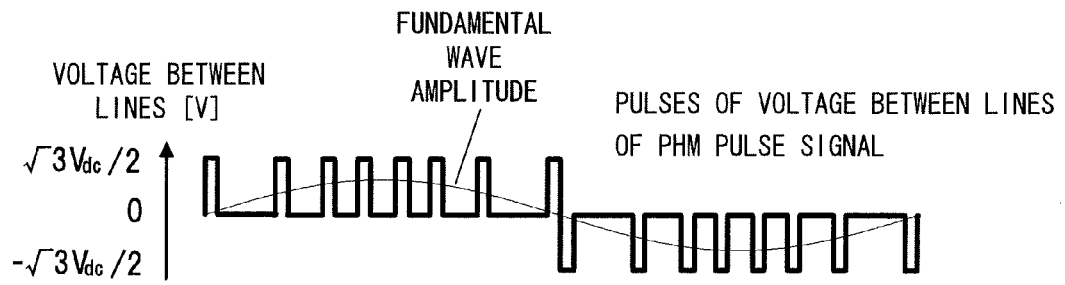
FIGS. 37A and 37B are figures for comparison of the pulse waveform of a voltage between lines due to a PHM pulse signal with the pulse waveform of a voltage between lines due to a PWM pulse signal.
Figure 37B:
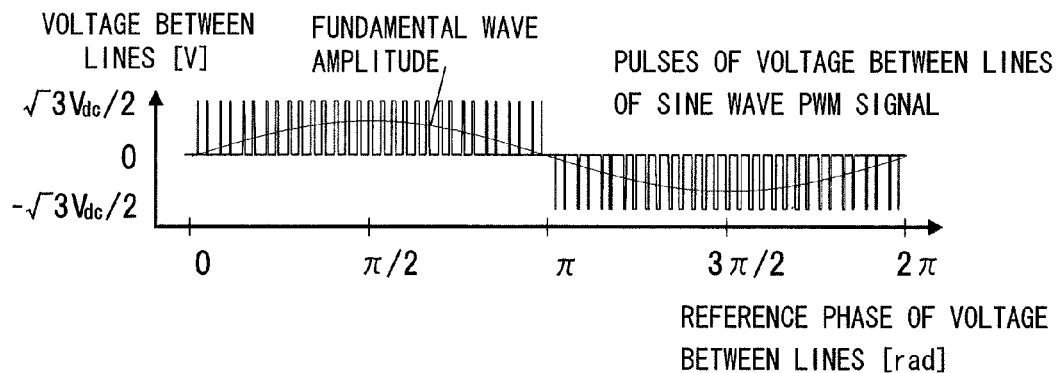

Now, the pulse waveform of the voltage between lines due to a PHM pulse signal and the pulse waveform of the voltage between lines due to a PWM pulse signal will be compared together. FIG. 37A shows an example of the pulse waveform of the voltage between lines due to a PHM pulse signal. This corresponds to the pulse waveform of the voltage between lines in FIG. 24 for a modulation index of 0.4. On the other hand, FIG. 37B shows an example of the pulse waveform of the voltage between lines due to a PWM pulse signal. This corresponds to the pulse waveform of the voltage between lines in FIG. 35 for a modulation index of 0.4.

When the numbers of pulses in FIG. 37A and in FIG. 37B are compared together, it will be understood that the pulse waveform of the voltage between lines due to a PHM pulse signal shown in FIG. 37A has far fewer pulses than the pulse waveform of the voltage between lines due to a PWM pulse signal shown in FIG. 37B. Accordingly, if a PHM pulse signal is used, while the control responsiveness is reduced as compared to the case of a PWM signal due to the number of pulses of the voltages between lines that are generated being decreased, on the other hand it is possible greatly to reduce the number of times that switching is performed, as compared to the case of a PWM signal. As a result, it is possible greatly to reduce the switching losses.

Figure 38:
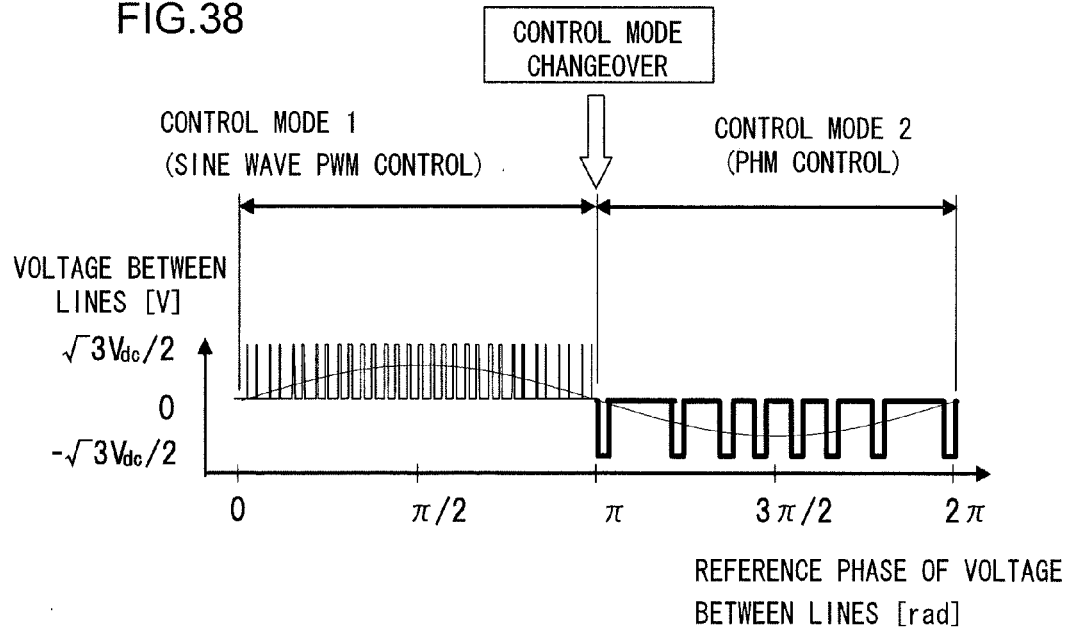
FIG. 38 is a figure showing the situation when changeover is performed between the PWM control mode and the PHM control mode.

FIG. 38 shows the situation when changing over between the PWM control mode and the PHM control mode is performed by the changeover operation of the changeover device 450. Here an example is shown of the pulse waveform of the voltage between lines when the control mode is changed over from the PWM control mode to the PHM control mode, due to the source selected by the changeover device 450 being changed over from the PWM pulse signal to the PHM pulse signal at the time point that θuvl=π.

Next, the difference between the shapes of the pulses in PWM control and in PHM control will be explained with reference to FIGS. 39A and 39B. FIG. 39A shows a triangular wave carrier that is used for generating a PWM pulse signal, and the U phase voltage, the V phase voltage, and the voltage between the U and V lines that are generated due to this PWM pulse signal. And FIG. 39B shows the U phase voltage, the V phase voltage, and the voltage between the U and V lines that are generated due to a PHM pulse signal. When these two figures are compared together it will be understood that, by contrast to the case when a PWM pulse signal is used in which the pulse widths of the pulses of the voltage between the U and V lines are not constant, when a PHM pulse signal is used, the pulse widths of the pulses of the voltage between the U and V lines are constant. It should be understood that in some cases, as previously described, some of the pulse widths are not actually constant, but this is a phenomenon due to a pulse having positive amplitude and a pulse having negative amplitude being overlapped, and all of the pulses have the same width if such pulse overlapping is decomposed. Furthermore it will be understood that, by contrast to the situation when a PWM pulse signal is used in which, since the triangular wave carrier is constant irrespective of variations of the motor rotational speed, accordingly the intervals between the pulses of the voltage between the U and V lines are also constant irrespective of the motor rotational speed, on the other hand, when a PHM pulse signal is used, the intervals between the pulses of the voltage between the U and V lines change according to the motor rotational speed.

Figure 40A:
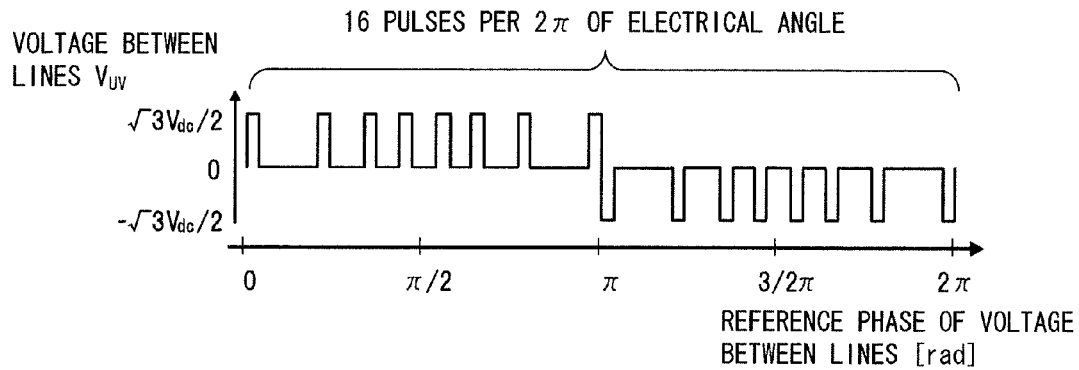
FIGS. 40A, 40B, and 40C are figures showing the relationship between motor rotational speed and the pulse waveform of a voltage between lines due to a PHM pulse signal.
Figure 40B:
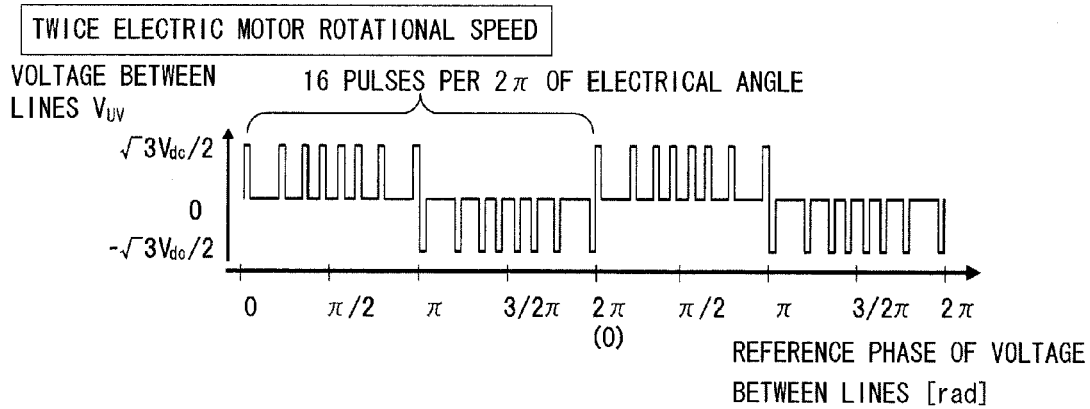
Figure 40C:
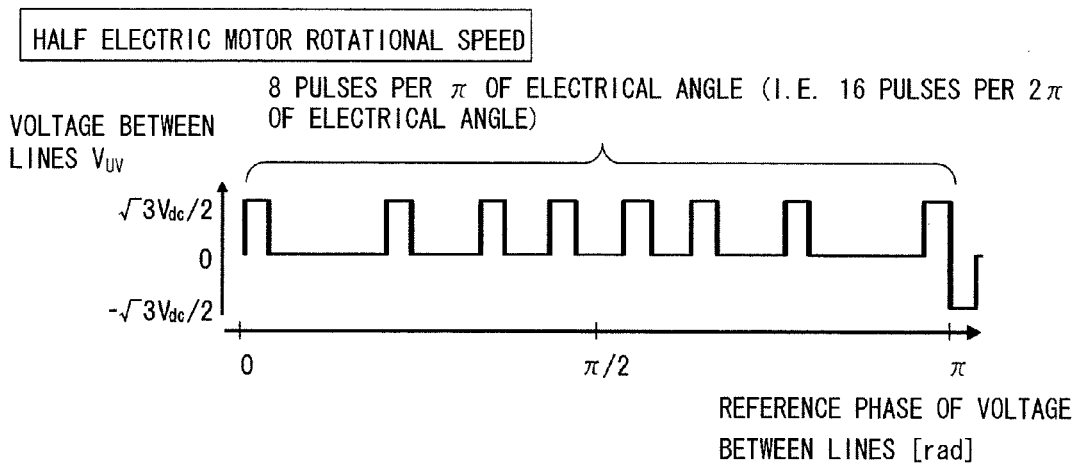

FIGS. 40A, 40B, and 40C show the relationship between the motor rotational speed and the pulse waveform of the voltage between lines due to a PHM pulse signal. FIG. 40A shows an example of a pulse waveform of a voltage between lines due to a PHM pulse signal, at a predetermined motor rotational speed. This corresponds to the pulse waveform of the voltage between lines in FIG. 24 for a modulation index of 0.4, and has 16 pulses per 2π of electrical angle (i.e. of the reference phase θuvl of the voltage between the U and V lines).

And FIG. 40B shows an example of a pulse waveform of a voltage between lines due to a PHM pulse signal at a motor rotational speed that is twice that of FIG. 40A. It should be understood that the length of the horizontal time axis in FIG. 40B is equivalent to that of the horizontal time axis in FIG. 40A. When FIG. 40A and FIG. 40B are compared together, it will be understood that, while the number of pulses per 2π of electrical angle is 16 in both cases and does not change, in the case of FIG. 40B the number of pulses in the same period of time is twice that in the case of FIG. 40A.

Moreover, FIG. 40C shows an example of a pulse waveform of a voltage between lines due to a PHM pulse signal at a motor rotational speed that is half that of FIG. 40A. It should be understood that the length of the horizontal time axis in FIG. 40C is equivalent to that of the horizontal time axis in FIG. 40A, just as in the case of FIG. 40B. When FIG. 40A and FIG. 40C are compared together, it will be understood that, while the number of pulses per 2π of electrical angle is 16 in both cases and does not change, in the case of FIG. 40C the number of pulses in the same period of time is half that in the case of FIG. 40A, since the number of pulses per π of electrical angle in FIG. 40C is 8.

As has been explained above, when a PHM pulse signal is used, the number of pulses of the pulse voltage between lines per unit time changes in proportion to the motor rotational speed. In other words, when the number of pulses per 2π of electrical angle is considered, this is constant irrespective of the motor rotational speed. On the other hand, when a PWM pulse signal is used, as has been explained above in connection with FIGS. 39A and 39B, the number of pulses of the voltage between lines per unit time is constant irrespective of the motor rotational speed. In other words, when the number of pulses per 2π of electrical angle is considered, this decreases as the motor rotational speed increases.

Figure 41:
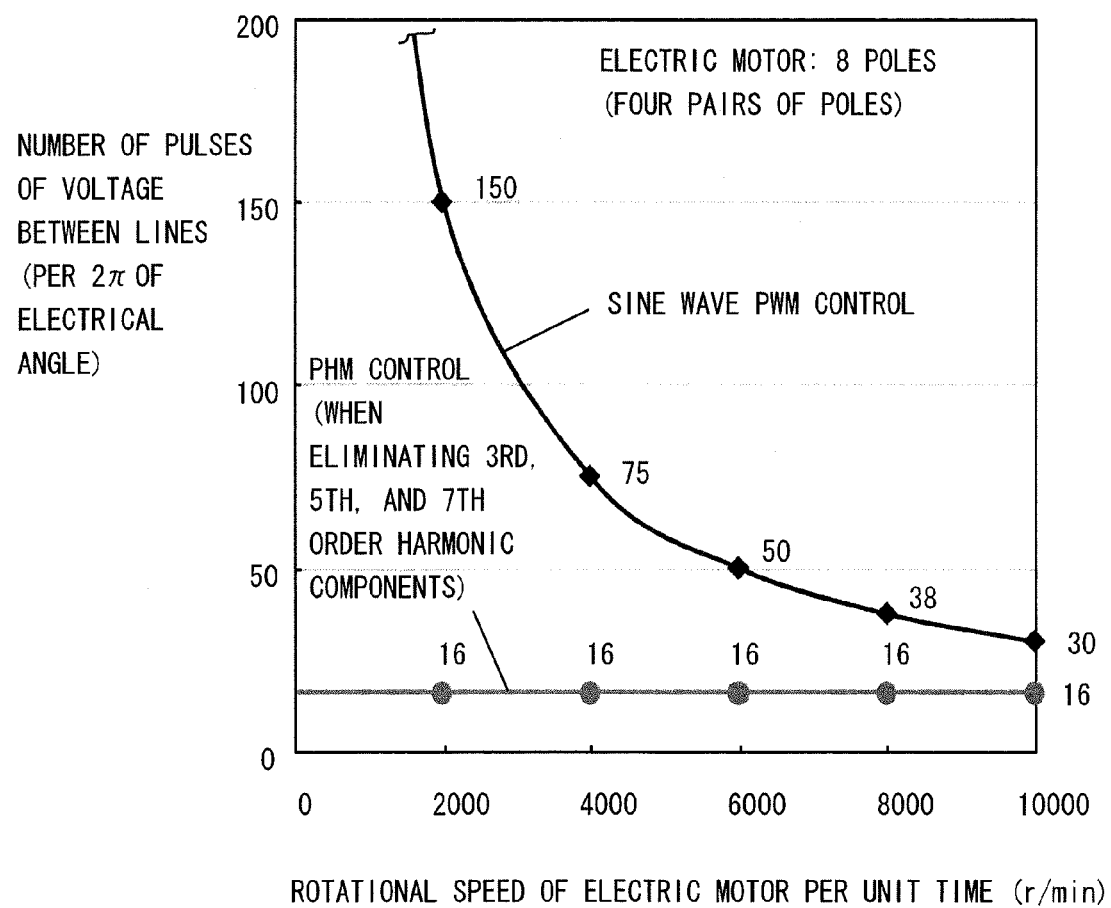
FIG. 41 is a figure showing a relationship between the number of pulses of voltages between lines generated in PHM control and in PWM control, and motor rotational speed.

FIG. 41 shows the relationships between the numbers of pulses of the voltage between lines per 2π of electrical angle (in other words, per one cycle of the voltage between lines) generated with each of PHM control and PWM control, and motor rotational speed. It should be understood that, in FIG. 41, an example is shown for a case in which an eight pole motor is used (i.e. a motor having four pairs of poles), the harmonic components that are targeted for elimination by PHM control are the components of the third, fifth, and seventh orders, and the frequency of the triangular wave carrier used in the sine wave PWM control is 10 kHz. It will be understood that in this manner, while in the case of PWM control the number of pulses of the voltage between lines per 2π of electrical angle progressively decreases as the motor rotational speed rises, by contrast in the case of PHM control it is constant irrespective of the motor rotational speed. It should be understood that the number of pulses of the voltage between lines in PWM control may be obtained with the following Equation (10):

number of pulses of voltage between lines=frequency of triangular wave carrier/{(number of pole pairs×motor rotational speed/60}×2    (10)

It should be understood that while, in FIG. 41, the number of pulses per one cycle of the voltage between lines is shown as being 16 in the case that the number of harmonic components that are subjects for elimination by PHM control is three, this value changes as previously described according to the number of harmonic components that are subjects for elimination. That is to say, if the number of harmonic components that are subjects for elimination is two, this number of pulses per one cycle is 8; if the number of harmonic components to be eliminated is four, the number of pulses per one cycle is 32; if the number of harmonic components to be eliminated is five, the number of pulses per one cycle is 64; and every time the number of harmonic components to be eliminated increases by one, the number of pulses of the voltage between lines per one cycle is doubled.

According to the first embodiment as explained above, in addition to the beneficial operational effects described above, the following further advantageous operational effects may also be obtained.

(1) The power conversion device 140 includes the three phase full bridge type power switching circuit 144 that includes the IGBTs 328 and 330 for the upper arms and the lower arms and the control unit 170 that outputs drive signals to the IGBTs 328 and 330 for each of the phases, converts the voltage supplied from the battery 136 to output voltages spaced apart by 2π/3 of electrical angle by the switching operation of these IGBTs 328 and 330 according to these drive signals, and supplies these output voltages to the motor-generator 192. This power conversion device 140 changes over between the PHM control mode and the sine wave PWM control mode on the basis of a predetermined condition. In the PHM control mode, a first interval in which the IGBTs 328 for the upper arms and the IGBTs 330 for the lower arms are turned on for different phases and current is supplied from the battery 136 to the motor-generator 192, and a second interval in which, for all of the phases, either all of the IGBTs 328 for the upper arms or all of the IGBTs 330 for the lower arms are turned ON and torque is maintained by the energy accumulated in the motor-generator 192, are created alternatingly according to electrical angle. And, in the sine wave PWM control mode, the IGBTs 328 and 330 are turned on and current is supplied from the battery 136 to the motor-generator 192, according to pulse widths that are determined on the basis of the results of comparison between sine wave command signals and a carrier wave. Since this is done, along with being able to reduce torque pulsations and switching losses, it is also possible to perform appropriate control according to the state of the motor-generator 192.

(2) In the PHM control mode, the control circuit 172 of the control unit 170 calculates states for the IGBTs 328 and 330 on the basis of the input information repeatedly at a predetermined control cycle, and, according to the results of these calculations, generates control signals for controlling the continuity and discontinuity of the IGBTs 328 and 330 at timings based upon the AC output to be generated by the power switching circuit 144, for example on the phase of this AC output. Furthermore, in the pulse correction processing that is performed by the pulse corrector 438 within the pulse generator 434, pulse continuity compensation is performed in order to maintain the continuity of the pulses. In other words, if the relationship between the states of the IGBTs 328 and 330 in the control cycle Tn that was calculated in the previous cycle and the states of the IGBTs 328 and 330 in the next control cycle Tn+1 that is calculated this time is a discontinuous relationship, then control for controlling the IGBTs 328 and 330 to be continuous or discontinuous in the next control cycle Tn+1 is additionally performed on the basis of these states. In concrete terms, if the state of the IGBT 328 or 330 at the end of the control cycle Tn is the continuous state, and the state of the IGBT 328 or 330 at the start of the next control cycle Tn+1 is the discontinuous state, then control is additionally performed (in the steps 906 and 912 of the FIG. 14 flow chart) to make that IGBT 328 or 330 discontinuous at the start of the next control cycle Tn+1. Moreover, if the state of the IGBT 328 or 330 at the end of the control cycle Tn is the discontinuous state, and the state of the IGBT 328 or 330 at the start of the next control cycle Tn+1 is the continuous state, then control is additionally performed (in the steps 909 and 911 of the FIG. 14 flow chart) to make that IGBT 328 or 330 continuous at the start of the next control cycle Tn+1. Since this is done, it is possible to enhance the reliability while at the same time reducing the switching losses, while at the same time suppressing increase of torque pulsations to the greatest practicable extent.

(3) In the pulse correction processing described above, if the pulse width that corresponds to the time interval from the time point in the control cycle Tn at which the state of the IGBT 328 or 330 last changes over to the beginning of the next control cycle Tn+1 is greater than or equal to a predetermined minimum pulse width, then control is additionally performed to make the IGBT 328 or 330 continuous or discontinuous at the first phase θv1 of the next control cycle Tn+1. On the other hand, if the pulse width that corresponds to the time interval from the time point in the control cycle Tn at which the state of the IGBT 328 or 330 last changes over to the beginning of the next control cycle Tn+1 is less than the predetermined minimum pulse width, then control is additionally performed (in the step 915 of the FIG. 14 flow chart) to make that IGBT 328 or 330 continuous or discontinuous at a timing somewhat displaced from the first phase of the next control cycle Tn+1, by performing the minimum pulse width limitation. Since this is done, it is possible to make the IGBTs 328 and 330 go continuous or discontinuous in a reliable manner, because it is possible to make the pulse width of the control signal that is outputted for performing this additional control to make that IGBT 328 or 330 continuous or discontinuous compulsorily be greater than or equal to the minimum pulse width.

(4) Furthermore, in the pulse correction processing, if the pulse width of a pulse waveform calculated in the control cycle Tn for the next control cycle Tn+1 is less than the minimum pulse width, then that pulse is eliminated (in the step 904 of the FIG. 14 flow chart). And the control circuit 172 generates a control signal corresponding to the pulse waveform after that pulse has been eliminated. Since this is done, it is possible to prevent a control signal, having a pulse width less than the minimum pulse width and that cannot be tracked by the switching operation of the IGBTs 328 and 330, from being outputted from the control circuit 172, before it even occurs.

-Second Embodiment-

A second embodiment of the present invention will now be explained in the following. In the first embodiment described above, an example was explained in which a PHM pulse signal was created by the pulse generator 434 using the pulse output circuit 436. By contrast, in this second embodiment, an example is explained in which a PHM pulse signal is created by using a timer counter comparator instead of a phase counter comparator.

Figure 42:
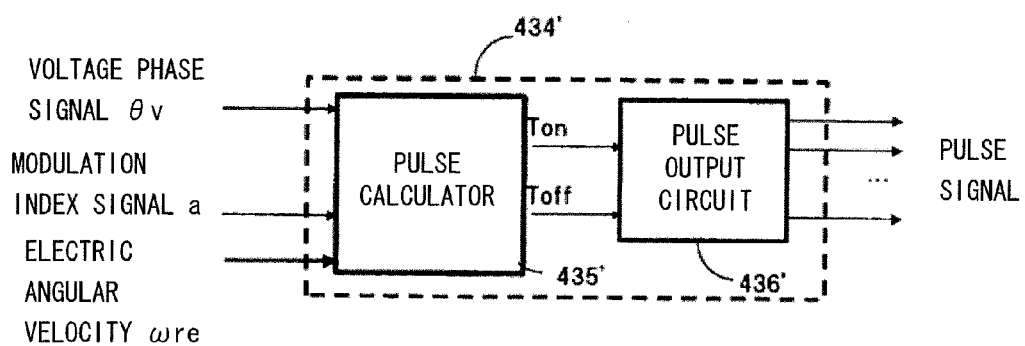
FIG. 42 is a figure showing the structure of a pulse generator according to a second embodiment.
Figure 43:
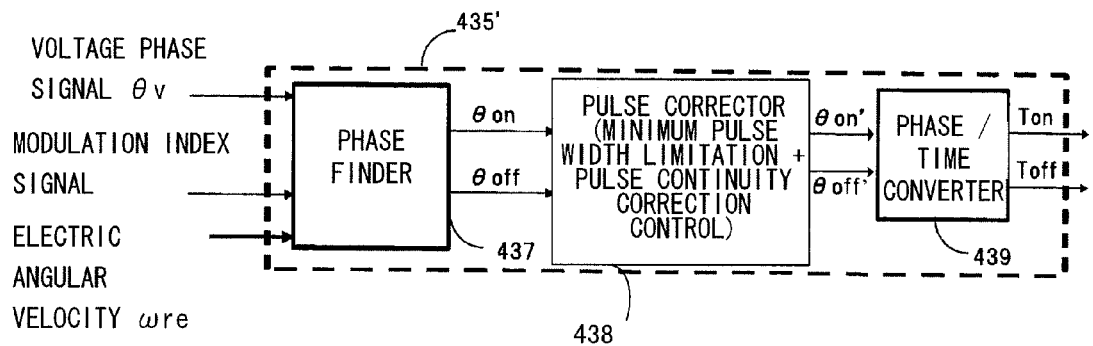
FIG. 43 is a figure showing the structure of a pulse calculator 435 according to this second embodiment.

The pulse generator 434' in the control circuit 172 according to this embodiment is implemented by a pulse calculator 435' and a pulse output circuit 436', as for example shown in FIG. 42. This pulse calculator 435', as for example shown in FIG. 43, is implemented by a phase finder 437, a pulse corrector 438, and a phase/time converter 439. It should be understood that the phase finder 437 and the pulse corrector 438 are the same as those shown in FIG. 7 in connection with the first embodiment.

Moreover, in concrete terms, the circuit of the pulse output circuit 436' is the same as in FIG. 53, and, since its calculations are performed according to a function of time, by contrast to the register 518 of FIG. 53 to which the calculation result is inputted, here the count value of a timer counter 510' that counts clock pulses is outputted to a comparator 511, that compares it with the value stored in the register 518.

The phase/time converter 439 converts the rising phase θon' and the falling phase θoff' after correction of the pulse outputted from the pulse corrector 438 into time period information, and outputs this information as the rising time Ton and the falling time Toff respectively. And, on the basis of this rising time Ton and falling time Toff outputted from the phase/time converter 439 of the pulse calculator 435, the pulse output circuit 436' generates PHM pulse signals as switching commands for the upper and lower arms for the U phase, the V phase, and the W phase. The six PHM pulse signals generated by the pulse output circuit 436' for the upper and lower arms of each of the phases are outputted to the changeover device 450. Here, the pulse output circuit 436' is the circuit of FIG. 53, and, as described above, the counter 510' operates as a timer counter that counts clock pulses. The operation of the circuit of FIG. 53 is the same as the operation of FIGS. 6 and 7, as explained above.

The basic theory of the pulse generation performed by the pulse generator 434' of this embodiment is shown in FIG. 44. To compare this with FIG. 8 that shows the basic theory of the pulse generation as performed in the first embodiment, in FIG. 44, the feature that the rising phase θon' and the falling phase θoff' of the pulse after correction are respectively changed to the rising time Ton and the falling time Toff, is changed insofar as a time counter is used, instead of a phase counter.

In other words, at the head end of the control cycle Tn, the rotor phase angle θre is acquired by the voltage phase difference calculator 431. On the basis of this rotor phase angle θre, the voltage phase is calculated by the voltage phase difference calculator 431 according to the Equation (3) described previously, and a voltage phase signal θv is outputted to the pulse generator 434'. From this voltage phase signal θv and the electric angular velocity signal ωre from the angular velocity calculator 460, the pulse generator 434' calculates the start phase θv1 and the end phase θv2 of the next control cycle Tn+1, and calculates the rising phase θon and the falling phase θoff in this range from the memory. And, on the basis of this rising phase θon and falling phase θoff, the rising phase θon' and falling phase θoff' of the pulse after correction are determined. Then the respective differences Δon' and Δoff' from the phase θv1 to the rising phase θon' and the falling phase θoff' are obtained, and the respective rising time Ton and the falling time Toff are calculated according to these differences. After the rising time Ton and the falling time Toff have been determined in this manner, PHM pulse signals for each of the U phase, the V phase, and the W phase are outputted using a function of comparison and matching with a time counter. It should be understood that in FIG. 44, by way of example, only the PHM pulse signal for the U phase is shown, but the same holds for the V phase and for the W phase.

A flow chart for explanation of the details of the procedure for pulse generation explained above is shown in FIG. 45. It should be understood that, in the flow chart of FIG. 45, the same reference symbols as ones used in the flow chart shown in FIG. 9 denote the same operations. And explanation thereof will be omitted, in order to avoid the effort of describing the same details twice.

Figure 45:
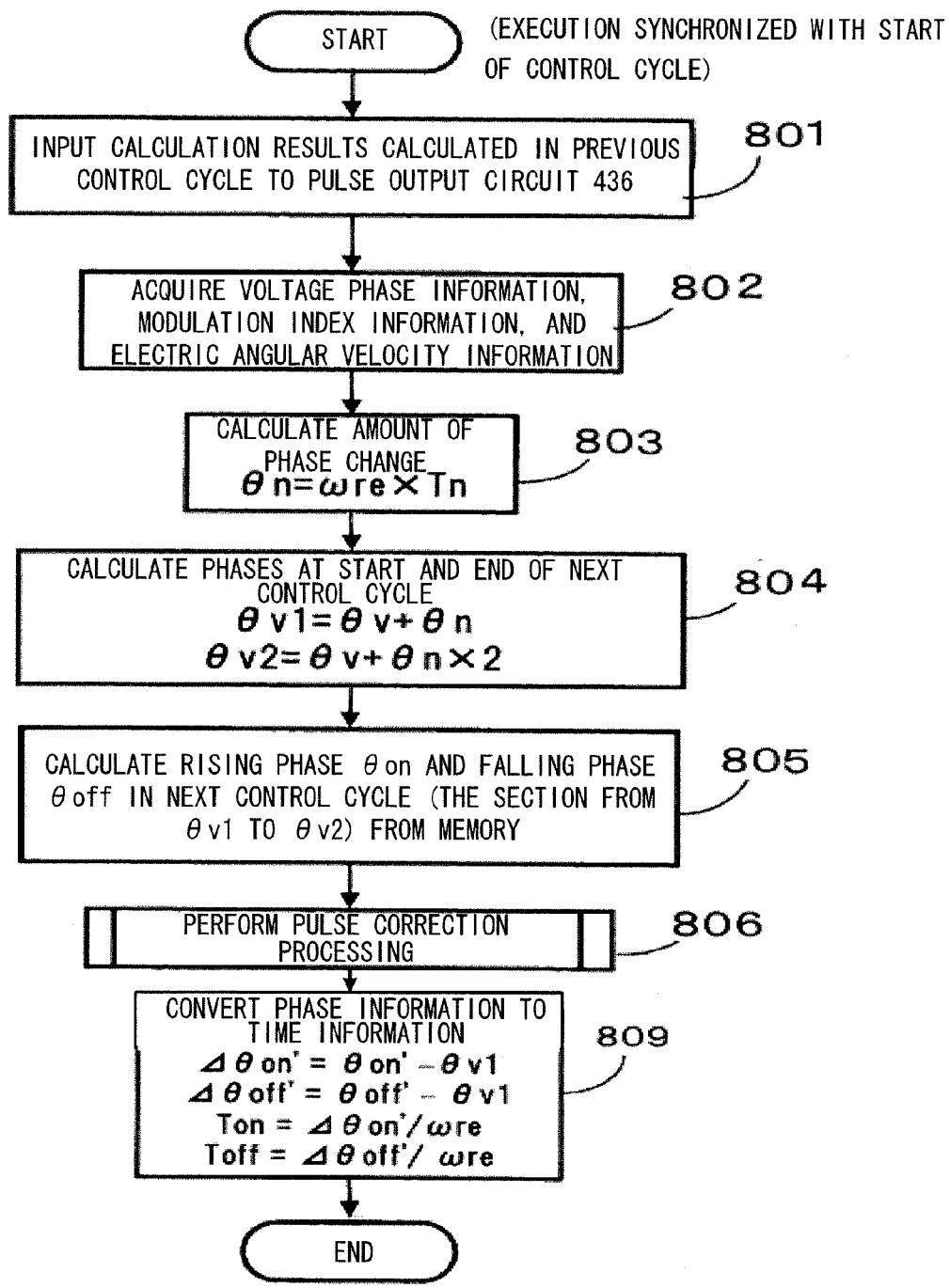
FIG. 45 is a flow chart showing calculation processing performed by a pulse generator according to the second embodiment.

In a step 809 of FIG. 45, with the phase/time converter 439 within the pulse calculator 435', the pulse generator 434' converts the rising phase θon' and the falling phase θoff' of the pulse after correction outputted from the pulse corrector 438 in the step 806 to the rising time Ton and the falling time Toff respectively. Here, the differences Δon' and Δoff' are calculated by subtracting the start phase θv1 of the control cycle Tn+1 from the rising phase θon' and from the falling phase θoff' of the pulse after correction, respectively. The rising time Ton and the falling time Toff are then calculated by dividing these differences Δon' and Δoff' by the electric angular velocity ωre, respectively. These calculated values are temporarily stored in a working memory.

At the start of the next control cycle Tn+1, the step 801 is executed, and the calculation result of the previous control cycle that was temporarily stored is read out from the working memory and is inputted to the registers 516 of the pulse output circuit 436'. This input operation is performed according to the order of the events that are to be generated. First, the count value C1 for the rising time Ton and "S" that denotes rising are inputted, and next the count value C2 for the falling time Toff and "R" that denotes falling are inputted. Then the timer counter 510' of FIG. 53 performs its count operation, and, when the value counted by this timer counter 510' reaches the count value C1 for the rising time Ton, on the basis of the result of comparison by the comparator 511, a set signal is sent to the flip-flop 514 via the gate 513S, and the PHM pulse signal is raised.

Next, the count value C2 that specifies the timing of the falling time Toff is inputted to the register 518, and a signal "R" that denotes falling is inputted to the flip-flop 512. As a result, the gate 513R opens and the gate 513S closes. The timer counter 510' performs its counting operation, and, when its count value reaches the count value C2 that is stored in the register 518, on the basis of the result of comparison by the comparator 511, a reset signal is sent to the flip-flop 514 via the gate 513R, the flip-flop 514 goes into its reset state, and the PHM pulse signal is dropped. The PHM pulse signal is generated in this manner, and, after having been generated, it is outputted to the changeover device 450. The pulse signal is generated by the processing of the step 809 described above being performed by the pulse generator 434' in addition to the processing of the steps 801 through 806 explained above in connection with the first embodiment.

Figure 46:
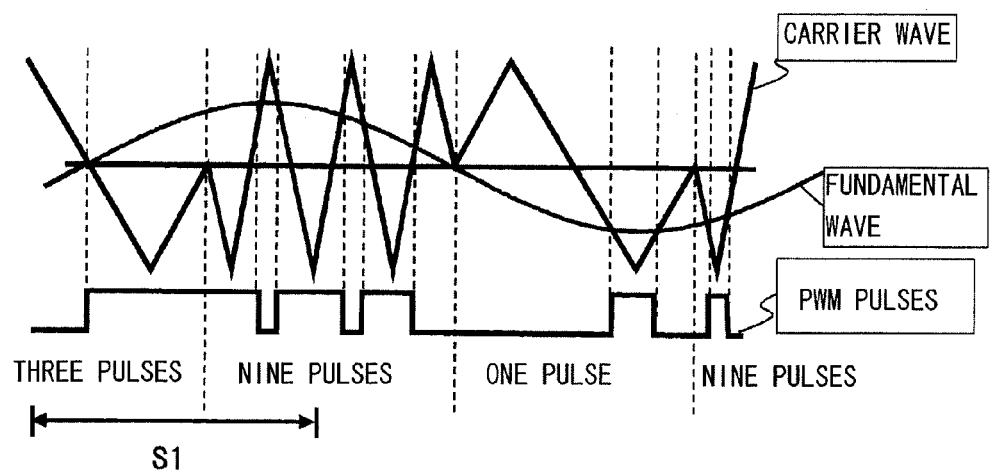
FIG. 46 is a figure for explanation of problems that arise during prior art synchronous PWM control when changing the carrier wave.

Next, the particular characteristics of the PHM pulse waveform outputted by the pulse generator 434' according to this embodiment will be explained in the following, using FIGS. 46 through 50. FIG. 46 is a figure for explanation of a problem that arises when, in prior art synchronous PWM control, the carrier wave changes. In synchronous PWM control, as shown in FIG. 46, it is hoped to control the positions and the widths of the PHM pulses by using triangular waves of various shapes as the carrier waveform. However, with this type of control method, the problems arise that the circuit structure for transforming the carrier waveform into various shapes by inversion or frequency change of the carrier waveform, or that it is necessary to store the shapes of a large number of triangular waves in a ROM or the like in advance. Moreover, since it is not possible to change the carrier waveform part way through a triangular wave, accordingly, due to the waveform, a long time period is taken until change starts, and this is also a problem because it can be a cause of torque fluctuations or the like.

Figure 47:
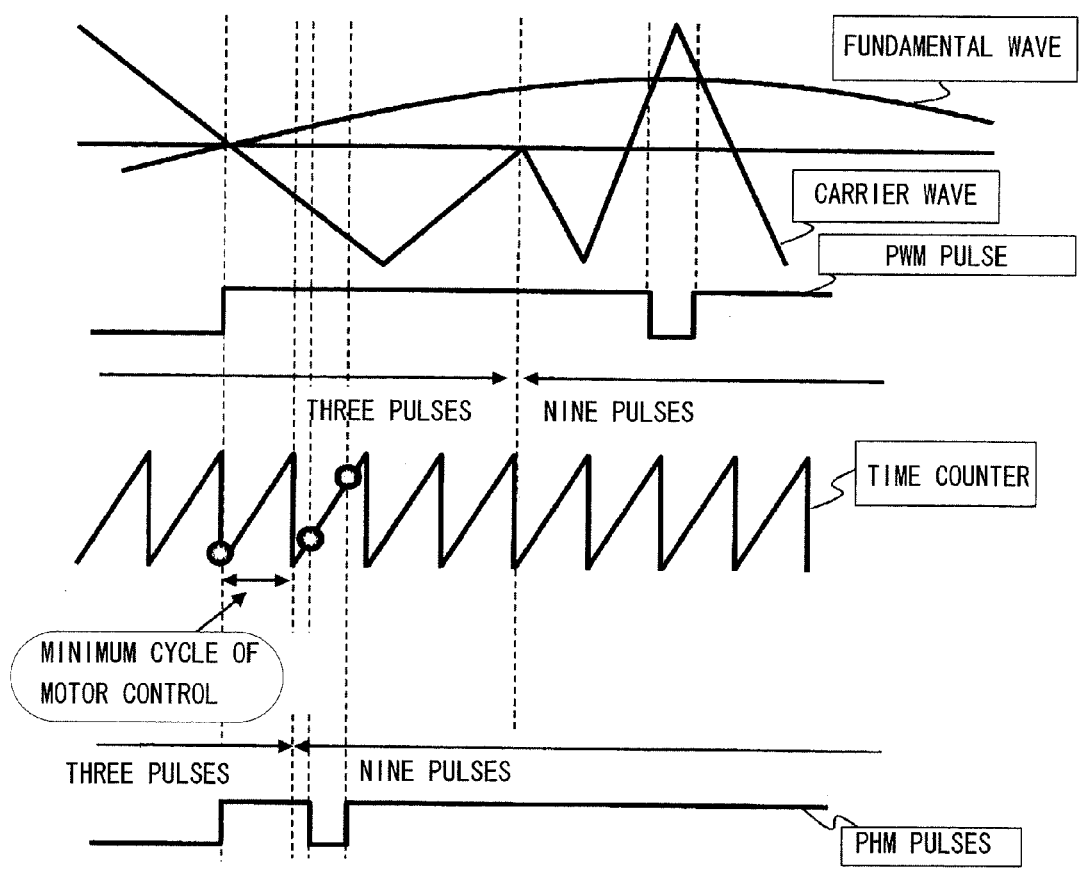
FIG. 47 is a figure for comparison of a PWM pulse waveform according to synchronous PWM control and a PHM pulse waveform according to this embodiment.

FIG. 47 is a figure for comparison of the PWM pulse waveform according to synchronous PWM control shown in FIG. 46 with a PHM pulse waveform according to this embodiment. In FIG. 47, the fundamental wave, the carrier wave, and the PWM pulse shown at the upper portion of the figure are portions of those shown in FIG. 46 (the portions corresponding to the section S1) enlarged. The PHM pulse according to this embodiment is outputted on the basis of a time counter, as for example shown in FIG. 47. The period of this time counter is the minimum cycle for controlling the motor-generator 192, and is equal to the control cycle Tn shown in FIG. 44. This may be several hundreds of µs, for example, as explained in connection with the first embodiment.

As will be understood from FIG. 47, since a time counter is used for the PHM pulses, no triangular wave of a complicated shape is required as was the case for the carrier wave for synchronous PWM control. Accordingly the complicated circuit structure and storage to a ROM or the like such as described above become unnecessary. Moreover, the time needed for waiting in order for the waveform to change is one cycle of the time counter, and since this is of the order of several hundreds of µs, i.e. is extremely short, accordingly the problem of torque fluctuations and so on does not arise.

Figure 48:
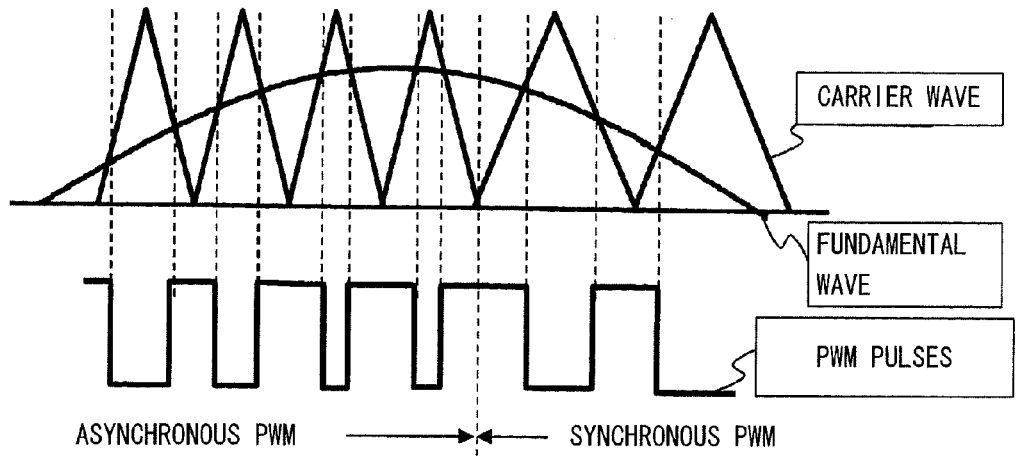
FIG. 48 is a figure for explanation of problems that arise during prior art synchronous PWM control when changing the carrier wave according to a different method.

FIG. 48 is a figure for explanation of problems that arise when changing the carrier wave during the prior art synchronous PWM control by a method different from that of FIG. 46. In synchronous PWM control, as shown in FIG. 48, by changing the width (i.e. the period) of the carrier wave, which is a triangular wave, it is also contemplated to control the positions and the widths of the PWM pulses. However with this type of control method, sometimes it happens that the continuity of the pulses is lost when changeover between asynchronous PWM control and synchronous PWM control is performed partway through the triangular wave. When the continuity of the pulses is lost, sometimes it happens that one or more of the switching elements remains ON or OFF during an undesirably long period of time, and/or that excessive current is generated due to transient fluctuations of the voltage. Accordingly, since it is necessary to perform the changeover at a peak or a trough portion of the triangular wave, depending upon the shape of the carrier waveform, sometimes it is the case that it takes a long time before control changeover can be performed.

Figure 49:
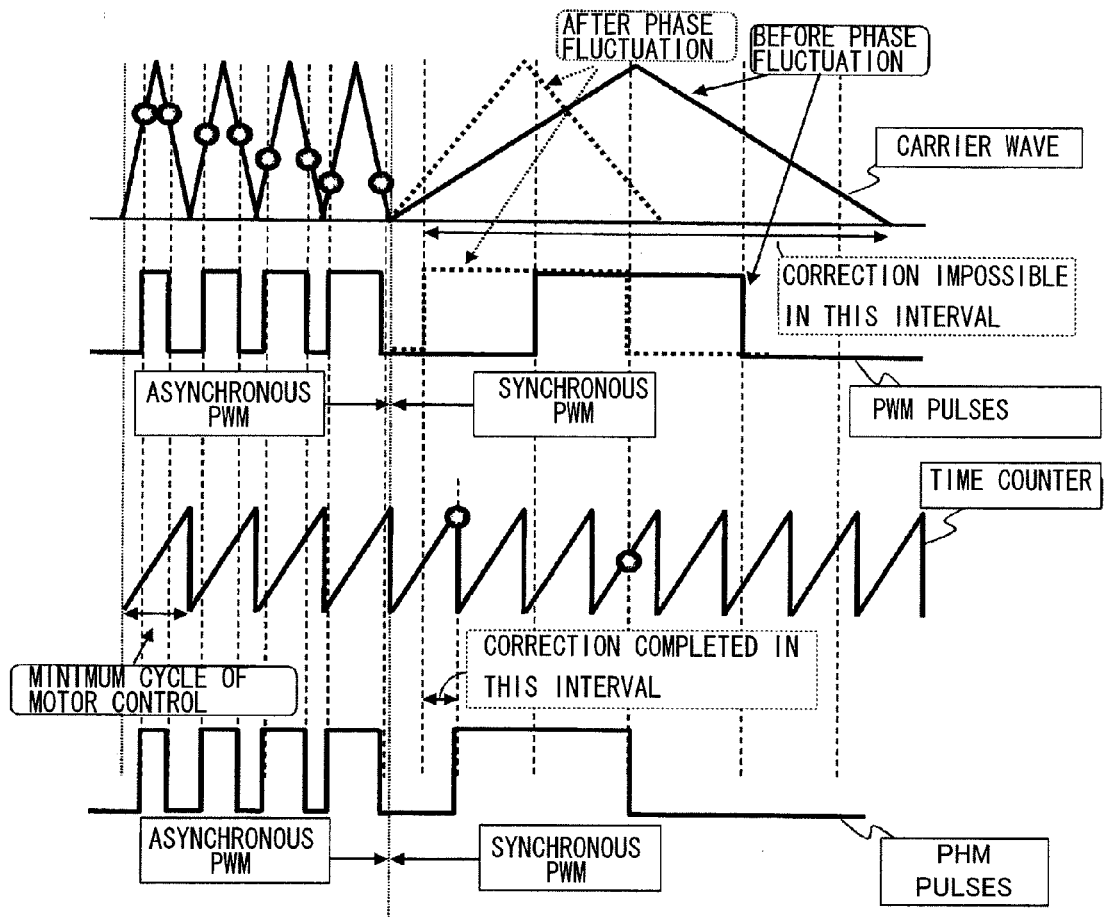
FIG. 49 is a figure for comparison of a PWM pulse waveform when changing over from asynchronous PWM control to synchronous PWM control and a PHM pulse waveform according to this embodiment.

FIG. 49 is a figure for comparison of a PWM pulse waveform when changeover is executed from asynchronous PWM control to synchronous PWM control and a PHM pulse waveform according to this embodiment. In FIG. 49, an example is shown when the carrier wave and the PWM pulse shown in the upper portion of the figure are changed over from asynchronous PWM control to synchronous PWM control. The PHM pulses according to this embodiment are outputted on the basis of a time counter, as for example shown in FIG. 49. The period of this time counter is the minimum period for motor control, just as in the case of FIG. 47.

As will be understood from FIG. 49, when changing over from asynchronous PWM control to synchronous PWM control, if the width of this triangular wave is enlarged by the phase of the carrier wave being shifted, the time period required for waiting until a PWM pulse determined by this triangular wave is outputted may become great, depending upon the width of the triangular wave. On the other hand with PHM pulses, as previously described, since the time period that it is necessary to wait for changing over the waveform is of the order of several hundreds of µs, i.e. is extremely short, accordingly it is possible immediately to output PHM pulses for which the waveform has been changed, and no problem of torque fluctuations and so on arises. Furthermore, since the pulse waveform is changed using a time counter, accordingly it is not necessary to change the period of the carrier wave as is the case with synchronous PWM control. In addition, since the time period for waiting is short as compared with synchronous PWM control even if the voltage phase has fluctuated when the pulse waveform is changed, accordingly transient fluctuations of the voltage do not occur, and it is possible to respond to these phase fluctuations immediately.

Figure 50:
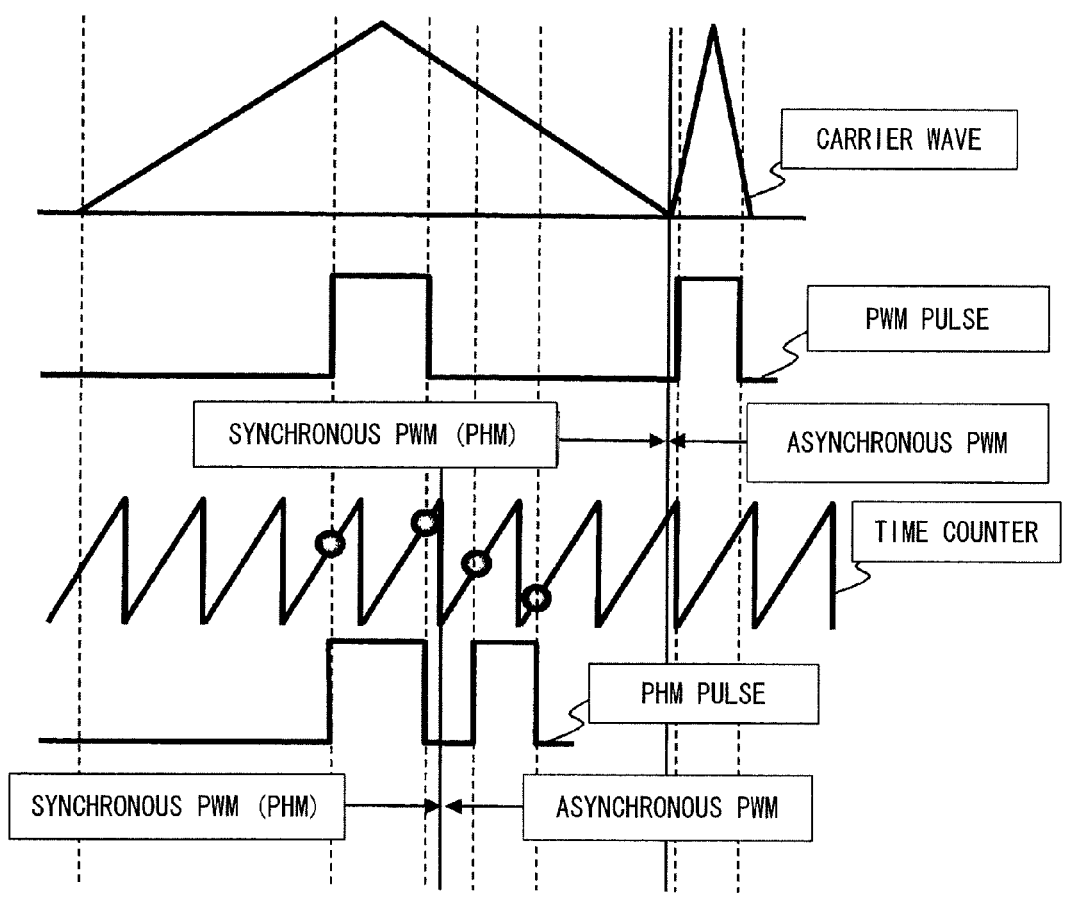
FIG. 50 is a figure for comparison of a PWM pulse waveform when changing over from synchronous PWM control to asynchronous PWM control and a PHM pulse waveform according to this embodiment.

FIG. 50 is a figure for comparison of a PWM pulse waveform when changing over from synchronous PWM control to asynchronous PWM control, i.e. in the direction opposite to that of FIG. 49, and a PHM pulse waveform according to this embodiment. As will be understood from FIG. 50, since it is not possible to change over from synchronous PWM control to asynchronous PWM control partway through the triangular wave that is serving as the carrier wave, accordingly the time period required for waiting until changing over becomes great, depending upon the width of this triangular wave. On the other hand, since with PHM pulses, as explained with reference to FIG. 49, the time period that it is necessary to wait for changing over the waveform is of the order of several hundreds of µs, i.e. is extremely short, accordingly it is possible immediately to output PHM pulses for which the waveform has been changed. Accordingly, no problem of torque fluctuations and so on arises.

It should be understood that while, in the above discussion, the characteristics of a PHM pulse waveform according to the second embodiment have been explained and have been compared with prior art synchronous PWM control, it goes without saying that a PHM pulse waveform according to the first embodiment also has similar characteristics to these. In other words, even if the time counter is replaced by a phase counter, it is possible to output a PHM pulse waveform having similar characteristics to those explained in the above description and with reference to FIGS. 46 through 50.

According to the second embodiment of the present invention as explained above, the beneficial operational effects that can be obtained are similar to those in the case of the first embodiment.

The fundamental theory of the operation of the pulse modulator 430 for PHM control described above with reference to FIG. 5 will now be explained for a second time.

Consider a square wave that corresponds to the waveform of the AC power that is to be outputted, for example to the AC voltage. Various harmonic components are included in this square wave, and, when Fourier series expansion is employed, it may be resolved into its harmonic components as shown in Equation (1).

The harmonic components described above to be eliminated are determined and a pulse signal is generated, according to the objective of use and the situation. To put it in another manner, an effort is made to reduce the number of times that switching is performed by only including harmonic components whose influence as noise is low.

Figure 51:
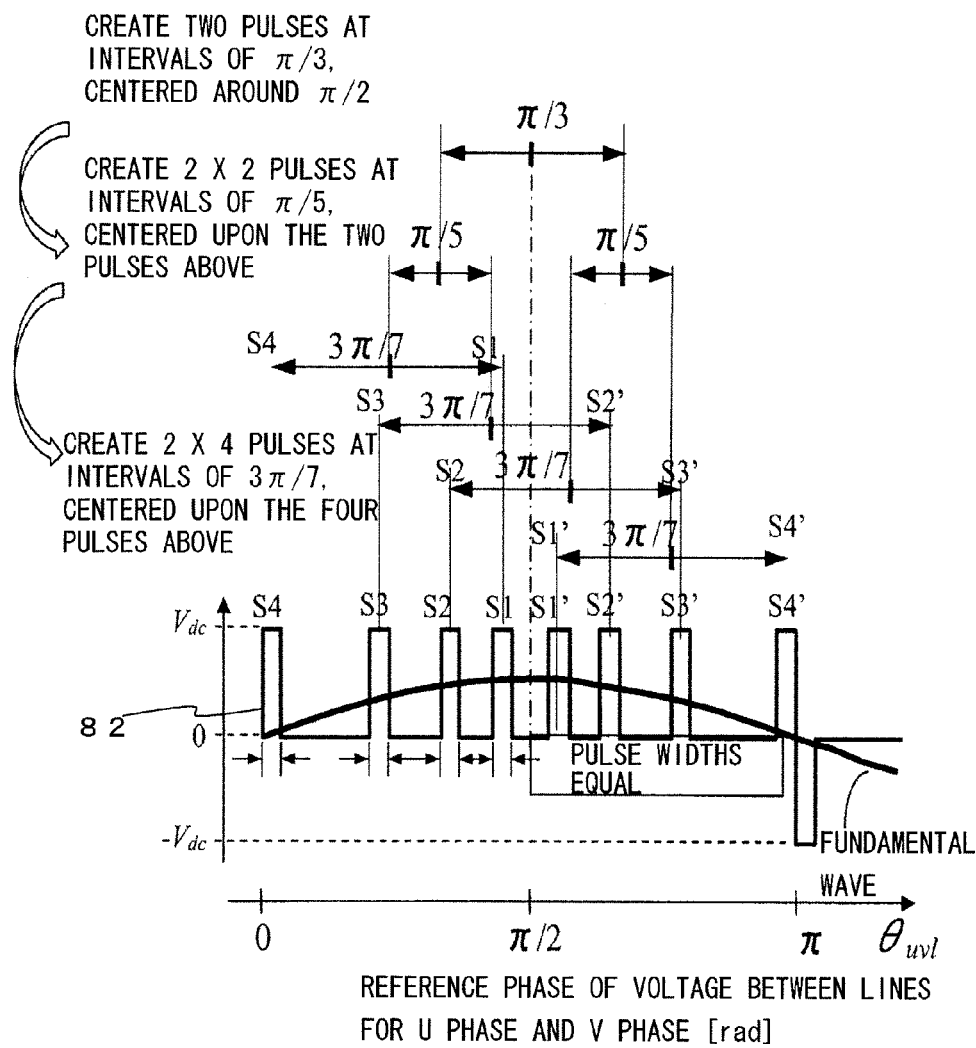
FIG. 51 is an explanatory figure for explanation of a pattern of the voltage between lines for the U phase and the V phase, when third order, fifth order, and seventh order harmonic components have been eliminated.

FIG. 51 is a figure showing, as one example, the process of creating a pattern for the voltage between the lines for the U phase and for the V phase in which the harmonic components of the third order, the fifth order, and the seventh order have been eliminated, and also showing the characteristic features of this pattern. However, the voltage between lines is the electrical potential difference between the terminals for the two phases, and, if the phase voltage of the U phase is termed Vu and the phase voltage of the V phase is termed Vv, then the voltage between the U and V lines Vuv is given by Vuv=Vu−Vv. Since the same is true for the voltage between the lines for the V phase and for the W phase and for the voltage between the lines for the W phase and for the U phase, accordingly in the following, as a representative example, only the creation of the pattern for the voltage between the lines for the U phase and for the V phase will be explained.

The horizontal axis in FIG. 51 is an axis that takes the fundamental wave of the voltage between the lines for the U phase and for the V phase as a reference, and in the following, as an abbreviation, will be termed the reference phase θuvl of the voltage between the U and V lines. As shown in FIG. 51, the fundamental wave of the voltage pulses is a sine wave voltage that takes θuvl as a reference. According to the procedure shown in the figure, the pulses that are generated are arranged in positions as shown in the figure with respect to θuvl, centered around π/2 of this fundamental wave. Here the positions in which the pulses of FIG. 51 are arranged may be specified according to electrical angle, since as described above θuvl is a parameter that corresponds to electrical angle. Accordingly, in the following, the positions in which these pulses are arranged will be defined as specific electrical angle positions. In this way, the pulse trains S1 through S4 and S1' through S4' are defined. These pulse trains have spectral distributions in which no harmonic components of the third order, the fifth order, and the seventh order of the fundamental wave are included. To put it in another manner, these pulse trains are waveforms in which the harmonic components of the third order, the fifth order, and the seventh order have been eliminated from the square wave defined over the interval $0 \leq \theta uvl \leq 2\pi$. It should be understood that it would also be possible for the orders of the harmonic components to be eliminated to be other than the third order, the fifth order, and the seventh order. The harmonic components may be eliminated are eliminated up to the highest order when the frequency of the fundamental wave is low, and may be eliminated only at low orders when the frequency of the fundamental wave is high. For example, for the sake of convenience, the orders of harmonic components to be eliminated may be changed as follows: when the rotational speed is low, the harmonic components of the fifth order, the seventh order, and the eleventh order may be eliminated; when the rotational speed rises somewhat, this may be changed to elimination of only the harmonic components of the fifth order and the seventh order; and when the rotational speed rises further, only the harmonic component of the fifth order may be eliminated. This is because the current pulsations become small in the high rotational speed region, since the winding impedance of the motor-generator 192 becomes large.

In a similar manner, in some cases the number of harmonic components to be eliminated may change according to the magnitude of the torque. For example, the number of harmonic components to be eliminated may change in the following manner as the torque increases under the condition that the rotational speed remains fixed: when the torque is low, a pattern in which the harmonic components of the fifth order, the seventh order, and the eleventh order are eliminated may be selected; when the torque increases somewhat, a pattern in which the harmonic components of the fifth order and the seventh order are eliminated may be selected; and, when the torque increases further, a pattern in which only the harmonic component of the fifth order is eliminated may be selected.

Furthermore not only, as described above, may the number of harmonic components to be eliminated decrease along with increase of the torque or increase of the rotational speed, but conversely, in some cases, the number of harmonic components to be eliminated may increase, or may not change, even though the torque and/or the rotational speed increases or decreases. This kind of condition must be determined upon in consideration of the magnitudes of indicators such as torque ripple of the motor-generator 192, noise, EMC and so on, and accordingly the pattern of change of the number of harmonic components to be eliminated along with rotational speed and/or torque is not to be considered as being limited to being monotonic.

In the embodiment described above, it is possible to select the number of orders of harmonic components that it is desired to eliminate in consideration of the influence of distortion upon the control object. The more the number of orders of harmonic components that are to be eliminated in this way increases, the more does the number of times of switching of the switching elements 328 and 330 of the power switching circuit 144 increase. Since, in the embodiment described above, it is possible to select the number of orders of harmonic components that it is desired to eliminate in consideration of the influence of distortion upon the control object, accordingly it is possible to prevent the elimination of more types of harmonic components than necessary, and therefore it is possible to reduce the number of times that the switching elements 328 and 330 of the power switching circuit 144 are switched in an appropriate manner in consideration of the influence of distortion upon the control object.

In the control of the voltage between lines as explained in connection with the embodiments described above, control is performed so that the switching timings in the interval from phase 0 [radians] to π [radians], i.e. in half a cycle of the AC power that it is desired to output, and the switching timings in the interval from phase π [radians] to 2π [radians], i.e. in the other half cycle of the AC power, become the same, and thus it is possible to simplify the control and to enhance the controllability. Furthermore, in the intervals from phase 0 [radians] to π [radians] and from phase π [radians] to 2π [radians], control is performed at the same switching timings centered around phase π/2 and 3π/2 respectively as well, and thus it is possible to simplify the control and to enhance the controllability.

Yet further, since a pulse signal is generated so that harmonic components whose influence as noise is low are included as described above according to the objective of use and the situation, accordingly it is possible to reduce the number of times that switching of the switching elements 328 and 330 of the switching circuit 144 is performed.

Various embodiments have been described above by way of example; however, the present invention is not to be considered as being limited by the details of these embodiments, but only by the terms of the Claims, that follow.

What is claimed is:

1. A power conversion device, comprising:
a power switching circuit that receives DC power and outputs AC power, including a plurality of series circuits in each of which a switching element that operates as an upper arm and a switching element that operates as a lower arm are connected in series;
a control circuit that repeatedly calculates the states of the switching elements at a predetermined cycle on the basis of input information, and, according to the results of these calculations, generates control signals for controlling the continuity or discontinuity of the switching elements at timings based upon the phase of the AC output to be generated by the power switching circuit; and
a driver circuit that generates drive signals for controlling the continuity or discontinuity of the switching elements, on the basis of the control signals from the control circuit; wherein:
if the relationship between the state of a switching element in a control cycle calculated on the basis of the input information and the state of the switching element in the next control cycle is a discontinuous relationship, the control circuit additionally performs control to make the switching element continuous or discontinuous on the basis of the state of the switching element in the control cycle and the state of the switching element in the next control cycle.

2. A power conversion device according to claim 1, wherein, if the state of the switching element at the end of the control cycle is the continuous state and the state of the switching element at the start of the next control cycle is the discontinuous state, the control circuit additionally performs control to make the switching element discontinuous in the next control cycle.

3. A power conversion device according to claim 1, wherein, if the state of the switching element at the end of the control cycle is the discontinuous state and the state of the switching element at the start of the next control cycle is the continuous state, the control circuit additionally performs control to make the switching element continuous in the next control cycle.

4. A power conversion device according to claim 1, wherein:
if a pulse width corresponding to the time period from the last changeover time point of the state of the switching element in the control cycle to the start of the next control cycle is greater than a predetermined minimum pulse width, the control circuit additionally performs control to make the switching element continuous or discontinuous at the start of the next control cycle; and
if a pulse width corresponding to the time period from the last changeover time point of the state of the switching element in the control cycle to the start of the next control cycle is less than the minimum pulse width, the control circuit additionally performs control to make the switching element continuous or discontinuous at a timing displaced from the start of the next control cycle.

5. A power conversion device according to claim 1, wherein, if the pulse width resulting from the calculation is less than a predetermined minimum pulse width, the control circuit eliminates the pulse while generating the control signal.

6. A power conversion device according to claim 1, wherein:
the power switching circuit generates three-phase AC power having a U phase, a V phase, and a W phase; and
in order to generate AC voltages between the phases, the driver circuit supplies to the power switching circuit drive signals specifying switching timings for an interval from phase angle 0 to phase angle $\pi$ of the AC voltage, and drive signals specifying switching timings for an interval from phase angle $\pi$ to phase angle $2\pi$, which are the same as the switching timings for the interval from phase angle 0 to phase angle $\pi$.

7. A power conversion device according to claim 1, wherein:
in first control to eliminate harmonic components in which one or more orders of harmonic components are to be eliminated, the control circuit generates and supplies to the driver circuit first control signals for controlling the switching operation for each half cycle of an AC waveform determined on the basis of the harmonic components that are to be eliminated;
in second control to eliminate harmonic components in which the number of orders of harmonic components to be eliminated is greater than in the first control to eliminate harmonic components, the control circuit generates and supplies to the driver circuit second control signals for controlling the switching operation for each half cycle of an AC waveform determined on the basis of the harmonic components that are to be eliminated; and
due to control by the driver circuit, the power switching circuit performs more switching operations per half cycle of the second control to eliminate harmonic components, than the number of switching operations performed per half cycle of the first control to eliminate harmonic components.

8. A power conversion device according to claim 1, wherein:
on the basis of a predetermined condition, changeover is performed between:
a PHM control mode for creating a first interval in which the switching elements for the upper arms and the switching elements for the lower arms are turned ON for different phases and current is supplied from the DC power supply to the motor, and a second interval in which, for all of the phases, either all of the switching elements for the upper arms or all of the switching elements for the lower arms are turned ON and torque is maintained by the energy accumulated in the motor, alternatingly according to electrical angle; and
a sine wave PWM control mode for supplying current from the DC power supply to the motor by the switching elements being turned ON according to pulse widths that are determined on the basis of the results of comparison of sine wave command signals and a carrier wave.

9. A power conversion device according to claim 1, wherein:
a first interval in which the switching elements for the upper arms and the switching elements for the lower arms are turned ON for different phases and current is supplied from the DC power supply to the motor, and a second interval in which, for all of the phases, either all of the switching elements for the upper arms or all of the switching elements for the lower arms are turned ON and torque is maintained by the energy accumulated in the motor, are created alternatingly according to electrical angle;
by changing the length of the first interval according to a modulation index, a harmonic component of the AC current flowing to the motor is changed to a desired value; and
when the modulation index is a maximum, square wave control is performed in which each of the switching elements for each phase is turned ON once and OFF once for each rotation of the motor.

* * * * *